United States Patent [19]

Peltz et al.

[11] Patent Number: 4,716,542
[45] Date of Patent: Dec. 29, 1987

[54] METHOD AND APPARATUS FOR SINGLE SOURCE ENTRY OF ANALOG AND DIGITAL DATA INTO A COMPUTER

[75] Inventors: Curtis L. Peltz, Lake Oswego, Oreg.; George F. Martin, Ivoryton, Conn.; Peter H. Blake, Portland, Oreg.

[73] Assignee: Timberline Software Corporation, Portland, Oreg.

[21] Appl. No.: 781,268

[22] Filed: Sep. 26, 1985

[51] Int. Cl.⁴ .................. G06F 15/64; G06F 15/60; G06F 3/033

[52] U.S. Cl. .......................... 364/900; 178/18; 340/700; 340/707; 340/723; 340/712; 364/518; 364/520; 364/521; 364/189; 364/188; 364/402

[58] Field of Search ... 364/200 MS File, 900 MS File, 364/402, 520, 521, 518; 340/700, 707, 709, 710, 712, 798, 799; 358/22, 80, 310, 311, 327, 300, 302; 379/96, 110; 178/18, 19; 179/81 C; 346/560

[56] References Cited

U.S. PATENT DOCUMENTS

| | | | |
|---|---|---|---|
| 3,653,001 | 3/1972 | Ninke | 364/200 |
| 3,684,828 | 8/1972 | Maher | 178/18 |
| 3,692,936 | 9/1972 | Moffitt | 203/71 |
| 4,078,249 | 3/1978 | Leike et al. | 364/200 |
| 4,177,354 | 12/1979 | Mathews | 178/18 |
| 4,255,617 | 3/1981 | Carau, Sr. et al. | 178/19 |
| 4,318,096 | 3/1982 | Thornburg et al. | 340/706 |
| 4,357,624 | 11/1982 | Greenberg | 358/22 |
| 4,374,381 | 2/1983 | Ng et al. | 340/711 |
| 4,419,672 | 12/1983 | Hird | 346/33 M |
| 4,431,870 | 2/1984 | May et al. | 179/81 C |
| 4,451,895 | 5/1984 | Sliwkowski | 364/521 |
| 4,475,239 | 10/1984 | Van Raamsdonk | 382/57 |
| 4,506,336 | 3/1985 | Hird | 364/518 |
| 4,553,261 | 11/1985 | Froessl | 382/57 |
| 4,567,480 | 1/1986 | Blanchard | 340/712 |
| 4,577,187 | 3/1986 | Barr et al. | 340/700 |
| 4,578,768 | 3/1986 | Racine | 364/560 |
| 4,609,776 | 9/1986 | Murakami et al. | 178/18 |

Primary Examiner—Emanuel S. Kemeny
Assistant Examiner—Randy W. Lacasse
Attorney, Agent, or Firm—Marger & Johnson

[57] ABSTRACT

A system and method for inputting data to a single port of a host computer in parallel from a terminal keyboard and a graphic data digitizer. An adapter circuit includes inputs from the digitizer, the host computer and the terminal, outputs to the host computer and terminal and switching circuitry for routing signals from selected inputs to selected outputs, so that the use of the digitizer is transparent to the host computer. A microprocessor in the adapter circuit controls switching and, additionally, is programmed so that the digitizer, provided with menu images of keyboards, can mimic the function of the keyboard. The microprocessor memory contains a coordinates map of the menus, locatable as the user desires in the work area, which allows the user to access stored keyboard symbols and functions by using the digitizer.

10 Claims, 18 Drawing Figures

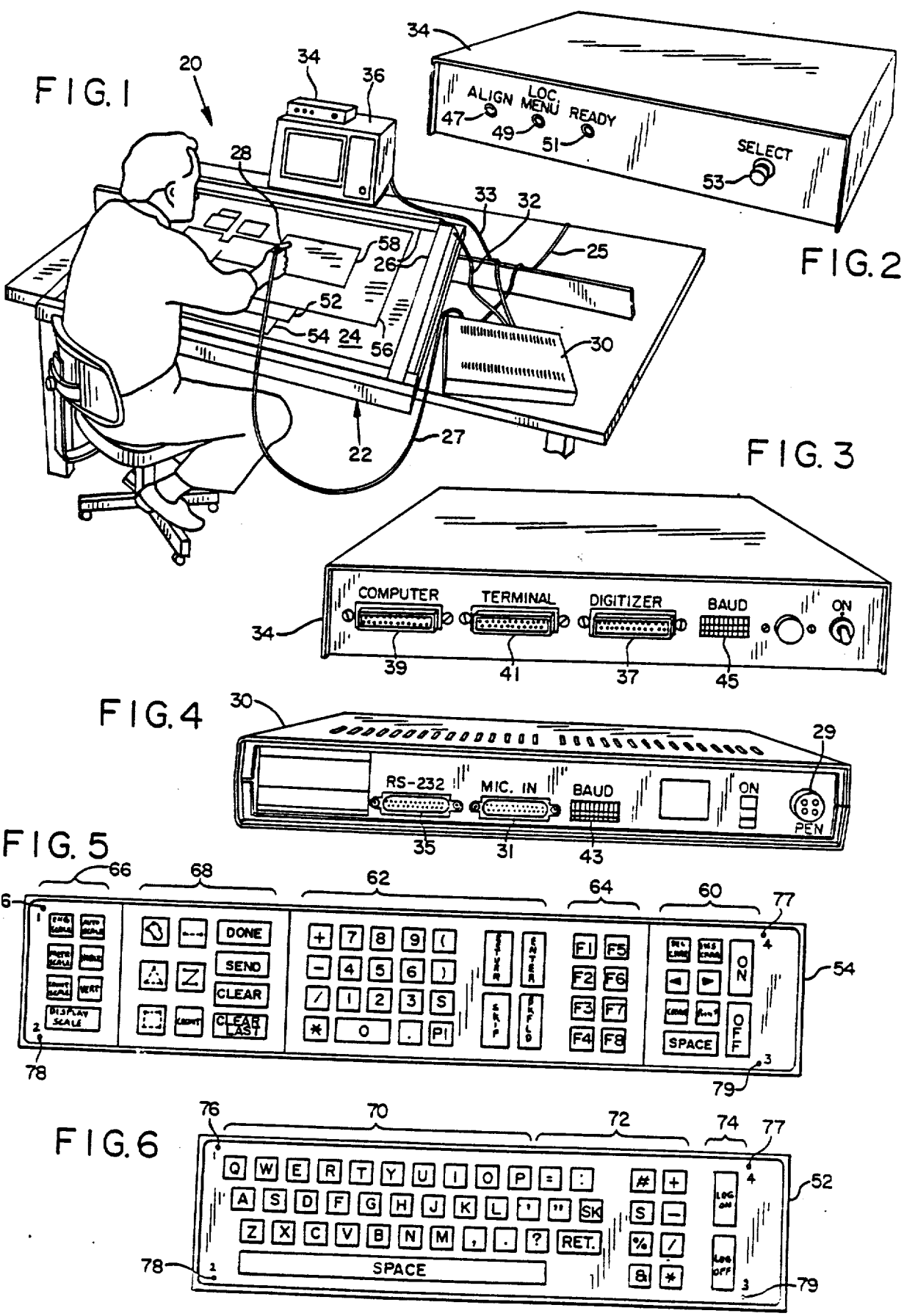

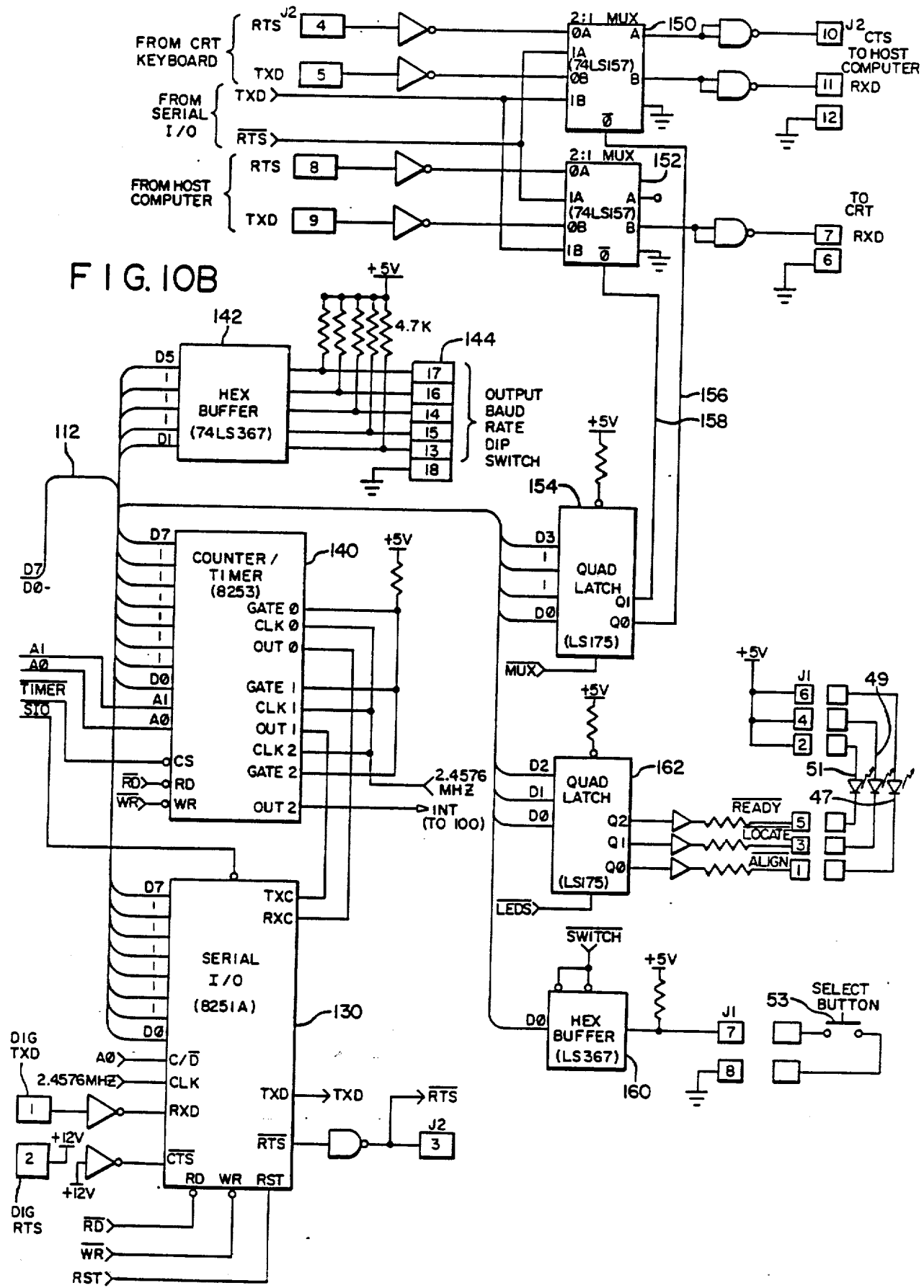

FIG.IIA
 Value 2.9908
FIG.IIB
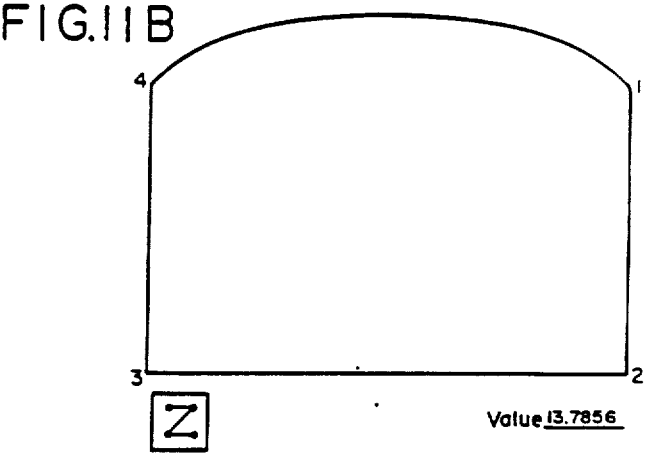
Value 13.7856
FIG.IIC
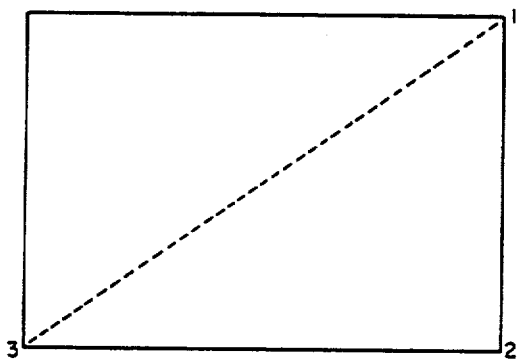
 Value 6.1354    Value 12.2794
FIG.IID
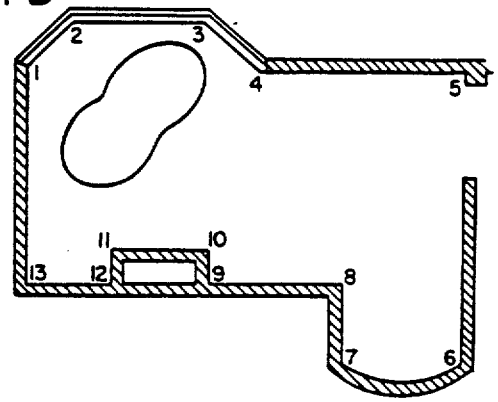
 Value 8.4364    Value 7.49906
FIG.IIE
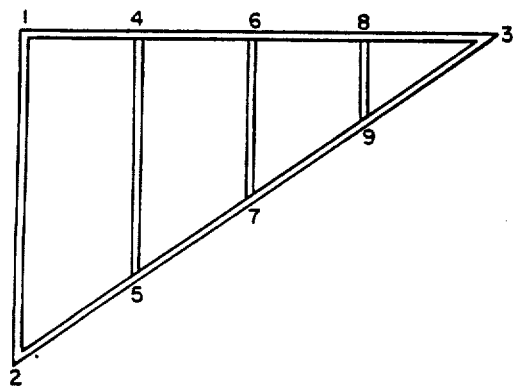
  Value 16.5715
FIG.IIF
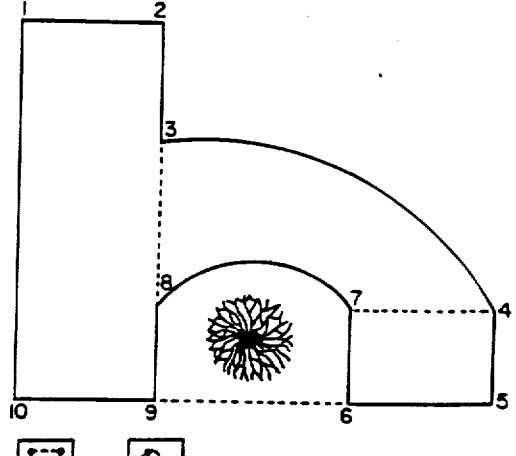
  Value 8.1390

METHOD AND APPARATUS FOR SINGLE SOURCE ENTRY OF ANALOG AND DIGITAL DATA INTO A COMPUTER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

This invention relates generally to computer peripheral devices for entry of data into a computer and more particularly to the use of a digitizer for digitizing and entering analog graphic information into a computer.

Often in the use of a computer, it is desirable to input two-dimensional graphic data. A wide variety of devices, commonly known as digitizers, have been proposed for this purpose. A typical form of digitizer is shown in U.S. Pat. No. 3,684,828 to Maher. The digitizer includes a surface for supporting a map, drawing or other source of graphic data, a device for designating points on the surface, and means defining an XY coordinate system for determining the coordinates for each designated point. Interface circuitry is provided for converting the coordinates data into digital numbers in an appropriate communication format for transmission to a computer for further processing. The Maher patent utilizes a piezoelectric substrate to detect the coordinates of the designated points by measuring the surface wave pulses propagating through the substrate surface. U.S. Pat. No. 3,692,936 to Moffitt discloses an acoustic digitizer. U.S. Pat. No. 4,177,354 discloses a digitizer employing a light responsive layer and grid system, used in combination with a light spot emitting stylus to generate digital coordinate signals. The digitizer of U.S. Pat. No. 4,255,617 to Carau et al. employs a cursor with a capacitive pickup in combination with a platen comprising a flat surface within which are embedded two orthogonal grids, each consisting of uniformly spaced individual conductors. U.S. Pat. No. 4,318,096 to Thornburg et al. discloses an XY coordinate tablet which is used in combination with an electrically conductive pen and analog-to-digital converter to provide coordinates data to a computer. It employs a piezoelectric audio pickup which produces a succession of pulses when the stylus is drawn across a textured surface such as a sheet of paper. Such sensors, orthogonally arranged, enable the direction of motion on a surface to be determined and digitized in each access by a bidirectional pulse counter.

All of the foregoing devices, and other similar digitizers provide, for each designated point on the graphic data source, a digital word consisting essentially of the X and Y coordinates of the designated point. As shown in the Maher patent, this information is transmitted in a compatible format to an input port of a digital computer. Such a capability is useful in a variety of tasks in which analog graphic data is input to a computer for subsequent processing. However, such systems are limited in their utility.

For most applications of digitizers, it is desirable for the user to be able to work in an interactive mode, alternately giving instructions to the computer and inputting data points for the computer to process in accordance with the given instructions. Conventionally, this task requires the user to type instructions into the computer through the computer terminal keyboard and then turn to the drafting table to input the data points needed to carry out the instructions. This task is repeated over and over again and can be very time-consuming.

For complex tasks, such as processing bid estimates for the cost of construction of buildings, inputting construction blueprint information from a single source is a severe bottleneck. Consequently, for very large construction projects it is desirable for multiple users to be able simultaneously to input and process data for different parts of the project. Mainframe computers or minicomputers are typically used on a time-shared basis for running programs of this magnitude of complexity. Such machines are limited, however, in the number of input and output devices that can be connected to them. Conventionally, the computer terminal and digitizer each require one I/O port. Moreover, time-shared operation of such systems often leaves an individual user waiting between inputting an instruction and inputting coordinate data while the computer processes data input by other users. Consequently, the use of digitizers has been largely limited to use with stand-alone microcomputers. The latter machines, however, are generally slower and of lesser computing capacity and, therefore, are quickly burdened by computational requirements of manipulation of substantial graphic data.

Various computer system arrangements are known that provide for multiterminal or multidevice access to a computer. U.S. Pat. No. 3,653,001 to Ninke discloses a time-shared computer graphic system, based on a large central processor and having multiple user terminals or local console connected to the processor through modems. Each local console includes a small computer, special purpose display hardware and software, and various local input devices, such as a light pen.

U.S. Pat. No. 4,374,381 to Ng et al. discloses a microcomputer connected to communication ports of a host computer. Connected to the microprocessor are various peripheral devices, such as a keyboard, a bar code reader, a CRT controller with display memory and a CRT with transparent touch pads on its screen.

U.S. Pat. No. 4,078,249 to Lelke et al. discloses a multi-user computer system for formatting textual information, such as in the layout of newspaper advertisements. Each user has a work station which includes a CRT display and keyboard and a graphic digitizer tablet. The keyboard is a standard typewriter style electrical keyboard having keys corresponding to alpha numeric characters and other selected symbols, and a second keyboard in the form of a programmed function keyboard. The display and keyboards of each work station communicate with the computer through an input/output bus controlled by a common logic unit which includes a microprocessor and work station drivers. Digital output signals from the graphic digitizer tablet are relayed back to the host computer, in parallel with communications between the host computer and the keyboard and CRT display portions of the work station. Data input from the graphic digitizer tablet is processed by the host computer and the resultant data is transmitted back through the common logic unit, formatted, and displayed on the CRT of the work station with which the digitizer is associated. This system is typical of and has the drawbacks, discussed above, associated with inputting digitizer data into a host computer in parallel with interactive operation on the data through a CRT display and keyboard. Application of a system like that disclosed by Leike et al. to much more complicated processing tasks, like bid estimation of construction projects, would require an uneconomical amount of computer processing capacity and provide a slow response time to time-sharing work station users.

Accordingly, a need remains for an improved approach to the inputting of analog coordinate data into a computer for processing in accordance with instructions manipulated by a user of an interactive work station. This need is most acute in relation to time-shared computer systems with multiple user work stations, but also extends to stand-alone or single work station computers, such as microcomputers.

SUMMARY OF THE INVENTION

One object of the invention is, therefore, to improve the inputting of both analog and digital data into a computer.

A second object is to make it easy for a user, communicating interactively with a computer, interchangeably to input digital instructions and data and analog data for processing in accordance with the instructions and prestored programs.

Another object of the invention as aforementioned is to enable the user to input both analog and digital data via a single input device.

A further object is to minimize the computational burden of processing input data.

An additional object is to enable data to be input to a host computer from two input devices in parallel through a single I/O port.

Yet another object is to enable multiple users to input both analog and digital data into a time-shared computer, in a number up to the number of input ports.

The invention is a method and apparatus for inputting both analog and digital information to a host computer via a spatial coordinates digitizer. The digitizer is arranged on a flat work surface. Two-dimensional overlays or menuboards containing images of alphanumeric, function and other symbol keys provided on a computer keyboard are positioned within a portion of the surface area encompassed by the digitizer. An adapter or interface means is provided between the digitizer and the computer for converting the digitizer output data, input in the form of electrical signals defining digital coordinates, into a format mimicking that of a computer display terminal or keyboard. A drawing or blueprint containing graphic data to be entered into the computer is positioned adjacent the menuboards.

The interface means includes computer logic means and communication circuitry switchable under control of the computer logic means for receiving data signals from the digitizer, the host computer or, optionally, from a keyboard, and for transmitting data to the host computer or a display terminal. The interface means includes memory means operable by the computer logic means for storing and accessing data. Such data includes a coordinates map or lookup table of host-computer compatible electrical signals uniquely defining the keyboard symbols represented on the menuboards. The data stored in the memory means can also include formulas, functions or prestored programs accessible through the coordinates map for use by the computer logic means to pre-process input data.

The logic means is preferably programmed to test a data point input from the digitizer in a hierarchy: first to determine if it is a point on a key symbol of a primary keyboard, and, if not, on a secondary keyboard, and if neither, to treat the point as graphic data. Key symbols on the primary keyboard can include three categories of instructions: instructions which only affect the state of the interface logic means; instructions which are only transmitted to the host computer; and instructions which cause the logic means to process other data points, input from any of the keyboard, menuboard, or graphic data, and to provide a resultant answer. The input data and resultant answers can be displayed on the CRT and the user can control what data and answers are sent to the host computer.

Input data includes analog graphic data input from the drawing or blueprint through the digitizer and digital data input either from a keyboard or from the keyboard images via the digitizer. Instructions can likewise be input to the interface computer logic means and the host computer from either the keyboard or menuboard. Users find it advantageous to interact with the host computer solely through the digitizer. Data from the digitizer or keyboard, or resulting from pre-processing by the logic means, and instructions from either keyboard or keyboard image for the host computer, are transmitted from the interface means to the host computer as electrical signals in a single format compatible with the host computer via a single communications line.

In one embodiment, one or more users, each with a display terminal digitizer and adapter as above-described, are connected to a time-shared mainframe or minicomputer, utilizing only one I/O port for each user. Typical data flow is from the digitizer (and keyboard, if used) through the adapter to the computer and back through the adapter to a CRT display. In an alternate embodiment, the adapter is connected to the keyboard input port of a microcomputer. The data flow is like that described above except that the CRT display is driven directly from the microprocessor.

Both embodiments thus enable inputting both analog and digital data to a computer from a digitizer. They enable inputting data in parallel from a digitizer and another input device such as a conventional keyboard to a computer in a single computer-compatible format through a single input port. They also relieve the computer of substantial computational overhead. Such a system and method of operation is especially advantageous in automating bid estimation of construction.

The foregoing and other objects, features and advantages of the invention will become more readily apparent from the following detailed description which proceeds with reference to the accompanying drawings.

BRIEF DESCRIPTION OF THE DRAWINGS

FIG. 1 is a perspective view of an analog/digital data entry system according to the invention in use by an operator.

FIG. 2 is an adapter device as used in FIG. 1 to interface a digitizer to a computer in accordance with the invention.

FIG. 3 is a rear perspective view of the device of FIG. 2.

FIG. 4 is a rear elevational view of a conventional digitizer control device as used in the system of FIG. 1.

FIG. 5 is a first menuboard displaying images of various engineering and function symbols, numeric symbols, control keys and programmable function keys, as used in the system of FIG. 1.

FIG. 6 is a second menuboard displaying images of alphabetic and other common typewriter keys, as used in the system of FIG. 1.

FIGS. 10A and 10B are a schematic diagram of electronic computer, memory and communications circuitry of the interface device of FIG. 2.

FIGS. 11A through 11F are three-fourths reduced plan views of six examples of graphic data used in demonstrating the use and operation of the system of FIG. 1.

Figure 10A:
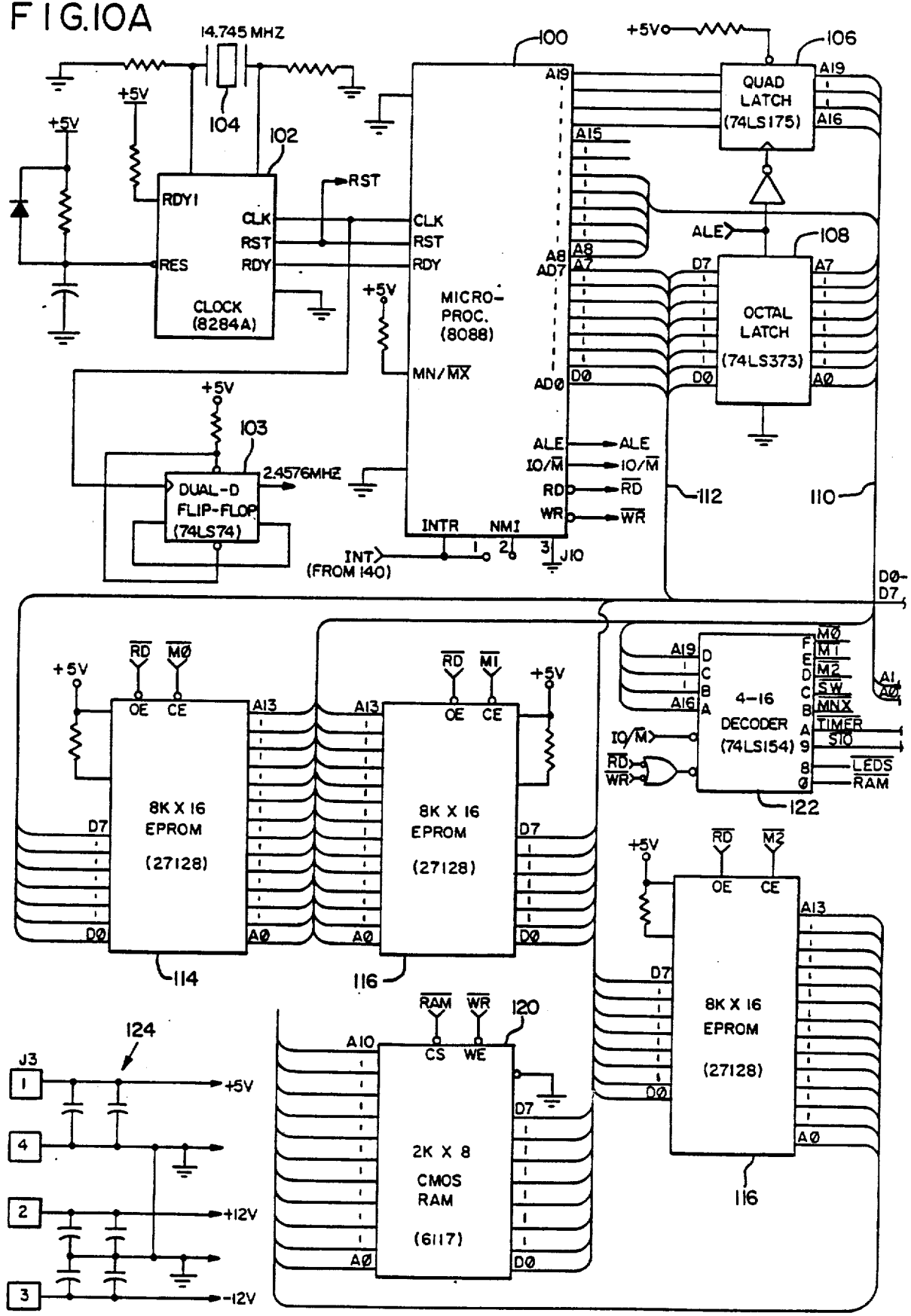

The Appendix hereto includes printouts of four computer programs stored in and utilized by the electronic circuitry of FIGS. 10A and 10B to control operation of the system in accordance with the invention, titled INIT, MAIN, PGM and MATH.

DETAILED DESCRIPTION

General Arrangement of Apparatus

Referring to FIG. 1, an analog/digital data entry system 20 according to the invention is mounted on a drafting table 22, which includes a flat work surface 24. The system includes a digitizer, composed of an L-frame coordinates-sensing array 26, a stylus 28 for designating points within the area defined by array 26, and a digitizer control unit 30, connected to array 26 via signal cable 32. At the work station, the system also includes a CRT display 36 and an adapter device 34 containing the interface circuitry shown in FIGS. 10A and 10B.

The digitizer is powered via an AC power cable 25 connected to control unit 30. The interface circuitry of adapter device 34 is provided +12 volt, -12 volt and +5 volt DC power by a conventional power supply (not shown).

Cursor 28 is connected by an electrical signal cable 27 to control unit 30 at connector 29 (FIG. 4). Multi-conductor electrical signal cable 32 connects sensor array 26 to control unit 30 at microphone connector 31 (FIG. 4). Another multi-conductor cable 33 connects control unit 30 at RS-232 output connector 35 (FIG. 4) to adapter unit 34 at digitizer input connector 37 (FIG. 3).

Figure 8:
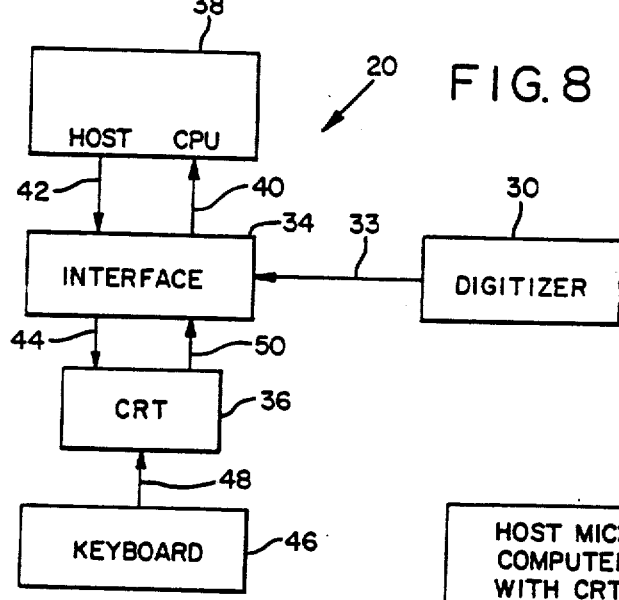
FIG. 8 is a block diagram of one arrangement of the system of FIG. 1 for inputting digitizer data to a time-shared host computer from one of multiple terminals, each with a dumb CRT display and keyboard.
Figure 9:
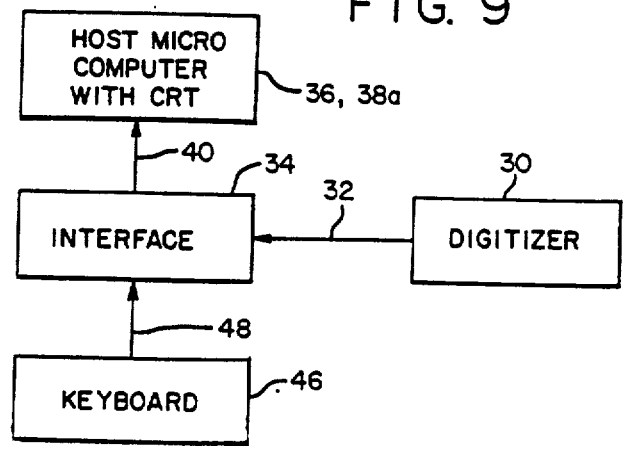
FIG. 9 is a alternate arrangement of the system of FIG. 1 as used to input digitizer data to a personal computer via its keyboard input port.

Referring to FIG. 8, in the preferred embodiment, for each work station the interface circuitry of adapter 34 is connected via connector 39 (FIG. 3) to a single I/O port of a host computer 38 through serial (RS-232) input and output lines 40, 42. CRT display 36 is connected to the interface circuitry via output line 44, for displaying information transmitted from the computer. An optional keyboard 46 is connected via lines 48, 50 through the CRT display unit to the interface circuitry of adapter 34. Any of the Texas Instruments 990 or Business System series minicomputers and terminals (except the Model 911 terminal) can be used compatibly with the interface circuitry of FIGS. 10A and 10B and the programs in the Appendix. In an alternative embodiment, shown in FIG. 9, the host computer is a microcomputer 38a, such as a personal computer with a built-in CRT display driven directly from the microcomputer. In either embodiment, connection of lines 44, 50 or line 48 is made to the adapter at terminal connector 41 (FIG. 3).

The serial data transmission rate from control unit 30 to adapter 34 is set by DIP switches 43 (FIG. 4) and from the adapter to the computer by DIP switches 45 (FIG. 3). The front panel of adapter 34, shown in FIG. 2, includes ALIGN, LOCATE MENU, and READY mode indicators 47, 49, 51 and a SELECT button 53 for the user to switch among modes.

Returning to FIG. 1, system 20 further includes a pair of menuboards 52, 54, best seen in FIGS. 5 and 6, displaying images of various portions of keyboard 46 and additional features. Also positioned on the work surface within the area defined by L-frame sensor array 26 is a blueprint 56 containing graphic data 58 to be entered by the user through the digitizer into the host computer via adapter 34 for manipulation in accordance with a suitable host computer program. Primary menuboard 54 includes images of various control keys 60, numeric and arithmetic function keys 62, that mimic those conventionally used on a computer terminal keyboard 46. General purpose, user-programmable function keys 64 are also provided. Finally, menuboard 54 includes engineering scaling keys 66 and preprocessing or measurement function keys 68, specifically applicable to construction bid estimation applications. Secondary keyboard 52 includes images of upper case alphabetic keys 70 and other standard typewriter keys 72 and LOG ON/OFF keys 74. Through operation of the digitizer and adapter, described hereinafter, system 20 enables any function normally performed by a terminal keyboard to be mimicked by designating the appropriate keys on the menuboards using stylus 28.

Both of the menuboards include alignment indicia in the form of four small circles 76, 77, 78, 79 rectangularly arranged in the corners of each menuboard. The circles are consecutively numbered counterclockwise starting in the upper left corner and are spaced farther apart on menuboard 54 than on menuboard 52. These indicia are used in the Locate Menu mode (indicator 49 in FIG. 3) to indicate to the electrical logic circuitry of the system where the menus are located. The programs listed in the Appendix and the circuitry of FIGS. 10A and 10B provide a coordinates map associated with these indicia by which a unique electrical signal set stored for each key image can be accessed.

The two menuboards can be located anywhere in the work area defined by L-frame 26, so long as the top edge of each menuboard (denoted by indicia 76, 77) faces and is parallel to one of the coordinates array arms. No elevated obstructions should be placed between the menuboards and the array arms. Prior to locating the menus, arms 26 are initially aligned on surface 24 to assure that they are perpendicular with the assistance of an alignment guide 80, containing three +-shaped indices, labeled A, B and C, and defining two lines intersecting at a right angle at index B.

By way of example, to illustrate one application of the present invention, the host computer is supplied with a construction bid estimation program such as the ACCUBID computer program published by Timberline Systems, Inc. of Tigard, Oreg. For use in such example, blueprint data 58 shows a portion of a building to be constructed. The scaling keys 66 and special function keys 62, such as length of a line between two points and areas of various common geometric patterns, are provided to interact with the bid estimation program. The computer programs in the Appendix hereof include routines specifically adapted to execute the functions of such keys in the manner required by the aforementioned bid-estimating program, as well as routines to carry out the more basic functions of the invention, as further described hereinafter. The programs are written to run on an Intel 8088 microprocessor as shown in FIGS. 10A and 10B, but can be adapted within the invention to operate in other microprocessors.

Figure 7:
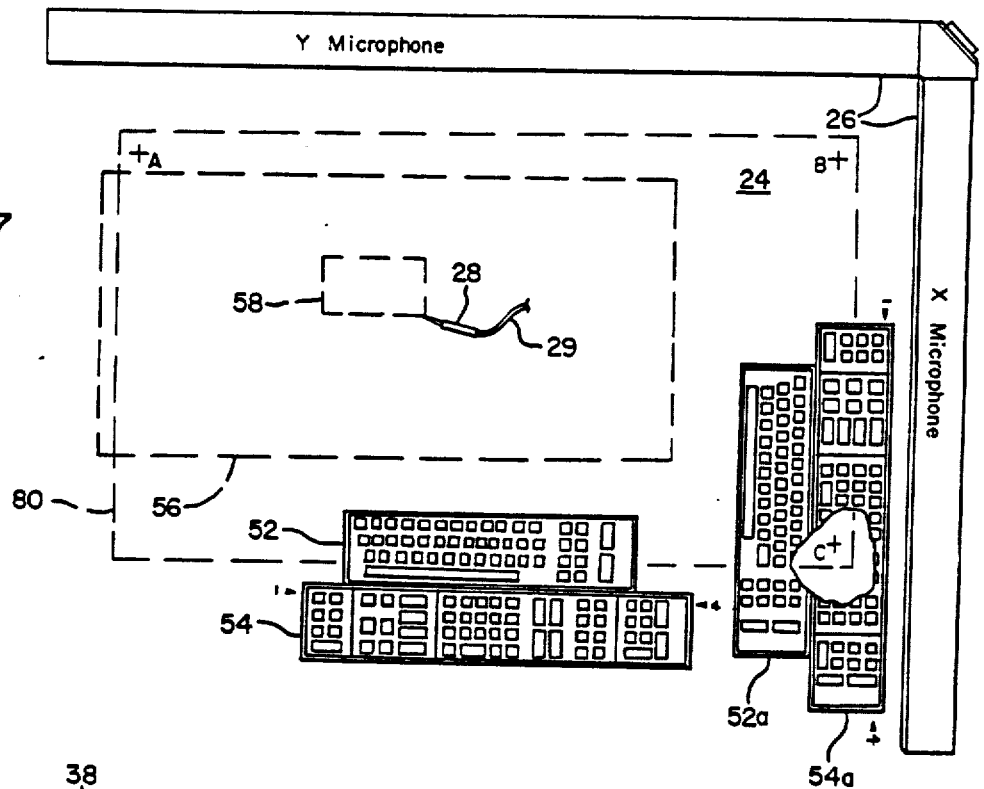
FIG. 7 is a top plan view showing two alternative arrangements of the work table of FIG. 1.

The present example of system 20 employs a Model GP-8 Sonic Digitizer, manufactured by Science Accessories Corporation of Southport, Conn. In such system, the L-frame sensor array 26 is an acoustic microphone array. Control unit 30 initiates energy pulses which are converted into sonic waves by the stylus 28. The digitizer measures the times required for the sonic energy emitted from the stylus to reach the X and Y sensors of the microphone assembly and converts these times into distance measurements in digital form. Control unit 30 outputs the coordinates of each data point in a serial ASCII format in the following form: SXXXXSYYYYFCL (English) or SXXXXSYYYYFCL (metric). The symbols "S" are the sign of each coordinate relative to a predetermined origin. The "X" digits represent the X coordinates along the X microphone and the "Y" digits represent the Y coordinates along the Y microphone (FIG. 7). Symbol F is a flag digit output when the system is operated in a stream or continuous mode such as when outlining irregular shapes. Characters "C" and "L" are carriage return and line feed characters.

As mentioned above, coordinates data output in the foregoing digital format over cable 33 from RS232 connector 35 to digitizer connector 37, at a transmission rate set by DIP switches 43 on control unit 30. The proper setting for such switches for use with the programs in the Appendix, counting from left to right, is as follows:

| 1 | 2 | 3 | 4 | 5 | 6 | 7 | 8 | 9 | 10 |
|---|---|---|---|---|---|---|---|---|---|
| up | up | down | up | down | down | up | up | up | up |

The adapter transmission rate is set to match the baud rate of the terminals associated with the particlar model of host CPU that is being used. The ACCUBID estimating software is presently implemented on the various models of Texas Instruments computers, each having a unique associated sysgen. Following is a table of the most commonly implemented sysgens and their associated baud rates:

| Timberline Systems Standard Sysgens | |
|---|---|
| Sysgen | Baud Rate |
| 1. BSLDR | 19,200 |
| 2. BSDK1 | 19,200 |
| 3. BS303 | 9,600 |
| 4. BS307 | 9,600 |
| 5. BSTP1 | 19,200 |
| 6. BSTPX | 19,200 |

If system 20 is implemented in a remote terminal, communicating with the host computer through a modem, the baud rate at dip switch 45 is set to match the baud rate of the modem. The following table lists the various baud rates provided by the circuitry of FIGS. 10A and 10B and the associated settings for dip switch 45:

| Digitizer Interface Baud Rate Settings | | | | | | | | |
|---|---|---|---|---|---|---|---|---|
| Baud Rate | Switch Number | | | | | | | |
| | 1 | 2 | 3 | 4 | 5 | 6 | 7 | 8 |
| 9,600 | up | up | up | up | up | up | up | up |
| 19,200 | down | up | up | up | up | up | up | up |
| 9,600 | up | down | up | up | up | up | up | up |
| 4,800 | up | up | down | up | up | up | up | up |
| 2,400 | up | up | up | down | up | up | up | up |
| 1,200 | up | up | up | up | down | up | up | up |

Interface Circuitry

Referring to FIGS. 10A and 10B, the interface circuitry of adapter 34 includes a microprocessor and supporting circuitry shown in the upper portion of FIG. 10A, permanent and temporary memory circuitry shown in the lower portion of FIG. 10A, and input/output and user interface circuitry shown in FIG. 10B.

In FIGS. 10A and 10B, part numbers are listed parenthetically for specific commercially available circuit devices used in an operative example of interface circuit 34, but the invention is not so limited. Conventional terminal nomenclature for such devices is shown in the Figures to aid in assembly of the circuit. Power inputs are shown but generally not described.

Referring first to the upper portion of FIG. 10A, the logic circuitry shown therein includes a microprocessor 100, a clock generator 102 and associated crystal 104 for cycling the microprocessor. A flip-flop 103 connected to the clock output line of clock 102 provides a 2.4576 megahertz clock output signal which is used in the circuitry of FIG. 10B. Also connected to the microprocessor is address and data interface circuitry including a quad latch 106 and an octal latch 108. The data and address interface circuitry provides parallel address bus 110, containing address lines designated individually as A0 through A19, and parallel data bus 112, containing lines designated individually as D0 through D7, which connect the logic circuitry to the memory circuitry shown in the lower portion of FIG. 10A. The microprocessor also provides various control signal output lines (ALE, IO/$\overline{M}$, $\overline{RD}$, $\overline{WR}$).

The memory circuitry includes three 16K by 8-bit read only memory chips 114, 116, 118. The programs contained in the Appendix are stored in these memory chips. The memory circuitry also includes a 2K×8-bit random access memory 120, which is used by the microprocessor, as a scratch pad memory, in executing the Appendix programs, to receive incoming coordinates data from the digitizer and to temporarily hold output data pending transmission.

A 4-to-16 decoder 122 controls interaction between the logic circuitry and the memory circuitry and provides decoder control signals to the circuitry of FIG. 10B. The decoder receives control signals from microprocessor output lines IO/M, RD and WR and address lines A16 through A19. The decoder control signals are identified in FIG. 10A by abbreviations adjacent the input and output lines of each element, as will be readily understood by those skilled in the art.

In the lower left portion of FIG. 10A, power supply interface circuitry 124 is illustrated which provides the various filtered DC power levels required by the circuitry of both FIG. 10A and FIG. 10B. This circuitry is connected to a DC power supply by means of a four-contact junction connector designated J3 in the drawing.

Referring now to FIG. 10B, all data transmissions originating either directly or indirectly from the digitizer pass through a serial input/output circuit 130, otherwise referred to as a universal asynchronous receiver transmitter. Coordinates data is input serially from the digitizer via contacts 1 (DIG TXD) and 2 (DIG RTS) of junction connector J2. Contacts 1 and 2 are connected to digitizer contact 37 (FIG. 3). Operation of circuit 130 is controlled in part by read (RD) and write (WR) control signals from microprocessor 100 and a reset signal (RST) from clock generator 102. The circuit is clocked at input CLK by the clock output from flip-flop 103. Parallel data lines D0 through D7 connect the serial input/output circuit through bus 112 to microcomputer 100. Address line A0 is also connected to circuit 130 at input C/D.

Transfer of data from circuit 130 into the memory circuitry is controlled by the microprocessor via chip select signal SIO from decoder 122. Incoming serial data from the digitizer is accumulated to build up a parallel 8-bit word. Periodically, the microprocessor polls circuit 130 by reading a status bit in a status word via address line A0 in conjunction with read and write signals (RD and WR). The status bit indicates presence of a complete word in an internal buffer. The word is then transferred to the microprocessor via data lines D0-D7 and the microprocessor places it in RAM 120.

Serial data is output from circuit 130 through transmit data output line TXD. When a parallel word is received from the microprocessor, another status bit in the above-mentioned status word is set. At this time, circuit 130 serially transmits the bits of the parallel word. The RTS output signal is a general purpose one-bit inverting output port. It is programmed by microprocessor 100 to indicate the correction of the interface circuitry to the host computer.

Connected to circuit 130 by transmit and receive clock lines TXC and RXC, is a counter/timer 140, which includes three clock circuits. The counter/timer has data lines D0 through D7 connected to bus 112 and address lines A0 and A1 connected through bus 110 to octal latch 108 (FIG. 10A). The clock output from flip-flop 103 is connected to three clock inputs (CLK0, CLK1, CLK2) of the counter/timer. The aforementioned TXC and RXC clock lines are connected to two clock outputs (OUT0, OUT1) of the counter/timer. A third clock output (OUT2) provides an interrupt signal to microprocessor 100. Decoder 122 provides a chip select signal (TIMER) to circuit 140 at input CS. The microprocessor also provides read and write signals to the counter/timer at inputs RD and WR. At power up, the microprocessor initializes the counter/timer 140 to transmit an interrupt signal a predetermined interrupt rate (e.g., once per millisecond). This interrupt signal is used as a time base to initiate various periodic functions, such as checking the status of select button 53 and checking for the presence of incoming data in serial I/O circuit 130.

A hexadecimal buffer 142 has five data lines D1 through D5 connected to bus 112 and has five input lines separately connected to junction contacts in junction strip 144. These contacts are connected in turn to baud rate dip switch 45 (FIG. 3) on the back panel of adapter 34. The settings on the dip switches are input to microprocessor 100 through the hex buffer via data lines D1 through D5 to control the serial transmission rate of data from circuit 130 on output line TXD. This control is effected through counter/timer 140, via clock outputs OUT0 and OUT1, which transmit the selected baud rates to serial I/O circuit 130 via the TXC and RXC clock lines.

Output lines TXD and RTS from circuit 130 are connected to transmission switching circuitry, shown at the top of FIG. 10B, as inputs 1B and 1A, respectively, to a pair of 2×1 multiplexers 150, 152. Multiplexer 150 has a pair of output lines extending through line drivers to contacts 10 and 11 on junction strip J2 for connection to the host computer 38, as shown by line 40 in FIG. 8. Multiplexer 152 has an output line connected through a line driver to another contact 7 on junction strip J2 for connection to CRT display 36 as shown by line 44 in FIG. 8. Multiplexer 150 also has a pair of input lines, extending from contacts 4 and 5 on junction strip J2 to inputs 0A and 0B, for inputting serial data from the CRT keyboard through the multiplexer to the host computer, as shown by line 50 in FIG. 8. Similarly, a pair of input lines are connected via contact 8 and 9 of junction J2 to inputs 0A and 0B of multiplexer 152, to transfer data from the host computer to the CRT display, as shown by line 42 in FIG. 8. Junction J2 contacts 4, 5, 6 and 7 are connected to terminal connector 41 (FIG. 3) and contacts 8, 9, 10, 11 and 12 are connected to computer connector 39 (FIG. 3).

A quad latch 154 has control lines 156, 158 connected to the 0 inputs of multiplexers 150, 152, respectively. The quad latch has data lines D0 through D3 connected to bus 112 and a chip select signal (MUX) from decoder 122, through which microprocessor 100 controls switching of the transmission path of data through multiplexers 150, 152. Under direction of the computer program in the Appendix, multiplexer 150 determines whether the host computer receives data from the keyboard or from serial I/O circuit 130 and multiplexer 152 enables CRT display of data alternatively from the host computer or from the serial I/O circuit 130. Multiplexer 152 is not required in the FIG. 9 embodiment, because the host microcomputer 38a directly controls the CRT.

Serial I/O circuit 130 is used to receive information from one source and transmit such information as is or in processed form, to another device. In combination with the switching circuitry 150, 152, 154, the information transmitted from the serial I/O is communicated alternately with information transmitted from one or more other sources to one or more destinations.

As mentioned above with reference to FIG. 2, adapter 34 includes a select button 53 and align, locate menu and ready indicators 47, 49, 51. The select button is shown in FIG. 10B, connected as an input through contacts 7, 8, on a connector J1 to a hexadecimal buffer 160. Buffer 160 is controlled via a chip select signal (SWITCH) from decoder 122 and has a data line D0 connected to bus 112. Under direction of the computer programs in the Appendix, the microprocessor periodically polls buffer 160 to determine whether the select button has been pressed. LED indicators 47, 49, 51 are connected to connector J1 at contacts 1, 3, 5, to which extend three control signal lines (READY, LOCATE, ALIGN) from a quad latch 162, and to +5 volt DC power at contacts 2, 4, 6. Quad latch 162 has three data lines D0, D1 and D2 connected to bus 112 and a chip select signal (LEDS) from decoder 122, controlling operation of the indicators.

General Operation

Start-Up

To use system 20, the L-frame array sensors 26 are positioned on work surface 24 and the various electrical connections described above are made to control unit 30, adapter 34, CRT 36, host computer 38 and stylus 28. Menuboards 52, 54 and graphic data 56 are positioned conveniently for the user, for example, as shown in FIG. 7. To keep the stylus cable out of the way of the graphic data and to minimize interference from the cable with the array sensors, it is best to position control unit 30 to the right of or on a shelf under the front edge of the drafting table. The preferred embodiment being implemented with an acoustic digitizer, control unit 30 compensates for air temperature changes and so must be located in an area that is the same temperature as the work surface.

Once the system is assembled, it is turned on in the following order. First, the baud rates are set at dip switches 43, 45 on control unit 30 and adapter 34. Second, control unit 30 and adapter 34 are turned on at their respective power switches, turning on the power indicator on unit 30 and the locate menu indicator 49 on adapter 34. Next, CRT terminal 36 is turned on and given time to perform a conventional self-test routine. Terminal keyboard 46 is then used to log on to host computer 38 and to access the program in the host computer than is to be supplied graphic data through the digitizer, such as the ACCUBID bid estimation program main menu.

Next, the select button 53 on the front panel of adapter 34 is depressed to switch the digitizer to the align mode, as indicated by align indicator 47. In the align mode, the user interacts with the programs of the Appendix to align the digitizer's sensor arrays or arms 26 and the menuboards. If different horizontal and vertical scales are to be used simultaneously, blueprint 54 is also aligned with sensor arrays 26. Once the adapter is in the align mode, sets of coordinates designated by the user within the work area can be transmitted directly from the digitizer to the CRT terminal. The user should access the main menu in the host computer program whenever any action is taken in the alignment mode, to avoid loss of data or communications with the host computer.

The digitizer's arms are aligned by placing a rectangular alignment guide 80 inside the work surface, spaced two inches from each arm. Coordinates A, B and C on the alignment guide are input to the interface circuitry so as to define horizontal and vertical lines and test whether sensor arrays 26 are parallel to the lines. Stylus 28 is used to designate to the adapter microprocessor the location of points A, B and C relative to the digitizer. As points A, B and C are designated with the stylus, their X, Y coordinates will appear on the CRT display. If the sensor arrays are perpendicular and aligned with guide 80, the Y coordinates of points A and B should match, as should the X coordinates of points B and C. If they do not match, it is necessary to move either the alignment guide or the digitizer arms and then test again until the proper match is obtained. In English units, the X and Y coordinates are shown in increments of 0.01 inches. For the digitizer to work properly, the difference between coordinates displayed on the screen after making the points on the alignment guide should be no greater than 0.05 inches, and preferably the coordinates should match exactly. Once the digitizer arms are aligned, this procedure should not have to be repeated if the digitizer is not moved.

Next, after removing guide 80, the menuboards 52, 54 are aligned with the digitizer sensor arrays. As mentioned above, the menuboards can be located anywhere within the digitized area so long as the top edge of each menuboard faces and is parallel to one of the sensor arrays. The menuboards should be positioned so that the one most often used is the most readily accessible. The menuboards should not be positioned within the area required for the graphic data. Primary menuboard 54 is positioned first. Once it is positioned, points 76 and 78 are marked using the stylus. If the menuboard is positioned horizontally, the user compares the Y coordinates displayed on CRT 36 to determine whether they match. If the menuboard is positioned vertically, as illustrated by menuboard 54A in FIG. 7, the X coordinates are compared to determine whether they match. If the coordinates do not match, the menuboard is shifted by an amount indicated by the difference in coordinates and points 76, 77 are again marked. Once the coordinates are matched, transparent tape is used to secure the menuboard to the drafting table. The same procedure is used to align secondary menuboard 52.

Once the menuboards are aligned on the work surface in positions parallel to one of the sensor arrays, they must be located so as to register their position in the memory of digitizer interface 34. The location of the four reference points or indicia on each menuboard must be supplied to the digitizer interface. These points are used by the interface logic to calculate the location of the marks subsequently made on the menuboards during operation and respond appropriately. Each time the alignment indicia on one of the menuboards are marked using the stylus, the coordinates of those indicia are displayed on CRT 36. The programs in the Appendix also utilize these coordinates to establish the location of a coordinates map relative to the coordinates of indicia 76, 77, 78, 79 denoting the addresses of each of the stored functions corresponding to the keys displayed on menuboard 54. Such a coordinates map is likewise established for menuboard 52. Secondary menuboard 52 is located first. Under the program contained in the Appendix, the microprocessor logic will switch to the READY mode as soon as primary menuboard 54 is located. First, select button 53 on the front panel of adapter 34 is pressed, which will turn on the locate menu light 49. Next, stylus 28 is used to mark each of points 76, 78, 79 and 77 (numbered 1, 2, 3, 4) in numerical order, on menuboard 52. The same procedure is repeated for menuboard 54.

The status indicators 49, 51 are then checked to determine whether the ready light 51 is on, which indicates that the interface circuitry of adapter 34 has recorded the position of the menuboards. If the align light 49 is still on, it means that the interface circuitry did not record the position of the menuboards, in which case the locate menu procedure is repeated. If the menuboards are subsequently moved, they must be realigned by following the foregoing procedures for aligning and locating the menuboards.

Display Information

System 20 uses a status or value line at the bottom of the CRT display screen 36 to display information, measurements, and prompts in alphanumeric form. The Value line appears whenever the interface circuitry is in the Ready mode. The Value line provides a visual verification of entries and measurements when using the digitizer, which appear in one of four different formats.

The first format is the display scale format. After locating the menus, with the interface circuitry in the READY mode, the CRT will automatically display the scale on the Value line. Since no scale has been entered up to this point, the Value line will appear as follows:

| PLAN SCALE | english xxxx/xxxx | COUNT SCALE | 1/1 |
|---|---|---|---|

The value line will display the scale in this format at the conclusion of any scale entry and whenever the display scale key is marked on menuboard 54. The plan scale is labeled using either an English scale, a metric scale, or an auto scale. When different horizontal and vertical scales are entered, the value line will show both scales. For example, after horizontal scale of ¼ inch and a vertical scale of 1/20 inch has been entered, the value line will appear as follows:

| PLAN SCALE | english | HOR | 1/4 | VERT | 1/20 | COUNT SCALE | 1/1 |
|---|---|---|---|---|---|---|---|

The next format to be displayed is the prompt format. The user marks either the ENG SCALE, METRIC SCALE or AUTO SCALE key on menuboard 52 to begin entering a scale. The value line responds by displaying a prompt for the designated scale, as follows:
Enter English scale The third format is the Operational format, in which the current measurement function is displayed on the left. The current value will appear in the center, and the total value will appear on the right. If a measurement function is not being performed, the value line will indicate that the interface circuitry is in the Ready mode by displaying a line similar to the following:

| READY | CURRENT VALUE | .0000 | TOTAL VALUE | .0000 |
|---|---|---|---|---|

If the user is using the Length-single measurement function on menuboard 54, the Value line appears as follows:

| LENGTH - | Single | CURRENT VALUE | .0000 | TOTAL VALUE | .0000 |
|---|---|---|---|---|---|

The Constant format is displayed when the numeric keypad of menuboard 54 is used to enter numbers and arithmetic or other operators for manipulating the total value. When a number is entered, the value line will reformat to the Constant format. For example, if the area of a window is measured as 4.5127 and is to be multiplied by the constant six, when the number six is entered using the keypad of menuboard 54, the Value Line is reformatted as follows:

| CURRENT VALUE | 6.0000 | TOTAL VALUE | 4.5127 |
|---|---|---|---|

When the multiplication operator (*) is entered through menuboard 52, the value in the total value field (4.5127) will be multiplied by the value in the current value field (6.0000), and the product will be displayed as the total value on the Value Line as follows:

| CURRENT VALUE | .0000 | TOTAL VALUE | 27.0762 |
|---|---|---|---|

The Scaling Keys

The scaling keys 66 operate as follows:
ENGLISH SCALE tells the digitizer interface (DI) that the blueprint is scaled in English units (e.g., ¼"=1').
METRIC SCALE tells the DI that the blueprint is scaled in metric units (e.g., 1 cm=1 m).
COUNT SCALE tells the DI that the scale the user is entering is the count scale.
AUTO SCALE tells the DI to set the scale automatically from an existing scale drawing.
HORIZONTAL and VERTICAL differentiate between the horizontal and vertical scales on the blueprints, in the event that they are not the same.
DISPLAY SCALE displays the current scale at the bottom of the terminal display and is used to verify that the correct scale is being used by the DI. It will also clear a partial scale that is not yet registered with the DI, in which case, the DI will revert to using the last complete scale that was registered.

Scaling

The scale of the blueprints must be registered with the interface circuitry and once a scale is registered, that scale will continue to be used by the programs of the Appendix as long as system 20 is turned on. If all the blueprints to be digitized use the same scale, the scale will be set once. Whenever, the scale is to be changed, the same procedure is followed as that used for setting the scale the first time. Scales can be set or changed whenever the ready light 51 on the front panel of adapter 34 is on.

Dimensional scales are registered as ratios of blueprint dimensions to actual size, in either English or metric units. An architectural drawing with, e.g., a ¼ inch scale, is entered as ¼. An engineering scale of, e.g., 1/2000, where one inch equals 2,000 feet, is entered as 1/2000. A count scale can be registered in conjunction with the plan scale and can be used alternately with a plane scale without rescaling in the system. A count scale is registered as a ratio of marks to counted items (marks/counted items). For example, if two electrical outlets are needed for every three walls, a scale of 3/2 is entered. For every three walls marked using the stylus, the interface circuitry will count two items. System 20 provides three scaling options: first, standard blueprints with only one scale; second, blueprints with different horizontal and vertical scales; and calculated scales, e.g., for use with off-scale blueprints or to verify accuracy of the blueprints. The procedures for implementing each of these options is detailed below.

Option 1

Standard Blueprints Using One Scale

1. Mark either the ENG SCALE Or the METR SCALE key. This tells the DI whether the blueprint is scaled in inches/feet or in centimeters/meters. Either "Enter English Scale" or "Enter Metric Scale" will be displayed on the Value Line.
2. Enter the numerator of the scale. (If the scale is ¼ inch, enter 1; if the scale is 1/2000, enter 1.)

3. Enter a slash (/).
4. Enter the denominator of the scale. (If the scale is ¼ inch, enter 4; if it is 1/2000, enter 2000.)
5. To terminate the scale entry and send it to the DI, mark DONE.
6. Whenever the DI is turned on, the Count Scale automatically defaults to 1/1 and will stay 1/1 until the user changes it. If the user needs to enter a different count scale, mark COUNT SCALE. If not, skip to step 11.
7. Enter the number of marks to be used in the scale. (If the user wants to enter the scale of 3 walls marked to 2 outlets counted, as in the preceding example, enter 3.)
8. Enter a slash (/).
9. Enter the number of units to be used in the scale. (For the same example, you would enter 2.)
10. To terminate the scale entry, mark DONE.
11. The current scale will automatically be displayed on the Value Line. Verify that the scale is correct. If it is not, repeat steps 1 through 10 to enter the correct scale.

Option 2

Blueprints with Different Horizontal and Vertical Scales

If using blueprints, such as some mechanical blueprints, that have different horizontal and vertical scales, the blueprints must be aligned with the digitizer before scaling.

Each page of a blueprint that uses different horizontal and vertical scales must be aligned separatedly. To align a page of blueprint that uses different horizontal and vertical scales so as to make area and diagonal measurements based on the two different scales, the following procedure must be followed. First, press the select button 53 until align light 47 is on. Second, place the blueprint on the drafting table so that all the take-off information is within the digitized work area, but not covering the menuboards. Third, using the stylus, mark two ends of a horizontal line on the blueprint and compare the Y coordinates on the two sets of coordinates that scroll onto the terminal display screen. If the Y coordinates do not match, shift the blueprint and repeat marking the points until the Y coordinates match, as described above in discussion of use of the alignment guide. Once the Y coordinates match, the blueprint is aligned and can be taped to the table.

After the blueprint is aligned, the user can enter the different horizontal and vertical scales by following these steps.

1. Mark either the ENG SCALE or the METR SCALE key. This tells the DI whether the blueprint is scaled in inches/feet or in centimeters/meters.
2. Mark either the HORIZ or the VERT key to set the horizontal or vertical scale. If the horizontal and vertical scales on the blueprint are different, the user must enter each scale separately. Because of this, the user can only mark one of these at a time.
3. Enter the numerator of the scale. (If the scale is ¼ inch, enter 1; if the scale is 1/2000, enter 1.)
4. Enter a slash (/).
5. Enter the denominator of the scale. (If the scale is ¼ inch, enter 4; if the scale is 1/2000, enter 2000.)
6. To terminate the scale entry and send it to the DI, mark DONE.
7. To enter the vertical scale, repeat steps 1 through 6.
8. When the DI is first turned on, the Count Scale automatically defaults to 1/1 and will stay 1/1 until the user changes it. If the user needs to enter a different count scale, mark COUNT SCALE. If not, skip to step 12.
9. Enter the number of marks to be used in the scale. (If the user wants to enter the scale of 3 walls marked to 2 outlets counted, as in the earlier example, enter 3.)
10. Enter a slash (/).
11. Enter the number of units to be used in the scale. (For the same example, enter 2.)
12. The current scale will automatically be displayed at the bottom of the terminal display screen. Verify that the scale is correct. If it is not, repeat steps 1 through 11 to enter the correct scale.

Option 3

Calculate a Scale Automatically

The Auto Scale option will automatically set the scale from a specific dimension that you provide from the blueprint. This eliminates errors that might occur because of blueprint reproduction or shinkage and allows you an option for even greater takeoff accuracy.

1. Mark AUTO SCALE. "Enter Auto Scale" will be displayed on the Value Line.
2. If using mechanical blueprints that have different horizontal and vertical scales, mark HORIZ and follow the preceding instructions on alignment for working with different horizontal and vertical scales. For standard prints with one scale, skip this step.
3. Select a straight line that represents a known length. If the horizontal and vertical scales are different, a horizontal line must be used when you are setting the horizontal scale, and a vertical line when you are setting the vertical scale.
4. Use the stylus to mark each end of the line.
5. Enter in feet or meters the length of the actual distance, as detailed on the blueprint. This entry can contain a decimal point with one digit to the right of the decimal point, so you can enter 12'6" as 12.5.
6. To terminate the scale entry, mark DONE.
7. If the horizontal and vertical scales are different, repeat steps 1 through 6, mark VERT, and enter the vertical scale.
8. The scale will automatically be displayed at the bottom of the terminal display screen as the ratio of the actual distance in inches between the two marks made on the blueprint to the numeric length that the user entered.
9. To verify the scale, complete the following steps:
   Mark LENGTH-SINGLE on the Primary Menuboard.
   Mark both ends of the line on the blueprint.
   Mark [+].
   Compare the Total Value on the Value Line to the length given on the blueprint.
   If the scale is incorrect, repeat steps 1 through 8, above.
10. When the DI is first turned on, the Count Scale automatically defaults to 1/1 and will remain 1/1 until changed. If the user needs to enter a different count scale, mark COUNT SCALE. If not, skip to step 16.
11. Enter the number of marks to be used in the scale. (If the user wants to enter the scale of 3 walls marked to 2 outlets counted, as in our earlier example, enter 3.)
12. Enter a slash (/).

13. Enter the number of units to be used in the scale. (For the same example, the user would enter 2.)
14. To terminate the Count Scale entry, mark DONE.
15. The current scale will automatically be displayed on the Value Line. Verify that the Count Scale is correct. If it is not correct, repeat steps 10 through 14.
16. To return the Value Line to the READY mark, mark CLEAR.

Once a scale has been entered, the operator completes the start-up procedure by logging onto the host computer 38, by using either the menuboard log-on key, or by using the terminal keyboard 36. System 20 is then ready to use for taking graphic data off of a blueprint and entering instructions off the menuboards.

Menuboard Functions

The programs in the Appendix provide the user with a variety of capabilities, accessible through the menuboards. The following is a description of the operation of the menuboard key functions. All of the menuboard keys are marked by pressing the stylus to the area within the outline of the desired key. If a mark is made outside the outline of the key, the mark will be read as the key closest to the mark.

Measurement Function Keys

The Measurement Function keys are used to give instructions to the DI regarding the type of measurement to be made. When one of the Measurement Function keys is marked, the DI will expect the coordinates to be presented in a specific manner so that it can use them to perform a specific calculation. For example, if AREA-TRIANGLE is marked, the DI will expect three marks. When three points are marked, the DI will connect them to form a triangle and will then calculate the area of that triangle.

Marking a Measurement Function key will also place the stylus either in spot mode or in trace mode, as appropriate to the selected function. In spot mode, which is represented by the broken lines that connect the dots on the keys, the stylus will click once each time the tip is pressed. In trace mode, which is represented on the keys by a solid line that connects the dots, the stylus will click repeatedly when the tip is pressed. In trace mode, as the user traces the outline on the blueprint, the stylus will make a series of marks very close together, which the DI connects with straight lines.

AREA-FREEFORM (trace mode) calculates the area of a closed shape that is defined by the user marking an outline on the blueprint. If the outline is not completely closed, the digitizer will connect the first and last marks that were used to define the area.

AREA-TRIANGLE (spot mode) calculates the area of a triangle that is defined by any three marks that are made on the blueprint.

AREA-RECTANGLE (spot mode) calculates the area of a rectangle, square, or parallelogram that is defined by marks made in three of its corners on the blueprint.

LENGTH-SINGLE (spot mode) calculates the straight-line distance between any two marks made on the blueprint.

LENGTH-MULTIPLE (trace mode) calculates the length of any continuous line or series of lines on the blueprint.

COUNT (spot mode) counts the number of marks made on the plan by the stylus.

DONE terminates the current measurement, sends the Current Value to the Total Value, and sends the Total Value to the field the cursor is occupying on the terminal display screen. DONE also terminates the current measurement function and moves the cursor to the next field.

SEND does the same thing as the DONE key, but without moving the cursor to the next field on the terminal display screen. It is used primarily to input values from the digitizer into the ACCUBID or other on-screen calculator or into custom formulas in the host computer program, e.g., prestored programs accessed, by marking one of the general function keys F1-F8 in group 64.

CLEAR erases the Total Value and the Current Value shown at the bottom of the terminal display screen, without sending a value to the terminal. It also clears the current measurement function.

CLEAR LAST clears the Current Value before it is added to the Total Value. It will also erase any marks that have been made but not terminated with a sign or another terminator. After a Current Value has been added to the Total Value, it can be substracted from the Total Value only by repeating the measurement and terminating it with the opposite sign, or by clearing the Total Value and beginning the entire measurement over.

Keyboard Mimics

The keyboard Mimic section of the Primary Menuboard contains keys that function exactly like the corresponding keys on the terminal keyboard. Any function normally performed on the terminal can be mimicked by the keys on the menuboard.

However, four keys in this section are not exactly keyboard mimic keys. The ON and OFF keys on the far right of the Primary Keyboard are keys specific to the digitizer. And although the + and − keys function like the + and − keys on the keyboard, when they are marked while you are using a measurement function, they have additional functions specific to the digitizer.

When using one of the measurement functions and the DI is expecting a command or figure from the menuboard, the terminal keyboard cannot be used to enter the command or figure. However, the menuboard and the terminal keyboard can be used interchangeably at any other time.

OFF deactivates the entire digitizer grid, except for the ON key. It is used when the user wants to use the optional ballpoint tip of the stylus to make notes or marks on the blueprint and does not want them to be digitized. It will clear the Current Value and terminate the measurement function but will not clear the Total Value.

ON reactivates the digitizer grid after it has been deactivated by the OFF Key.

The [+] key terminates a measurement, attaches a positive value to the Current Value, and sends that value to the Total Value field on the Value Line at the bottom of the terminal display screen.

The [−] key terminates a measurement, attaches a negative value to the Current Value, and sends that value to the Total Value field on the Value Line.

The Secondary Menuboard

The Secondary Menuboard contains a typewriter keyboard including alphabetic and punctuation keys, eight sign keys, and LOG ON and LOG OFF keys. It is slightly smaller than the Primary Menuboard, but is aligned and positioned within the digitized work area as is the Primary Menuboard. Although the Secondary Menuboard is not required for the operation of the digitizer, it enables the user to operate the host computer programs entirely from the digitizer without ever leaving the drafting table. Because it works in parallel with the terminal keyboard, the use of the Secondary Menuboard will not preclude the use of the terminal keyboard.

Except for the LOG ON and LOG OFF keys, all of the keys are KEYBOARD MIMIC keys.

LOG ON performs the same function as pressing the BLANK ORANGE key followed by an exclamation point (shift 2) on the Texas Instruments terminal keyboard, thus allowing the user to log on to the computer from the digitizer.

LOG OFF performs the same function as pressing Q followed by [RETURN] on the Texas Instruments terminal keyboard, thus allowing the user to log off the computer from the digitizer.

Data Entry

To take data off of plans or blueprints, the interface circuitry must be in the Ready mode. Typically, data is input from a blueprint in order to carry out some sort of measurement function. Therefore, the user first selects the desired measurement function by marking the selected one of measurement keys 68. In the measurement function mode, the following keys are the only active keys on the menuboards:
other MEASUREMENT FUNCTION keys
DONE
SEND
CLEAR
CLEAR LAST
Operation Keys (+, −, /, *)
Calculator Keys (0,1,2,3,4,5,6,7,8,9)
ON
OFF

Quantity Takeoffs

To do quantity takeoffs, complete the following steps:
1. Mark the MEASUREMENT FUNCTION key that identifies the type of measurement to be made.
2. Use the stylus to mark or trace the figure to be measured. The running total of that measurement will be displayed as the Current Value on the Value Line. If using a measurement function that operates in trace mode, the Current Value will automatically be updated every second.
3. Mark + or − a sign terminator for the measurement. This terminates the measurement and adds or subtracts the value in the Current Value to or from the Total Value, which is also displayed on the Value Line.

A sign terminator is not always required. But keep in mind that if the user does not mark a sign terminator when exercising one of the options in step 4, the terminator will default to a + sign.

At this point, the Total Value of the measurement is stored in a buffer and is displayed on the Value Line. Unless this buffer is cleared by using either the DONE or the SEND key to send the Total Value to the terminal or erased by using the CLEAR key, it will remain there, and any other entries that are made will operate on it according to the sign with which the entries are terminated.

4. Select one of the following options:
   To send the new Total Value to the host computer and to terminate the current measurement function, mark either the DONE key or the SEND key.
   To measure another figure that requires the same measurement function, repeat steps 2 and 3 above.
   To measure another figure that requires a different measurement function, repeat steps 1, 2 and 3 above.
   To manipulate the Total Value, enter a number using the KEYBOARD MIMIC section of the menu and an operator (+, −, *, or /).
   To terminate the measurement function and to clear the Total Value without sending a value to the host computer, mark the CLEAR key.

The DONE key and the SEND key function in the same way, except that the DONE key will also move the cursor to the next entry field in the ACCUBID software, while the SEND key will position the cursor to the immediate right of the entry. Generally, the DONE key is used to enter values into quantity fields in the ACCUBID program, and the SEND key is used to input information from the digitizer to the on-screen calculator or into custom formulas.

EXAMPLES

Following are six example exercises of measurement functions that can be performed using System 20. The first five examples cover individual measurement functions and the last example demonstrates combining or stringing different measurement functions together. All of these examples use the scale one inch equals one foot. This scale is entered as follows:
1. Mark ENG SCALE.
2. Mark [1].
3. Mark a slash (/).
4. Mark [1].
5. To terminate the scale, mark DONE. The scale will automatically be displayed on the Value Line at the bottom of the terminal display screen, and when it reads as follows, the system is ready to begin the exercises.

| PLAN SCALE | english | 1/1 | COUNT SCALE | 1/1 |
|---|---|---|---|---|

To use these examples as exercises, position an enlargement of the drawings in FIGS. 11A through 11F within the digitized work area. (Enlarge so that the line length in FIG. 11A, between points 1 and 2 equals the indicated value in inches.) Notice that each of the six Figures contains a drawing, the picture of one or two measurement function keys, and, to the right of the measurement function keys, a numeric value. (FIGS. 11C and 11D each show two values because they are used for two different exercises.) Use the measurement function pictured under the drawing to measure the drawing. If you measure accurately, your results will match the value shown next to the measurement function.

The values shown in FIGS. 11A through 11F were obtained by using the digitizer to measure repeatedly the full-scale drawings from which FIGS. 11A through 11F are derived, and then averaging the results. Because the digitizer generates a value that has four digits after the decimal point, it is virtually impossible to get exactly the same measurement every time; so subsequent measurements might not be identical to the ones given on FIGS. 11A through 11F.

These exercises will guide the user step by step through the process of using the digitizer to take off measurements from blueprints. By following the instructions for each exercise carefully, the user will readily understand that the digitizer is an efficient and effective tool for inputting both analog graphics and digital data to a host computer. It should be understood, however, that application of the principles of the system and method of operation is not limited to the examples.

Exercise 1

Length-single

The Length-single measurement function, which operates in spot mode, measures the length of a single line that the user defines by marking its endpoints. After marking the Length-single measurement function key, the Digitizer Interface (DI) will wait for the user to mark two points within the digitized work area. Then the DI will automatically measure the straight-line distance between the two points, will adjust the measurement by whatever scale that has been entered in the digitizer, and will display the measurement as the Current Value on the Value Line.

In this exercise, the user measures the line in FIG. 11A as follows:

1. To verify that the scale of Eng 1/1 is being used, mark DISPLAY SCALE.
2. Mark the LENGTH-SINGLE measurement function key. The following should appear on the Value Line at the bottom of the terminal display screen:

| LENGTH - | single | CURRENT VALUE | .0000 | TOTAL VALUE | .0000 |
|---|---|---|---|---|---|

3. Mark points 1 and 2 in FIG. 11A; the measurement will appear in the Current Value field on the Value Line. Compare the Current Value with the value in FIG. 11A. The Value Line on the terminal display screen should look like the line below:

| LENGTH - | single | CURRENT VALUE | 2.0412 | TOTAL VALUE | .0000 |
|---|---|---|---|---|---|

4. To terminate the measurement and to give the Current Value a positive Value, mark a (+) sign. Doing this will also send the value in the Current Value field to the Total Value field of the Value Line, and will clear the Current Value. Because there was no value in the Total Value field, the new total Value will be the value of the measurement made in step 2. The Value Line should read:

| LENGTH - | single | CURRENT VALUE | .0000 | TOTAL VALUE | 2.0412 |
|---|---|---|---|---|---|

To determine the accuracy of measurement, subtract the Total Value from the value in FIG. 11A.

5. To clear the Total Value and terminate the measurement function, mark CLEAR.
6. Repeat steps 2, 3, and 4, and compare your Total Value with the value on FIG. 11A.
7. Without clearing the Total Value, mark points 1 and 2 agian; both a Current Value and a Total Value will then appear on the screen. The Current Value will be the measurement just completed, and the Total Value will be the measurement that resulted from step 6. The Value Line should read:

| LENGTH - | single | CURRENT VALUE | 2.0500 | TOTAL VALUE | 2.0404 |
|---|---|---|---|---|---|

8. To terminate the measurement and give the Current Value a negative value, mark a (−) sign. Because the Current Value now has a negative value, when it is sent to the Total Value field, it will be subtracted from the existing Total Value. The Value Line should read:

| LENGTH - | single | CURRENT VALUE | .0000 | TOTAL VALUE | −.0096 |
|---|---|---|---|---|---|

The Total Value on the screen will be the difference between the two measurements.

9. To clear the Total Value and terminate the measurement function, mark CLEAR.
10. Mark LENGTH-SINGLE.
11. Mark points 1 and 2 again; then mark a + sign to terminate the measurement. Repeat this step until satisfied with the consistency of your measurements.
12. To clear the Total Value, mark CLEAR.
NOTE: The Length-single measurement function does not require the sign terminator that is called for in step 4. Although the digitizer interface is programmed to accept two points and a sign terminator, if after entering the second point the user does not mark a sign terminator, when the user makes the next entry, the interface program will, by default, enter a (+) sign.

13. Mark LENGTH-SINGLE and points 1 and 2; the measurement is displayed as the Current Value:

| LENGTH - | single | CURRENT VALUE | 2.0396 | TOTAL VALUE | .0000 |
|---|---|---|---|---|---|

14. Mark point 1; the DI will default a + sign to the Current Value and will send the Current Value to the Total Value field. Mark point 2; the DI will measure the length of the line between points 1 and 2, and will then display the measurement as the Current Value on the Value Line, which should now read:

| LENGTH - | single | CURRENT VALUE | 2.0281 | TOTAL VALUE | 2.0396 |
|---|---|---|---|---|---|

15. To terminate the measurement made in step 14 and to subtract it from the Total Value, mark a (−) sign. If the two measurements are identical, the Total Value will be 0. Because the digitizer measures so precisely, the two measurements are unlikely to be identical, and the Value Line on the screen will be similar to the line below:

| LENGTH - | single | CURRENT VALUE | .0000 | TOTAL VALUE | .0115 |
|---|---|---|---|---|---|

16. By marking either CLEAR, SEND, or DONE, terminate the measurement function. CLEAR, in addition to terminating the measurement function, will clear the Value Line. SEND will terminate the measurement function, send the Current Value to the Total Value field, and then send the updated Total Value to the cursor position on the terminal display screen. DONE will have the same effect as SEND, but will also move the cursor to the next field on the screen.

Exercise 1

Length-multiple

The Length-multiple measurement function, which operates in trace mode, measures the length of any continuous line or series of lines—even if the line is curved. Remember that in trace mode, as long as the stylus tip is pressed down, the stylus will click repeatedly and each click will be recorded by the Digitizer Interface (DI) as a separate point. As the user uses the stylus to trace the line that is being measured, the digitizer interface will record each click that the stylus makes as an individual point. This has the effect of dividing the line into a series of short, straight segments with a point at each end. Then the interface will measure the length of each of these segments, will add all of these segments together in the order that the points were marked, and will display the sum of the segments on the Value Line as the Current Value.

The Length-multiple measurement function can only be used to measure a continuous line. To measure a line that is not continuous, each section of the line must be measured separately, and then, before measuring a section that is not connected, the first measurement must be terminated by using a sign terminator.

This exercise measures the circumference of the drawing in FIG. 11B. Because three sides of this drawing are straight and the interface program will use a straight line to connect any two points consecutively marked, the user need only mark points 1, 2, 3, and 4 to measure the three straight sides. Then the user can trace the arc between points 4 and 1 to measure the curved side.

When using the Length-multiple measurement function, terminate the measurement so that the DI will know when the measurement is completed. To do this, use the +, −, SEND, or DONE keys, or use another measurement function.

1. To verify that the scale of Eng 1/1 is being used, mark DISPLAY SCALE.
2. Mark LENGTH-MULTIPLE.
3. Mark points 1, 2, 3, and 4. Because Length-multiple operates in the trace mode, the stylus might click more than once when used to make a single point. Because the DI measures the distance between points, if the stylus is not moved, the clicks will mark the same point, and the measurement will not be affected.
4. Trace the arc between points 4 and 1. Because the line that is being measured must be continuous to use the Length-multiple measurement function, the user must trace the arc from point 4 to point 1.

To provide a running total of the length measured, the interface circuitry will update the Current Value every second; after making the last mark, the Value Line should update to read:

| LENGTH - | multiple | CURRENT VALUE | 5.7444 | TOTAL VALUE | .0000 |

The difference between the value on FIG. 11B and the Current Value will indicate how close the measurement has come to the circumference of the drawing.

5. To terminate the measurement and to send the Current Value to the Total Value as a positive value, mark a (+) sign. The Value Line should read:

| LENGTH - | multiple | CURRENT VALUE | .0000 | TOTAL VALUE | 5.7444 |

The interface will still be in the Length-multiple measurement function and the stylus will still be in trace mode.

6. Repeat steps 3, 4, and 5 until satisfied with the consistency of the measurements. To determine how consistent the measurements are, each time step 4 is completed, compare the new Current Value to the previous measurements. As each measurement is terminated, the Total Value will grow; disregard it.
7. To terminate the measurement function and take the stylus out of trace mode, mark either CLEAR, SEND, or DONE. When the stylus is in trace mode and is held down on the outline of the terminating key, it clicks several times before the interface leaves the trace mode; this is normal.

Exercise 3

Area-triangle

The Area-triangle measurement function measures the area of any triangle defined by marking its corners. When marking the Area-triangle measurement function key, the interface will wait for the user to mark three points within the digitized work area. After marking the three points, the interface program will calculate the area of the triangle that is defined by them. To terminate the measurement, the user can mark a sign terminator (+ or −); or can mark either SEND, DONE, another measurement function key, or another point, and the interface program will default a + sign to terminate the measurement.

In this exercise, the area of the triangle in FIG. 11C is measured.

1. To verify that the scale of Eng 1/1 is being used by the Digitizer Interface (DI), mark DISPLAY SCALE.
2. Mark AREA-TRIANGLE, and the following should appear on the Value Line:

| AREA - | triangle | CURRENT VALUE | .0000 | TOTAL VALUE | .0000 |

3. Mark points 1, 2, and 3. After making the third point, the area of the triangle that is defined by the three points will be displayed in the Current Value field. The difference between the value given in FIG. 11C and the Current Value on the Value Line will indicate how close the measurement has come to the actual measurement of the triangle.

| AREA - | TRIANGLE | CURRENT VALUE | 1.5194 | TOTAL VALUE | .0000 |

4. To terminate the measurement and send the value in the Current Value field to the Total Value field, mark a + sign. After doing this, the Value Line should read:

| AREA - | triangle | CURRENT VALUE | .0000 | TOTAL VALUE | 1.5194 |

5. To clear the Total Value and terminate the measurement function, mark CLEAR.
6. Mark AREA-TRIANGLE and points 1, 2 and 3.
7. Instead of terminating the measurement by marking a + sign as before, mark point 1 again, and watch the Value Line. Because this is the fourth point marked in this measurement, the interface program will default a (+) sign and will send the value in the Current Value field to the Total Value field. Then the digitizer will wait for the user to mark the other two corners so that it can complete the measurement of the triangle.
8. To finish the calculation for the area of the triangle, mark points 2 and 3. The interface will complete the calculation and will display the area of the triangle in the Current Value field.
9. To send the value in the Current Value field to the Total Value field and then send the updated value in the Total Value field to the position of the cursor on the terminal display screen, mark SEND. Doing this will also terminate the measurement function and will move the cursor to the immediate right of this value on the terminal display screen.

Exercise 4

Area-Rectangle

The Area-rectangle measurement function measures the area of any squared, rectangle, or parallelogram defined by marking three of its corners. After the user marks the Area-rectangle measurement function key, the interface will wait for three points within the digitized work area to be marked. After marking of the three points, the interface program will determine the location of the fourth point and will calculate the area that is defined by the four points. To terminate the measurement, the user can mark a sign terminator (+ or −); or can mark either SEND, DONE, another measurement function key, or another point, and the interface program will default a (+) sign to terminate the measurement.

This exercise will measure the area of the rectangle in FIG. 11C.

1. To verify that the scale of Eng 1/1 is being used, mark DISPLAY SCALE.
2. Mark AREA-RECTANGLE; the following should appear on the Value Line.

| AREA - | rectangle | CURRENT VALUE | 0.0000 | TOTAL VALUE | .0000 |

3. Mark points 1, 2, and 3 in FIG. 11C. After marking the third point, the area of the rectangle that is defined by the three points will be displayed as the Current Value on the Value Line. The difference between the value given on FIG. 11C and the Current Value on the Value Line will indicate how close the user's measurement has come to the measurement of the rectangle.

| AREA - | rectangle | CURRENT | 3.127 | TOTAL | .0000 |

*-continued*

| VALUE | VALUE |

4. To terminate the measurement and send the value in the Current Value field to the Total Value field as a positive value, mark a (+) sign. After doing this, the Value Line should read:

| AREA - | rectangle | CURRENT VALUE | .0000 | TOTAL VALUE | 3.127 |

5. To clear the Total Value and terminate the measurement function, mark CLEAR.
6. Mark AREA-RECTANGLE and points 1, 2, and 3.
7. Instead of terminating the measurement by marking a + sign as before, mark point 1 again, and watch the Value Line. Because this is the fourth point marked in this measurement, the interface program will default a (+) sign terminator, and will send the value in the Current Value field to the Total Value field on the Value Line.
8. To finish the calculation for the area of the rectangle, mark points 2 and 3 again. After doing this, the DI will complete the calculation and will display the area of the rectangle in the Current Value field.
9. Repeat steps 7 and 8 until satisfied with the consistency of the measurements. To determine how consistent the measurements are, each time that step 8 is completed, compare the new Current Value to previous measurements. As each measurement is terminated, the Total Value will grow; disregard it.
10. To terminate the measurement function and send the Total Value to the cursor position on the terminal display screen, mark DONE. Doing this will also move the cursor to the next field on the screen.

Exercise 5

Area-Freeform

The Area-freeform measurement function operates in trace mode and measures the area of closed irregular shapes. As the stylus is used to trace the outline of a drawing, the interface will record each click of the stylus as an individual point, dividing the line into a series of short, straight segments with a point at each end. To close the shape, the interface program will connect the first and last points marked and will then calculate the area inside of that outline and display the area on the Value Line as the Current Value.

This exercise calculates the area of the odd-shaped room that is depicted in FIG. 11D. The room has twelve straight wall sections and one curved wall. Because the DI will use a straight line to connect any points that you mark, the user can simply mark the corners of the straight walls. To get an accurate measurement of the curved wall, the user must trace it.

When using the Area-freeform measurement function, terminate the measurement so that the DI will know when the measurement is completed. To do this, use either the +, the − key, the SEND or DONE key, or use another measurement function.

1. To verify that the scale of Eng 1/1 is being used, mark DISPLAY SCALE.
2. Mark AREA-FREEFORM.
3. Mark points 1, 2, 3, 4, 5, and 6, trace the arc between points 6 and 7, and then mark points 8, 9, 10, 11, 12, and 13. Because the line between points 13 and 1 is a straight line, and because when the DI updates the Current Value, it will use a straight line to connect the first and last point marked, the user need not mark point 1 again.

4. As the points in step 3 are marked, the DI will update the Current Value every second to display a running total of the area marked. When step 3 is completed, the interface program will automatically calculate the area of the entire room and will display the area as the Current Value on the Value Line. After the last point is marked, the Value Line should update to read:

| AREA - FREEFORM | CURRENT VALUE | 3.1544 | TOTAL VALUE | .0000 |
|---|---|---|---|---|

The difference between the value in FIG. 11D and the Current Value will indicate how close the user's measurement has come to the measurement of the room.

5. To terminate the measurement and send the value in the Current Value field to the Total Value field as a positive value, mark a + sign. The Value Line should read:

| AREA - FREEFORM | CURRENT VALUE | .0000 | TOTAL VALUE | 3.1544 |
|---|---|---|---|---|

The interface circuitry will still be in the Area-freeform measurement function and the stylus will still be in trace mode.

6. Repeat steps 3, 4, and 5 until satisfied with the consistency of the measurements. To determine how consistent the measurements are, each time that step 4 is completed, compare the new Current Value to previous Current Values.

7. To terminate the measurement function and take the stylus out of the trace mode, mark either CLEAR, SEND, or DONE.

8. Repeat steps 2, 3, 4, and 5, and the Total Value will be the area of the entire room. The Digitizer Interface will still be in the Area-freeform measurement function, and the stylus will still be in trace mode.

9. The next step is to calculate the floor area that excludes the kidney-shaped pool. To measure the area of the pool, simply trace its outline on FIG. 11D, and the area will be displayed as the Current Value on the Value Line.

10. To subtract the area of the pool from the total floor area of the room, mark a (−) sign. The Total Value will be the floor area that excludes the pool.

11. To terminate the measurement function and take the stylus out of trace mode, mark either CLEAR, SEND, or DONE.

Exercise 6

Stringing Linear Measurements

To make it possible to perform a series of similar measurements that require different measurement functions, the digitizer interface allows the user to combine measurements, or string them together. If one measurement function is used to measure a drawing and the user wants to switch to a second measurement function to continue the measurement without clearing the Total Value, simply mark the second measurement function. This will allow any measurements derived through the second measurement function to be added to or subtracted from the value already in the Total Value field so that the combined measurements can be sent to the terminal display screen as one value.

This exercise strings together the Length-single and the Length-multiple measurement functions. The diagram in FIG. 12E is the framing diagram for a small deck, and is to be measured to determine the number of feet of framing material required for the job.

1. To verify that the scale of Eng 1/1 is being used, mark DISPLAY SCALE.
2. Mark LENGTH MULTIPLE.
3. Mark points 1, 2, 3, and then mark point 1 again.
4. To terminate the Length-multiple measurement function, to default a (+) sign terminator to the value in the Current Value field, and to send the value in the Current Value field, mark LENGTH-SINGLE.
5. To measure the lengths of the remaining joists, mark points 4, 5, 6 and 7, and 8 and 9. It is preferable to use the ballpoint cartridge in the stylus to be able to make a visible mark on the blueprint to keep track of the points marked and measured.
6. To terminate the measurement, mark a (+) sign. The Total Value will be the number of linear feet of framing material that you will need for the deck.
7. To terminate the measurement function and clear the Value Line, mark CLEAR.

Area measurements can be strung together the same way you can string together length measurements. By marking a new measurement function, the user can terminate the old measurement function without clearing the Total Value, and measurements made using the new measurement function can be added to or subtracted from the Total Value and then sent to the host computer as one value.

This exercise measures the figure that depicts a circular driveway in FIG. 11F. First, the area of the driveway is calculated and then the volume of concrete that would be required to make the driveway 6 inches thick is calculated.

1. To verify that the scale of Eng 1/1 used, mark DISPLAY SCALE.
2. Mark AREA-FREEFORM.
3. Mark points 1, 2, and 3, and then trace the arc between points 3 and 4; mark points 5, 6, and 7, then trace the arc between points 7 and 8; and, finally, mark points 9 and 10. When the interface updates the Current Value, it will use a straight line to connect the first and last points marked. Therefore, because the line that connects points 10 and 1 is a straight line, it is unnecessary to mark point 1 again.
4. The interface program will automatically calculate the area of the driveway and will display it as the Current Value on the Value Line.

The Current Value will be updated by the DI every second, thus providing a running total of the area marked. After marking the last mark, the Value Line should update to read:

| AREA - FREEFORM | CURRENT VALUE | 3.2758 | TOTAL VALUE | .0000 |
|---|---|---|---|---|

The difference between the value on FIG. 11F and the Current Value will indicate how close the user's measurement has come to the measurement of the driveway.

5. To terminate the measurement and send the value in the Current Value field to the Total Value field as a positive value, mark a (+) sign.

6. To determine the volume of concrete needed for the driveway, use the calculator keypad 62 on the Primary Menuboard to enter 0.5, which represents the 6-inch depth of the driveway. When this value is entered, the Value Line format will change to look like the line below:

| CURRENT VALUE | .5000 | TOTAL VALUE | 3.2758 |
|---|---|---|---|

7. To multiply the Total Value by the constant in the Current Value field, mark a multiplication sign (*) on the Primary Menuboard. The Value Line should be similar to the line below:

| CURRENT VALUE | .0000 | TOTAL VALUE | 1.6379 |
|---|---|---|---|

8. To send the Total Value to the position of the cursor on the terminal display screen, mark DONE.

A different method can be used to measure the drawing of the driveway. The same can be measured by measuring the overall area of the outline and then subtracting the area inside the semi-circle that contains the tree.

1. Mark AREA-FREEFORM.
2. Mark points 1, 2, and 3, trace the arc between points 3 and 4, and then mark points 5 and 10.
3. To terminate the measurement, mark a (+) sign; the DI will remain in the Area-freeform measurement function.
4. To measure the area of the semicircle inside the driveway, mark points 7, 6, 9, and 8 in that order; then trace the arc between points 8 and 7.
5. To terminate the measurement and send the value in the Current Value field as a negative value, mark the (−) sign. Because Current Value has a negative value, when it is sent to the Total Value field, it will be subtracted from the existing Total Value. The new Total Value should then be about the same measurement that you made in step 4.
6. To terminate the measurement function and clear the Current and Total Values, mark CLEAR.

This figure can also be measured by stringing together the Area-rectangle measurement function and the Area-freeform measurement function.

1. Mark AREA-RECTANGLE.
2. To measure the rectangle on the left side of the diagram, mark points 1, 2, and 9.
3. To measure the small rectangle on the right side of the diagram, mark points 4, 5, and 6. This will default a (+) sign terminator to the value in the Current Value field (the area of the rectangle measured in the preceding step) and will send that value to the Total Value field.
4. To terminate the Area-rectangle measurement function, mark AREA-FREEFORM. This will default a (+) sign terminator to the area of the second rectangle, will send the value in the Current Value (the area of the second rectangle) to the Total Value (the area of the first rectangle) as a positive value, and will put the stylus in trace mode.
5. Trace the arcs between point 3 and 4 and between points 7 and 8, in that order. The DI will automatically use straight lines to connect points 4 and 7 and to connect points 8 and 3.
6. To terminate the measurement and add it to the Total Value, mark a (+) sign. The Total Value should be the same as the Total Value derived when the two previous methods were used to measure the area of the driveway.
7. To calculate the volume of concrete required for the driveway, mark 0.5 and a multiplication sign (*) on the Primary Menuboard keypad. This will multiply the area of the driveway (the Total Value) by 6 inches (0.5 feet).
8. To clear the Total Value and terminate the measurement function, mark CLEAR.

Internal Operation of Interface

This section describes the operation of adapter 34 under control of the programs in the Appendix to effect the principal functions of system 20.

Start-Up of System

Program operation commences with the initialization routine INIT. This routine establishes the variables, data fields and constants used in subsequent programs. This routine also includes real time interrupt routines, operation of which is to be described following a discussion of program operation during start-up of the system.

At the conclusion of initialization, program control is transferred to an infinite loop which commences at line 377 at end of INIT. This loop contains jumps to various routines in programs MAIN and PGM. INIT determines the first jump by setting a jump-defining variable STATE=Locate Menu State (line 335, INIT). Subsequent jumps are determined by changes in the variable STATE made variously by actions of the user, operation of other routines, and error conditions. All routines eventually return, directly or indirectly, through subsequent routines to the infinite loop.

The first jump turns on the locate menu indicator 49, as mentioned above in the second paragraph under "General Operation." If the system is just set up, the operator continues through the procedure described in "General Operation," starting with alignment of the digitizer arms 26. Since alignment is only done during initial set up, the program is written so that the system comes up assuming that the digitizer arms are aligned. For alignment upon initial set up, the user depresses the select button, which sets variable STATE=Align state (line 380). This action transfers the program control to procedure ALIGN STATE in module MAIN, starting at line 183, which sets indicator 47 on. While in this state, both the arms and menus are aligned, with the program merely displaying incoming digitizer data. After alignment, the operator presses the select switch and the routine sets STATE=Locate Menu, changing the indicators 47, 49 accordingly (lines 203–207).

Menu Coordinates Map

The Locate Menu routine is in MAIN, starting at line 210. Several succeeding subroutines are accessed by this routine. The program waits for four data points to be entered through the digitizer by marking the indicia on one of the menus. If both menus are to be used, the secondary menu 52 must be entered first. Once the first four points are entered, the program (PR LOCATE MENU TEST, PR LOCATE MENU, and PR LOCATE ROTATED MENU) compares the distances between the points, to validate the points as a valid menu, and to determine which menu is entered and its orientation (lines 250–287). This procedure includes testing the measured difference between the input points against prestored values to determine if it is a valid menu, its location, and whether it is rotated. The same procedure is followed for the primary menu.

Once these points are established, their coordinates are saved in memory as constants MENU X(0, 1, 2, 3) and MENU Y(0, 1, 2, 3). These constants are used in subsequent routines to determine which keys on the menus have been marked by the stylus during operation of the system. Through the PR MENU KEYS routine (MAIN, lines 772-779) these constants are used as offsets to access the coordinates map stored in memory for each menu. The coordinates map for the secondary menu board 52 is in MAIN at lines 808-End of Table preceding line 852, and for the primary board from line 869 through End of Table preceding line 896. These maps establish a fixed set of addresses for each key. The stored indicia coordinates, in effect, turn the fixed coordinates map addresses into relative addresses, in relation to the coordinates system of the digitizer.

When a new point is entered via the digitizer, the PR MENU KEY routine calls various other routines. First, it calls PR FUNCT KEYS TEST (lines 794-807), which sets up a menu key variable equal to the difference between the coordinates of a newly input point and the coordinates of one of the prestored indices. This variable reduces the coordinates of the new point relative to the origin on the menu to the fixed coordinates mapping of the menu stored in memory. The routine then tests to make sure that the new point is within the boundaries of the function or primary menu 54. If so, routine PROCESS MENU ZONES, which contains the coordinates map for the primary menu, is called. If not, then the program returns to PR MENU KEY and checks, first, to determine if the secondary menu 52 has been located (KEYBD MENU VALID=1), and if so, to transfer to the PR KEYBD MENU KEY TEST routine. That routine operates in the same manner as FUNCT MENU KEYS TEST to determine if the new point is on the secondary menu and, if so, to access its coordinates map in PROCESS KEYBD MENU ZONE.

If the new point is not within the area of either menu, then MENU KEY=0 (MAIN, line 274) remains unchanged and control returns to whatever routine called this routine. The new point is then treated as graphic data.

Input and Processing of Digitizer Data

Input and output is handled by an interrupt routine. Every millisecond a timer signal (OUT2) from circuit 140 is transmitted to microprocessor 100. Whenever the interrupt occurs, the microprocessor stops whatever it is doing and services the interrupt. Upon completion, it returns to what it was previously doing.

Referring to INIT, line 188-249, the interrupt signal starts a routine RTI which access further routines (PROCESS TX DATA, lines 268-295 and other routines at lines 250-267. This procedure resets the interrupt timer, tests the status of select button 53, and checks to the Serial I/O 130 to see if it contains either incoming data or data to be transmitted. When the digitizer is used in the trace mode, RTI also continually updates the Value Line on the CRT display. The routines at lines 250-267 control direction of data flow through multiplexers 150, 152, as further described below.

When the serial I/O contains meaning data, an 8-bit character is transferred by routine RTI into the microprocessor via data lines D0-D7 and then placed in RAM 120, incrementing a counter each time a character is stored (line 826). Then the interrupt routine checks for data to be transmitted and processes the transmission, as described in the next subsection. Once a full line (11 characters-English scale) of incoming data is stored, it is processed by other routines depending on the state of system, as next discussed.

As previously discussed, when the system is turned on, the program comes up in the Locate Menu state. If the program is switched to the ALIGN state, incoming data is displayed on the CRT 36 without further processing. The ALIGN state procedure (MAIN, lines 187-208) waits in a continuous loop until the character count is incremented above zero. Following an interrupt sequence in which the character count is incremented, indicating presence of a character, which has been put in memory, this procedure places the stored characters one at a time in an output buffer in RAM 120, incrementing an output buffer counter. This data is subsequently sent to the CRT display by operation of the interrupt routine. Once all characters are in the output buffer, the ALIGN state routine checks to see if the select button is pressed, and, if so, switches back to LOCATE MENU State.

In the LOCATE MENU State, procedure PR LINE (line 334, MAIN) is called. The output of this procedure is a set of variables containing the x4 coordinates of each point marked. Incoming data stored in RAM is processed, first-in, first-out, one entire 11-character line at a time, and converted from ASCII to binary integer form. This step is repeated for the four points marked by the user on each menu. The output set of variables is then processed as described in the previous subsection. Once the primary menu is located, the program automatically switches to the READY state (PGM, lines 390-456).

Scaling is the first user procedure ordinarily performed in the READY State. The initial scaling variable is set to zero, and so the program automatically resets STATE=Scaling State (line 394). This causes the program to display the scale on the CRT as XXXXXX/XXXXXX, warning the user to call the Scaling State. Doing so causes the program to exit to the main processing loop in INIT, which in turn calls the routine PR SCALING STATE (MAIN lines 456-475). This routine waits for coordinates of a point to be entered through the digitizer. In doing so, it calls PR LINE to process incoming as discussed above. Once coordinates of a point are received, PR SCALING STATE calls PR MENU KEYS to verify that the point is on a menuboard and checks to see which one it is (CHECK SCALE KEYS, lines 419-448). Depending on the choice of key, this routine changes the STATE variable. If the English or metric keys are marked, the PR SCALING STATE READY routine is called, which prompts the user to input the selected scale by marking numbers on the keypad of menuboard 54. If the Auto scale key is marked, then PR AUTO SCALING is called, which requires the users to mark two poi... on the graphic data and enter a number defining a ratio to the distance between the two points marks.

In either scaling routine, the X and Y scales can be scaled differently, the user marks one of the horizontal and vertical keys (HORIZ and VERT) before inputting the selected scale for the marked axis, and then does the same for the other axis. After both scales have been entered, the user marks the DONE key on menuboard 54. This action resets STATE=READY STATE and SCALING VALID=1 (MAIN, line 730) and returns to the main loop (INIT, line 377).

The main loop transfers control to the READY STATE routine (PGM, lines 390–456), and the program awaits incoming data or a change in the select button. Incoming data is processed as previously discussed. When a complete line of data is stored, this program tests to see if it is one of a defined set of keys on either menuboard, as listed in the READY STATE routine. When a key within the set is selected, the corresponding routine for the key is called. If no corresponding routine is stored, then the character is sent to the host computer. If an unlisted menu key is marked, then at lines 449, 450, the program calls two extension subroutines: first CHANGE STATE (lines 335–346) and, if the marked key is not found therein, then RESET STATE (lines 361–389). These routines access the corresponding routines for the remaining keys on the primary menu. PR READY STATE also accesses the keys on the secondary menu (lines 401–405).

Some of these keys control operation of the interface logic, without immediately transmitting information to the host computer. For example, any key in the scale section 66 will change the state to a scaling state. Any specific function key in section 68 will also change state to the selected function. To compute the area of a triangle, the triangle key is marked, followed by three points in the graphic data. Thereupon, the triangle function routine (lines 629–659) computes the area within the three points (using assembler routines in MATH), and displays the area in the Value Line of the CRT as described above in the examples. The triangle or other geometric function routine then awaits (1) more data points or (2) another valid menu key from a list in that routine similar to the list in READY STATE. To send the resultant answer, whatever appears in the Value line, to the host computer, the operator marks either the DONE or SEND key in Section 68. As previously discussed, the DONE and SEND keys can have different additional functions, depending on the requirements of host computer program. The ON and OFF keys and CLEAR and CLEAR LAST keys also are within this group.

The remaining keys directly cause a corresponding key code to be sent to the host computer in a format compatible with the host, e.g., in ASCII for the above-mentioned Texas Instruments minicomputers. In this way, numeric, alphabetic, and arithmetic characters 62, 70, 72 can be sent to the host computer as data, mimicking the function of an actual keyboard. The function keys F1 through F8 in section 64 are transmitted in the same way and are used, as desired, by the operator, e.g., to actuate prestored programs or data in the host computer.

Output and Switching of Data

The READY STATE and other routines that generate output data, call one of routine TRANSMIT (PGM, lines 201–214) and routine SEND (MAIN, lines 913–929) to load the data into the output buffer of RAM 120. The data is included within a variable-length character string which has first and last characters that set the data flow direction preceding and following the transmission of each block of data. This operation is performed by the interrupt routine RTI (INIT, lines 188–249). The portion of RTI commencing at line 233 controls multiplexers 150, 152 through various called routines (TX NORM, CPU and CRT, lines 250–268). (Two subsequent routines, TX LINE and POINT, affect the line-trace or point mode of operation of the stylus.)

Three choices of data flow direction are provided. The normal position provides for transmission from the CRT KEYBOARD to the host computer via MUX 150 and from the host computer to the CRT via MUX 152. The CPU position provides transmission from serial I/O circuit 130 to the CPU. The CRT position provides for transmission from CCT 130 to the CRT.

Once the direction of data is selected, another routine, PROCESS TX DATA (lines 268–295), is called repeatedly until the output buffer is emptied, to transfer the data from the buffer to serial I/O circuit 130. The writing of data into circuit 130 triggers serial transmission of the data on line TXD, at the baud rate established by clock signal TXC from timer 140. Such data goes to either the host CPU or to the CRT as determined by the data flow direction characters. If data is displayed on the CRT in the Value Line, it is saved in memory for subsequent, user-actuated transmission to the CPU.

Figure 12:
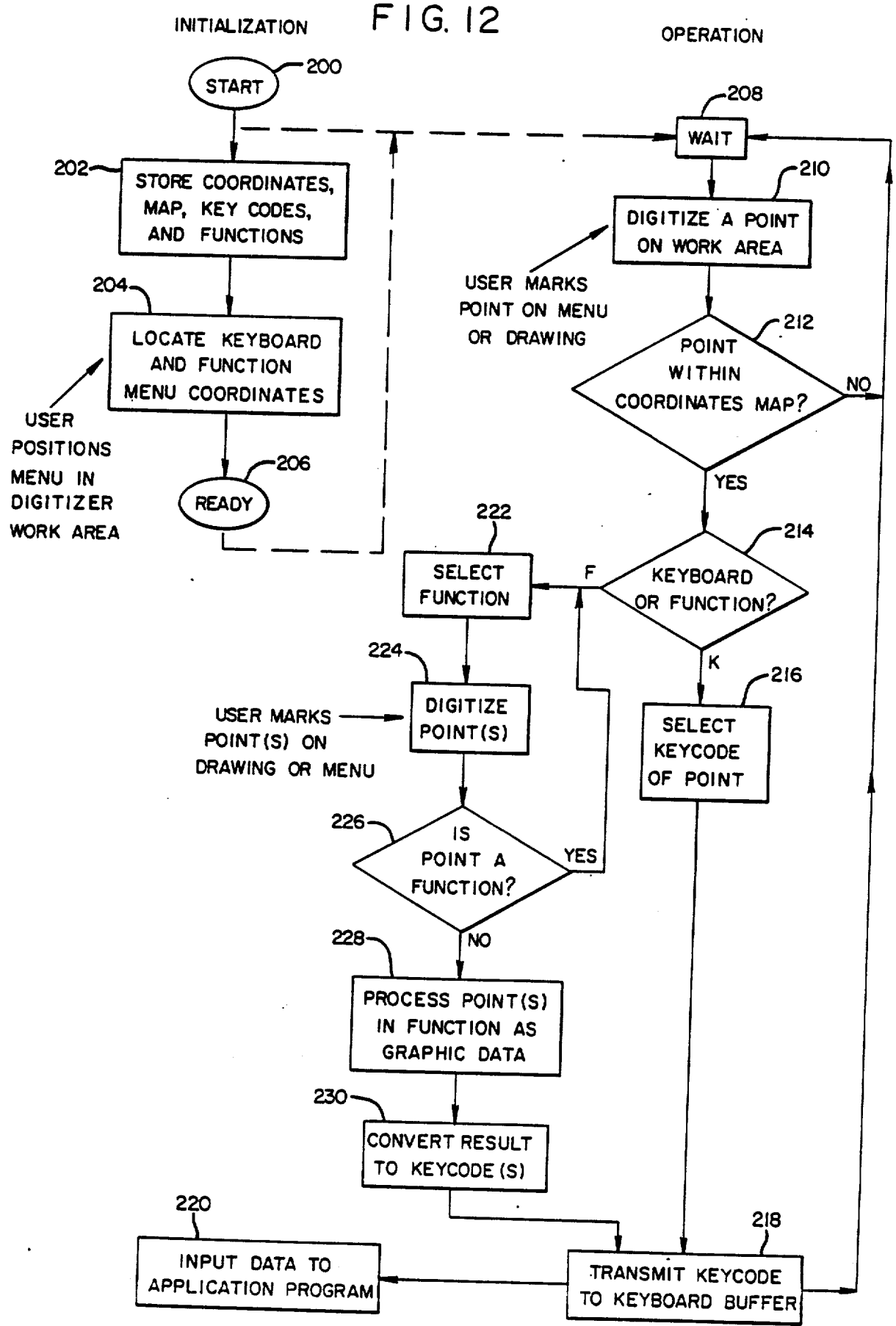
FIG. 12 is a flow chart of a digitizer interface program in accordance with the invention.

FIG. 12 generally summarizes the above-described method of operation of the interface program so as to enable the user alternately to input, to the bid estimation applications program, either keyboard or function instructions from the menus or graphic data (either as processed in accordance with the instructions or directly as graphic data coordinates) entirely from the digitizer work area 24 without using keyboard 46. Operation commences at start block 200. Loading the interface program stores the coordinates map, and associated key codes corresponding to the keyboard signals and the various functions used for preprocessing graphic data for use by the estimation program, as shown in block 202. Next, when the user positions the menu in the digitizer work area 24, the interface program locates the keyboard and function menu coordinates in the software. This step, shown in block 204, establishes the relative coordinates contained in the coordinates map within the coordinates system of the digitizer. The interface program is then ready (block 206) to begin accepting and processing coordinates data from the digitizer. The program shifts from initialization to an operation mode, which commences in a wait state 208. Once the steps shown blocks 202 and 204 are performed, unless the menus are repositioned, whenever the program is subsequently started, it can shift directly to wait state 208 without having to repeat the initialization procedure.

In the operation procedure, when the user marks a point in work area 24, this point is digitized (block 210). The program tests to determine whether the point is within the coordinates map, which corresponds to the location of the menus, as shown in block 212. If not, the program returns to wait state 208. If so, the program proceeds to decision block 214, which determines whether the digitized point corresponds to a location on the keyboard menu or one on the function menu. If a keyboard character has been selected, the interface program selects, through the coordinates map, the key code corresponding to the keyboard character designated on the keyboard, as shown in block 216. This key code mimics the electrical signals that would have been produced by the corresponding key of the keyboard 46 if that key had been pressed by the user. Next, as shown in block 218, the key code is transmitted to the keyboard buffer of the computer and thereby provided, as shown in block 220, as input data to an application program, such as the above-mentioned construction cost estimation program, for subsequent processing.

Returning to decision block 214, if the user-designated point corresponds to a function on the function menu, the interface program selects the corresponding function through the coordinates map as indicated by block 222. As discussed above, most of these functions call for digitizing a number of points of graphical data, for processing by the selected function. The user may, however, interrupt or change functions by designating a function on the function menu. Thus, the user marks a point on the drawing or function menu and the digitizer and interface program digitize the selected points, as shown by block 224. Each of these points is tested in block 226 to determine whether the point is a function. If so, the program returns to the select function block 222. Otherwise, the program proceeds to block 228, to process the digitized points in the selected function as graphic data. The result of computations performed by the selected function on the graphic data is converted to an appropriate number of key codes like those output from keyboard 46. These key codes are then transmitted, by block 218, to the keyboard buffer for input to the applications program.

Having described and illustrated the principles of our invention in a preferred embodiment, it should be apparent that it may be modified in arrangement and detail without departing from such principles. We claim all modifications coming within the scope and spirit of the following claims.

```
RTCS/UDI V4.0 - PL/M-86 V2.3 COMPILATION OF MODULE INIT
OBJECT MODULE PLACED IN B:INIT.OBJ
COMPILER INVOKED BY: PLM86 B:INIT.SRC $COMPACT ROM DEBUG

1        INIT:DO ;
            /*
                STATE LITERAL DEFINITIONS
            */
   2 - 1     DECLARE OFF_STATE LITERALLY             '0' ;
   3   1     DECLARE ALIGN_STATE LITERALLY           '1' ;
   4   1     DECLARE LOCATE_MENU_STATE LITERALLY     '2' ;
   5   1     DECLARE READY_STATE LITERALLY           '3' ;
   6   1     DECLARE SCALING_STATE LITERALLY         '4' ;
   7   1     DECLARE SCALING_STATE_READY LITERALLY   '5' ;
   8   1     DECLARE SCALING_STATE_NEXT LITERALLY    '6' ;
   9   1     DECLARE AUTO_SCALING_STATE LITERALLY    '7' ;
  10   1     DECLARE SCALING_STATE_P2 LITERALLY      '8' ;
  11   1     DECLARE SCALING_FIRST_ENTRY LITERALLY   '9' ;
  12   1     DECLARE SCALING_SECOND_ENTRY LITERALLY  '10' ;
  13   1     DECLARE COUNT_SCALING_STATE LITERALLY   '11' ;
  14   1     DECLARE COUNT_SCALING_SECOND_STATE LITERALLY '12' ;
  15   1     DECLARE AREA_STATE LITERALLY            '13' ;
  16   1     DECLARE AREA_DATA_STATE LITERALLY       '14' ;
  17   1     DECLARE LIN_DIST_STATE LITERALLY        '15' ;
  18   1     DECLARE LIN_DIST_DATA_STATE LITERALLY   '16' ;
  19   1     DECLARE RECT_AREA_STATE LITERALLY       '17' ;
  20   1     DECLARE RECT_AREA_DATA_STATE LITERALLY  '18' ;
  21   1     DECLARE RECT_AREA_COMPLETE_STATE LITERALLY '19' ;
  22   1     DECLARE TRI_AREA_STATE LITERALLY        '20' ;
  23   1     DECLARE TRI_AREA_DATA_STATE LITERALLY   '21' ;
  24   1     DECLARE TRI_AREA_COMPLETE_STATE LITERALLY '22' ;
  25   1     DECLARE CONNECT_DOTS_STATE LITERALLY    '23' ;
  26   1     DECLARE CONNECT_DOTS_DATA_STATE LITERALLY '24' ;
  27   1     DECLARE COUNT_STATE LITERALLY           '25' ;
  28   1     DECLARE CALC_STATE LITERALLY            '26' ;
  29   1     DECLARE LIN_DIST_COMPLETE_STATE LITERALLY '27' ;
            /*
                ALL EXTERNAL ROUTINES
            */
  30   1     PR_OFF_STATE: PROCEDURE EXTERNAL ;
```

```
31  2         END PR_OFF_STATE ;
32  1      PR_ALIGN_STATE: PROCEDURE EXTERNAL ;
33  2         END PR_ALIGN_STATE ;
34  1      PR_LOCATE_MENU_STATE: PROCEDURE EXTERNAL ;
35  2         END PR_LOCATE_MENU_STATE ;
36  1      PR_READY_STATE: PROCEDURE EXTERNAL ;
37  2         END PR_READY_STATE ;
38  1      PR_SCALING_STATE: PROCEDURE EXTERNAL ;
39  2         END PR_SCALING_STATE ;
40  1      PR_SCALING_STATE_READY: PROCEDURE EXTERNAL ;
41  2         END PR_SCALING_STATE_READY ;
42  1      PR_SCALING_STATE_NEXT: PROCEDURE EXTERNAL ;
43  2         END PR_SCALING_STATE_NEXT ;
44  1      PR_AUTO_SCALING_STATE: PROCEDURE EXTERNAL ;
45  2         END PR_AUTO_SCALING_STATE ;
46  1      PR_SCALING_STATE_P2: PROCEDURE EXTERNAL ;
47  2         END PR_SCALING_STATE_P2 ;
48  1      PR_SCALING_FIRST_ENTRY: PROCEDURE EXTERNAL ;
49  2         END PR_SCALING_FIRST_ENTRY ;
50  1      PR_SCALING_SECOND_ENTRY: PROCEDURE EXTERNAL ;
51  2         END PR_SCALING_SECOND_ENTRY ;
52  1      PR_COUNT_SCALING_STATE: PROCEDURE EXTERNAL ;
53  2         END PR_COUNT_SCALING_STATE ;
54  1      PR_COUNT_SCALING_SECOND_STATE: PROCEDURE EXTERNAL ;
55  2         END PR_COUNT_SCALING_SECOND_STATE ;
56  1      PR_AREA_STATE: PROCEDURE EXTERNAL ;
57  2         END PR_AREA_STATE ;
58  1      PR_AREA_DATA_STATE: PROCEDURE EXTERNAL ;
59  2         END PR_AREA_DATA_STATE ;
60  1      PR_LIN_DIST_STATE: PROCEDURE EXTERNAL ;
61  2         END PR_LIN_DIST_STATE ;
62  1      PR_LIN_DIST_DATA_STATE: PROCEDURE EXTERNAL ;
63  2         END PR_LIN_DIST_DATA_STATE ;
64  1      PR_RECT_AREA_STATE: PROCEDURE EXTERNAL ;
65  2         END PR_RECT_AREA_STATE ;
66  1      PR_RECT_AREA_DATA_STATE: PROCEDURE EXTERNAL ;
67  2         END PR_RECT_AREA_DATA_STATE ;
68  1      PR_RECT_AREA_COMPLETE_STATE: PROCEDURE EXTERNAL ;
69  2         END PR_RECT_AREA_COMPLETE_STATE ;
70  1      PR_TRI_AREA_STATE: PROCEDURE EXTERNAL ;
71  2         END PR_TRI_AREA_STATE ;
72  1      PR_TRI_AREA_DATA_STATE: PROCEDURE EXTERNAL ;
73  2         END PR_TRI_AREA_DATA_STATE ;
74  1      PR_TRI_AREA_COMPLETE_STATE: PROCEDURE EXTERNAL ;
75  2         END PR_TRI_AREA_COMPLETE_STATE ;
76  1      PR_CONNECT_DOTS_STATE: PROCEDURE EXTERNAL ;
77  2         END PR_CONNECT_DOTS_STATE ;
78  1      PR_CONNECT_DOTS_DATA_STATE: PROCEDURE EXTERNAL ;
79  2         END PR_CONNECT_DOTS_DATA_STATE ;
80  1      PR_COUNT_STATE: PROCEDURE EXTERNAL ;
81  2         END PR_COUNT_STATE ;
82  1      PR_CALC_STATE: PROCEDURE EXTERNAL ;
83  2         END PR_CALC_STATE ;
84  1      PR_LIN_DIST_COMP_STATE: PROCEDURE EXTERNAL ;
85  2         END PR_LIN_DIST_COMP_STATE ;
86  1      CLEAR_SFT: PROCEDURE EXTERNAL ;
87  2         END CLEAR_SFT ;
88  1      CLEAR_SFCV: PROCEDURE EXTERNAL ;
```

```
89   2          END CLEAR_SFCV ;
            /*
                 SYSTEM LITERAL DEFINITIONS
            */
90   1          DECLARE ONE_LINE       LITERALLY '14' ;
91   1          DECLARE SPACE          LITERALLY '020H' ;
92   1          DECLARE VERTICAL       LITERALLY '1' ;
93   1          DECLARE HORIZONTAL     LITERALLY '2' ;
94   1          DECLARE METRIC         LITERALLY '1' ;
95   1          DECLARE ENGLISH        LITERALLY '2' ;
96   1          DECLARE BOTH           LITERALLY '3' ;
97   1          DECLARE DELTA          LITERALLY '0' ;
98   1          DECLARE ERROR          LITERALLY '1' ;
99   1          DECLARE SWITCH_TIMER_MAX   LITERALLY '100' ;
100  1          DECLARE T_CNT_MAX      LITERALLY '100' ;
101  1          DECLARE D_CNT_MAX      LITERALLY '400' ;
            /*
                 SYSTEM VARIABLES
            */
102  1          DECLARE TIMEOUT     INTEGER EXTERNAL;
103  1          DECLARE MENU_KEY    BYTE PUBLIC ;
104  1          DECLARE STATE       BYTE PUBLIC ;
105  1          DECLARE D_CHAR_CNT  BYTE PUBLIC ;
106  1          DECLARE D_BUFFER(401)  BYTE PUBLIC ;
107  1          DECLARE D_OUT_PTR   BYTE PUBLIC ;
108  1          DECLARE D_IN_PTR    BYTE PUBLIC ;
109  1          DECLARE T_BUFFER(101)  BYTE PUBLIC ;
110  1          DECLARE T_IN_PTR    BYTE PUBLIC ;
111  1          DECLARE T_OUT_PTR   BYTE PUBLIC ;
112  1          DECLARE T_CHAR_CNT  BYTE PUBLIC ;
113  1          DECLARE SWITCH_CLOSED   BYTE PUBLIC ;
114  1          DECLARE DIGITIZER_MODE  BYTE PUBLIC ;
115  1          DECLARE TX_STATE    BYTE PUBLIC ;
116  1          DECLARE NEXT_TX_STATE   BYTE PUBLIC ;
117  1          DECLARE SWITCH_TIMER    BYTE PUBLIC ;
118  1          DECLARE TIMER       INTEGER PUBLIC ;
119  1          DECLARE POINT_TIMER INTEGER PUBLIC ;
120  1          DECLARE LED         BYTE PUBLIC ;
121  1          DECLARE CORNER_COUNT    BYTE PUBLIC ;

122  1          DECLARE CPU         LITERALLY '2' ;
123  1          DECLARE NORMAL      LITERALLY '0' ;
124  1          DECLARE LINE        LITERALLY '3' ;
125  1          DECLARE POINT       LITERALLY '4' ;
126  1          DECLARE DIGIT_MAX   LITERALLY '5' ;
127  1          DECLARE L           BYTE PUBLIC ;
128  1          DECLARE TEMP_DIG1(DIGIT_MAX) BYTE PUBLIC;
129  1          DECLARE TEMP_DIG2(DIGIT_MAX) BYTE PUBLIC;
130  1          DECLARE SCALE_S1(DIGIT_MAX) BYTE PUBLIC;
131  1          DECLARE SCALE_S2(DIGIT_MAX) BYTE PUBLIC;
132  1          DECLARE HOR_SCALE_S1(DIGIT_MAX) BYTE PUBLIC;
133  1          DECLARE HOR_SCALE_S2(DIGIT_MAX) BYTE PUBLIC;
134  1          DECLARE VER_SCALE_S1(DIGIT_MAX) BYTE PUBLIC;
135  1          DECLARE VER_SCALE_S2(DIGIT_MAX) BYTE PUBLIC;
136  1          DECLARE COUNT_S1(DIGIT_MAX) BYTE PUBLIC;
137  1          DECLARE COUNT_S2(DIGIT_MAX) BYTE PUBLIC;
```

```
138  1         DECLARE S1       REAL PUBLIC ;
139  1         DECLARE S2       REAL PUBLIC ;
140  1         DECLARE SCALE_FACT REAL PUBLIC ;
141  1         DECLARE HOR_SF   REAL PUBLIC ;
142  1         DECLARE VERT_SF  REAL PUBLIC ;
143  1         DECLARE COUNT_SF REAL PUBLIC ;
144  1         DECLARE X_DATA   REAL PUBLIC ;
145  1         DECLARE Y_DATA   REAL PUBLIC ;
146  1         DECLARE P1X      REAL PUBLIC ;
147  1         DECLARE P1Y      REAL PUBLIC ;
148  1         DECLARE P2X      REAL PUBLIC ;
149  1         DECLARE P2Y      REAL PUBLIC ;
150  1         DECLARE X_POS       INTEGER PUBLIC ;
151  1         DECLARE Y_POS       INTEGER PUBLIC ;
152  1         DECLARE X_MENU      INTEGER PUBLIC ;
153  1         DECLARE Y_MENU      INTEGER PUBLIC ;
154  1         DECLARE MENU_X(4)   INTEGER PUBLIC ;
155  1         DECLARE MENU_Y(4)   INTEGER PUBLIC ;
156  1         DECLARE KEYBD_MENU_X(4) INTEGER PUBLIC ;
157  1         DECLARE KEYBD_MENU_Y(4) INTEGER PUBLIC ;
158  1         DECLARE DELTAX      INTEGER PUBLIC ;
159  1         DECLARE DELTAY      INTEGER PUBLIC ;
160  1         DECLARE MENU_VALID  BYTE PUBLIC ;
161  1         DECLARE KEYBD_MENU_VALID    BYTE PUBLIC ;
162  1         DECLARE ROTATE_FUNCT_MENU   BYTE PUBLIC ;
163  1         DECLARE ROTATE_KEYBD_MENU   BYTE PUBLIC ;
164  1         DECLARE LINE_VALID  BYTE PUBLIC ;
165  1         DECLARE LINE_STATE  BYTE PUBLIC ;
166  1         DECLARE X_SIGN      BYTE PUBLIC ;
167  1         DECLARE Y_SIGN      BYTE PUBLIC ;
168  1         DECLARE DATA_COUNT  BYTE PUBLIC ;
169  1         DECLARE DIGIT          INTEGER PUBLIC ;
170  1         DECLARE SCALING_MODE       BYTE PUBLIC ;
171  1         DECLARE SCALING_DIMENSION  BYTE PUBLIC ;
172  1         DECLARE NEXT_SCALING_MODE  BYTE PUBLIC ;
173  1         DECLARE NEXT_SCALING_DIMENSION BYTE PUBLIC ;
174  1         DECLARE SCALING_VALID_HORZ BYTE PUBLIC ;
175  1         DECLARE SCALING_VALID_VERT BYTE PUBLIC ;
176  1         DECLARE SCALING_VALID      BYTE PUBLIC ;
        /*
        MEMORY MAPPED LOCATIONS FOR I/O DEVICES
        */
177  1         DECLARE LEDS_DATA   BYTE AT(080000H) ;
178  1         DECLARE UART_CTL    BYTE AT(090001H) ;
179  1         DECLARE UART_DATA   BYTE AT(090000H) ;
180  1         DECLARE TIMER_0     BYTE AT(0A0000H) ;
181  1         DECLARE TIMER_1     BYTE AT(0A0001H) ;
182  1         DECLARE TIMER_2     BYTE AT(0A0002H) ;
183  1         DECLARE TIMER_MODE  BYTE AT(0A0003H) ;
184  1         DECLARE COM_MUX     BYTE AT(0B0000H) ;
185  1         DECLARE SWITCH_STATUS BYTE AT(0C0000H) ;

/* Used for jump to Test Set if prom is installed */
186  1         Declare TestPtr pointer data (000006H);
187  1         Declare Header byte at (000028H);
        /*
        REAL TIME INTERRUPT ROUTINES
```

```
188  1    RTI: PROCEDURE INTERRUPT 0 ;
          /*
             RESET TIMER 2 INTERRUPT
          */
189  2    TIMER_MODE = 10110000B ;   /* BINARY INTERRUPT ON COUNT   */
190  2    TIMER_2 = LOW(2457);   /* 2,457,000 /2457 = 1000 HZ = 1KHZ => 1 MSEC )*/
191  2    TIMER_2 = HIGH(2457) ;
          /*
             TEST SWITCH STATUS NORMALLY OPEN = 1
192  2    IF (SWITCH_STATUS AND 1) = 0 THEN
193  2       DO ;
194  3       SWITCH_TIMER = SWITCH_TIMER +1 ;
195  3       IF SWITCH_TIMER = SWITCH_TIMER_MAX THEN
196  3          DO ;
197  4          SWITCH_CLOSED = 1 ;
198  4          END ;
199  3       IF SWITCH_TIMER > SWITCH_TIMER_MAX THEN
200  3          DO ;
201  4          SWITCH_TIMER = SWITCH_TIMER_MAX ;
202  4          END ;
203  3       END ;
204  2    ELSE
             DO ;
205  3       SWITCH_TIMER = 0;
206  3       END ;
          /*
             INCREMENT TIMER FOR DISPLAY UPDATING
          */
207  2    TIMER = TIMER + 1 ;
208  2    IF TIMER > 30000 THEN
209  2       DO ;
210  3       TIMER = 30000 ;
211  3       END ;
          /*
             RUN LINE TO POINT DELAY TIMER THEN RESET DIG INPUT BUFFER
          */
212  2    POINT_TIMER = POINT_TIMER + 1 ;
213  2    IF POINT_TIMER = 500 THEN
214  2       DO ;
215  3       D_IN_PTR = 0 ;
216  3       D_OUT_PTR = 0 ;
217  3       D_CHAR_CNT = 0 ;
218  3       END ;
          /*
             TRANSFER LED STATUS TO LED DISPLAY
          */
219  2    LEDS_DATA = LED ;
          /*
             GET ANY DATA OUT OF UART AND PUT INTO DIGITIZER INPUT BUFFER
          */
220  2    IF (UART_CTL AND 2) = 2 THEN
221  2       DO ;     /* DATA READY */
222  3       IF D_CHAR_CNT < D_CNT_MAX THEN
223  3          DO ;
224  4          D_BUFFER(D_IN_PTR) = UART_DATA ;
225  4          D_IN_PTR=D_IN_PTR + 1 ;
226  4          D_CHAR_CNT = D_CHAR_CNT + 1 ;
227  4          IF D_IN_PTR > D_CNT_MAX THEN
228  4             DO ;
```

```
229  5                    D_IN_PTR = 0 ;
230  5                 END ;
231  4              END ;
232  3           END ;
        /*
              TRANSMITTER CONTROL
        */
233  2        IF TX_STATE = 0 THEN
234  2           DO ;
235  3              IF (UART_CTL AND 4) = 4 THEN
236  3                 DO ; /* TRANSMITTER EMPTY */
237  4                    TX_STATE = NEXT_TX_STATE ;
238  4                    DO CASE TX_STATE ;
239  5                       CALL TX_NORM ;
240  5                       CALL TX_CPU ;
241  5                       CALL TX_CRT ;
242  5                       CALL TX_LINE ;
243  5                       CALL TX_POINT ;
244  5                    END ;
245  4                    CALL PROCESS_TX_DATA ;
246  4                 END ;
247  3              END ;
248  2           ELSE
                    CALL PROCESS_TX_DATA ;
249  2        END RTI ;
        /*
              TX STATES
        */
250  1        TX_NORM: PROCEDURE ;
251  2           COM_MUX = 0 ;   /* SET CONTROLS TO NORMAL */
252  2        END TX_NORM ;
253  1        TX_CPU: PROCEDURE ;
254  2           COM_MUX = 1 ;   /* SET CONTROLS TO CPU    */
255  2        END TX_CPU ;
256  1        TX_CRT: PROCEDURE ;
257  2           COM_MUX = 2 ;   /* SET CONTROLS TO CRT    */
258  2        END TX_CRT ;
259  1        TX_LINE: PROCEDURE ;
260  2           DIGITIZER_MODE = LINE ;
261  2           UART_CTL = 05H ; /* TX ENABLED RTS ENABLED(LINE) RX ENABLED */
262  2        END TX_LINE ;
263  1        TX_POINT: PROCEDURE ;
264  2           DIGITIZER_MODE = POINT ;
265  2           UART_CTL = 025H ; /* TX ENABLED RTS DISABLED(POINT) RX ENABLED */
266  2           POINT_TIMER = 0 ;
267  2        END TX_POINT ;
        /*
              PROCESS DATA
        */
268  1        PROCESS_TX_DATA: PROCEDURE ;
269  2           IF T_CHAR_CNT > 0 THEN
270  2              DO ; /* SEND DATA */
271  3                 IF T_BUFFER(T_OUT_PTR) < 8 THEN
272  3                    DO ; /* CONTROL WORD */
273  4                       T_CHAR_CNT = T_CHAR_CNT - 1 ;
274  4                       NEXT_TX_STATE = T_BUFFER(T_OUT_PTR) ;
275  4                       TX_STATE = 0 ;
276  4                       T_OUT_PTR = T_OUT_PTR + 1 ;
```

```
277   4                    IF T_OUT_PTR > T_CNT_MAX THEN
278   4                        DO ;
279   5                            T_OUT_PTR = 0 ;
280   5                        END ;
281   4                    END ;
282   3                ELSE
                        DO ;
283   4                    IF (UART_CTL AND 1) =1 THEN
284   4                        DO ;  /* TX READY FOR DATA */
285   5                        UART_DATA = T_BUFFER(T_OUT_PTR) ;
286   5                        T_CHAR_CNT = T_CHAR_CNT - 1 ;
287   5                        T_OUT_PTR = T_OUT_PTR + 1 ;
288   5                        IF T_OUT_PTR > T_CNT_MAX THEN
289   5                            DO ;
290   6                                T_OUT_PTR = 0 ;
291   6                            END ;
292   5                        END ;
293   4                END ;
294   3            END ;
295   2        END PROCESS_TX_DATA ;

/*
                  THIS ROUTINE INITIALIZES ALL VARIABLES ON
                  POWER UP AND RETURN TO LOCATE MENU
              */

296   1       INIT_VARIABLES: PROCEDURE PUBLIC ;
297   2           SCALING_VALID = 0 ;
298   2           SCALING_VALID_HORZ = 0 ;
299   2           SCALING_VALID_VERT = 0 ;
300   2           SCALING_DIMENSION = ENGLISH ;
301   2           SCALING_MODE = BOTH ;
302   2           LINE_VALID = 0 ;

303   2           DO L = 0 TO DIGIT_MAX-1 ;
304   3               SCALE_S1(L) = 'X' ;
305   3               SCALE_S2(L) = 'X' ;
306   3               HOR_SCALE_S1(L) = 'X' ;
307   3               HOR_SCALE_S2(L) = 'X' ;
308   3               VER_SCALE_S1(L) = 'X' ;
309   3               VER_SCALE_S2(L) = 'X' ;
310   3               COUNT_S1(L) = ' ' ;
311   3               COUNT_S2(L) = ' ' ;
312   3           END ;

313   2           COUNT_S1(DIGIT_MAX-1) = '1' ;
314   2           COUNT_S2(0) = '1' ;

315   2           SCALE_FACT = 0. ;
316   2           HOR_SF = 0. ;
317   2           VERT_SF = 0. ;
318   2           COUNT_SF = 1. ;

319   2           CALL CLEAR_SFT ;
320   2           CALL CLEAR_SFCV ;

321   2       END INIT_VARIABLES ;
```

```
                /*
                    THIS IS THE START OF THE MAIN PROCESSING LOOP
                */

322   1         START: DO ;
323   2             DISABLE ;
                /* Check if Test set prom are installed */
                /* If so transfer control to it, else continue normal operation. */

324   2             If cmpb(@('TEST'),@Header,4)=0FFFFH then call TestPtr;

/*
                    SET UP INTERRUPT VECTORS
                */
326   2             CALL    SET$INTERRUPT (0,RTI) ;
327   2             CALL    SET$INTERRUPT (2,RTI) ;
                /*
                    INITALIZE THE MATH UNIT
                */
328   2             CALL    INIT$REAL$MATH$UNIT ;
                /*
                    INITALIZE BUFFER AND POINTERS FOR DATA FROM DIGITIZER
                    TO DIGITIZER INTERFACE
                */
329   2             D_IN_PTR = 0 ;
330   2             D_OUT_PTR = 0 ;
331   2             D_CHAR_CNT = 0 ;
                /*
                    INITALIZE BUFFER AND POINTERS FOR DATA SENT FROM
                    DIGITIZER INTERFACE
                */
332   2             T_IN_PTR = 0 ;
333   2             T_OUT_PTR = 0 ;
334   2             T_CHAR_CNT = 0 ;
                /*
                    VARIABLES
                */
335   2             STATE = Locate_Menu_State ;   /* do not trap in align state */
336   2             TX_STATE = 0 ;
337   2             NEXT_TX_STATE = 0 ;
338   2             CALL INIT_VARIABLES ;
                /*
                    HARDWARE INITIALIZATION
                */
                /*
                    TIMER 0  RECEIVE CLOCK
                */
339   2             TIMER_MODE = 00111110B ;   /* BINARY SQUARE WAVE */
340   2             TIMER_0 = 128 ;      /* 2,457,000 /(16 * 1200) = 127.968 */
341   2             TIMER_0 = 0 ;
                /*
                    TIMER 1 TRANSMIT CLOCK
                */
342   2             TIMEOUT=750;            /* SET TIMER VALUE FOR DISPLAY */

343   2             L = 16 ; /* DEFAULT TO 9600 BAUD */
344   2         IF (SWITCH_STATUS AND 2) = 0 THEN
345   2             DO ;
```

```
346   3           L=8 ;    /* 2,457,000/(16*19,200 BAUD) = 7.998 */
347   3           END ;
348   2       IF (SWITCH_STATUS AND 4) = 0 THEN
349   2           DO ;
350   3           L=16 ;   /* 2,457,000/(16*9600 BAUD) = 15.999 */
351   3           END ;
352   2       IF (SWITCH_STATUS AND 8) = 0 THEN
353   2           DO ;
354   3           L=32 ;   /* 2,457,000/(16*4800 BAUD) = 31.992 */
355   3           END ;
356   2       IF (SWITCH_STATUS AND 16) = 0 THEN
357   2           DO ;
358   3           L=64 ;   /* 2,457,000/(16*2400 BAUD) = 63.984 */
359   3           END ;
360   2       IF (SWITCH_STATUS AND 32) = 0 THEN
361   2           DO ;
362   3           L=128 ;  /* 2,457,000/(16*1200 BAUD) = 127.968 */
363   3           TIMEOUT=1000;          /* IN THIS CASE INCREASE TIMER VALUE TO 1 SEC. */
364   3           END ;

365   2       TIMER_MODE = 01111110B ;   /* BINARY SQUARE WAVE */
366   2       TIMER_1 = LOW(L) ;
367   2       TIMER_1 = HIGH(L) ; /* L DECLARED AS BYTE SO HIGH(L)=0 */
          /*
              TIMER 2 INTERRUPT CLOCK
          */
368   2       TIMER_MODE = 10110000B ;   /* BINARY INTERRUPT ON COUNT    */
369   2       TIMER_2 = LOW(2457);   /* 2,457,000 /2457 = 100 MHZ = 1KHZ => 1 MSEC )*/
370   2       TIMER_2 = HIGH(2457) ;
          /*
              UART
          */
371   2       UART_CTL = 0 ;
372   2       UART_CTL = 0 ;
373   2       UART_CTL = 0 ;
374   2       UART_CTL = 040H ;  /* RESET                        */
375   2       UART_CTL = 0DAH ;  /* 2 STOP ODD PARITY 7 DATA 16X CLOCK */
376   2       UART_CTL = 025H ;  /* TX ENABLED RTS DISABLED(POINT MODE) RX ENABLED */
          /*
              THIS IS THE MAIN PROCESSING LOOP
          */
377   2       DO WHILE 1 ; /* FOREVER LOOP */
378   3       DO CASE STATE ;
379   4           CALL PR_OFF_STATE ;
380   4           CALL PR_ALIGN_STATE ;
381   4           CALL PR_LOCATE_MENU_STATE ;
382   4           CALL PR_READY_STATE ;
383   4           CALL PR_SCALING_STATE ;
384   4           CALL PR_SCALING_STATE_READY ;
385   4           CALL PR_SCALING_STATE_NEXT ;
386   4           CALL PR_AUTO_SCALING_STATE ;
387   4           CALL PR_SCALING_STATE_P2 ;
388   4           CALL PR_SCALING_FIRST_ENTRY ;
389   4           CALL PR_SCALING_SECOND_ENTRY ;
390   4           CALL PR_COUNT_SCALING_STATE ;
391   4           CALL PR_COUNT_SCALING_SECOND_STATE ;
392   4           CALL PR_AREA_STATE ;
393   4           CALL PR_AREA_DATA_STATE ;
```

```
394  4          CALL PR_LIN_DIST_STATE ;
395  4          CALL PR_LIN_DIST_DATA_STATE ;
396  4          CALL PR_TRI_AREA_STATE ;           /* ACTUALLY RECTANGLE AREA */
397  4          CALL PR_TRI_AREA_DATA_STATE ;      /* ACTUALLY RECTANGLE AREA */
398  4          CALL PR_TRI_AREA_COMPLETE_STATE ;  /* ACTUALLY RECTANGLE AREA */
399  4          CALL PR_TRI_AREA_STATE ;
400  4          CALL PR_TRI_AREA_DATA_STATE ;
401  4          CALL PR_TRI_AREA_COMPLETE_STATE ;
402  4          CALL PR_CONNECT_DOTS_STATE ;
403  4          CALL PR_CONNECT_DOTS_DATA_STATE ;
404  4          CALL PR_COUNT_STATE ;
405  4          CALL PR_CALC_STATE ;
406  4          CALL PR_LIN_DIST_COMP_STATE ;
407  4       END ;
408  3       END ; /* END OF FOREVER LOOP */
409  2    END START ;
410  1 END INIT ;
```

MODULE INFORMATION:

```
    CODE AREA SIZE     = 053BH    1339D
    CONSTANT AREA SIZE = 0038H      56D
    VARIABLE AREA SIZE = 02AAH     682D
    MAXIMUM STACK SIZE = 0026H      38D
    521 LINES READ
    0 PROGRAM WARNINGS
    0 PROGRAM ERRORS
```

DICTIONARY SUMMARY:

```
    370KB MEMORY AVAILABLE
    10KB MEMORY USED   (2%)
    0KB DISK SPACE USED
```

END OF PL/M-86 COMPILATION

```
 1          MAIN:DO ;
            /*
                 STATE LITERAL DEFINITIONS
            */
 2   1      DECLARE OFF_STATE LITERALLY              '0' ;
 3   1      DECLARE ALIGN_STATE LITERALLY            '1' ;
 4   1      DECLARE LOCATE_MENU_STATE LITERALLY      '2' ;
 5   1      DECLARE READY_STATE LITERALLY            '3' ;
 6   1      DECLARE SCALING_STATE LITERALLY          '4' ;
 7   1      DECLARE SCALING_STATE_READY LITERALLY    '5' ;
 8   1      DECLARE SCALING_STATE_NEXT LITERALLY     '6' ;
 9   1      DECLARE AUTO_SCALING_STATE LITERALLY     '7' ;
10   1      DECLARE SCALING_STATE_P2 LITERALLY       '8' ;
11   1      DECLARE SCALING_FIRST_ENTRY LITERALLY    '9' ;
12   1      DECLARE SCALING_SECOND_ENTRY LITERALLY   '10' ;
13   1      DECLARE COUNT_SCALING_STATE LITERALLY    '11' ;
14   1      DECLARE COUNT_SCALING_SECOND_STATE LITERALLY  '12' ;
15   1      DECLARE AREA_STATE LITERALLY             '13' ;
16   1      DECLARE AREA_DATA_STATE LITERALLY        '14' ;
17   1      DECLARE LIN_DIST_STATE LITERALLY         '15' ;
18   1      DECLARE LIN_DIST_DATA_STATE LITERALLY    '16' ;
19   1      DECLARE RECT_AREA_STATE LITERALLY        '17' ;
```

```
20  1            DECLARE RECT_AREA_DATA_STATE LITERALLY     '18' ;
21  1            DECLARE RECT_AREA_COMPLETE_STATE LITERALLY '19' ;
22  1            DECLARE TRI_AREA_STATE LITERALLY           '20' ;
23  1            DECLARE TRI_AREA_DATA_STATE LITERALLY      '21' ;
24  1            DECLARE TRI_AREA_COMPLETE_STATE LITERALLY  '22' ;
25  1            DECLARE CONNECT_DOTS_STATE LITERALLY       '23' ;
26  1            DECLARE CONNECT_DOTS_DATA_STATE LITERALLY  '24' ;
27  1            DECLARE COUNT_STATE LITERALLY              '25' ;
28  1            DECLARE CALC_STATE LITERALLY               '26' ;
29  1            DECLARE LIN_DIST_COMPLETE_STATE LITERALLY  '27' ;
         /*
             KEY LITERAL DEFINITIONS
         */
30  1            DECLARE ZERO_KEY         LITERALLY '030H' ;
31  1            DECLARE ONE_KEY          LITERALLY '031H' ;
32  1            DECLARE TWO_KEY          LITERALLY '032H' ;
33  1            DECLARE THREE_KEY        LITERALLY '033H' ;
34  1            DECLARE FOUR_KEY         LITERALLY '034H' ;
35  1            DECLARE FIVE_KEY         LITERALLY '035H' ;
36  1            DECLARE SIX_KEY          LITERALLY '036H' ;
37  1            DECLARE SEVEN_KEY        LITERALLY '037H' ;
38  1            DECLARE EIGHT_KEY        LITERALLY '038H' ;
39  1            DECLARE NINE_KEY         LITERALLY '039H' ;
40  1            DECLARE ENGLISH_SCALE_KEY    LITERALLY ' 1' ;
41  1            DECLARE METRIC_SCALE_KEY     LITERALLY ' 2' ;
42  1            DECLARE COUNT_SCALE_KEY      LITERALLY ' 3' ;
43  1            DECLARE AUTO_SCALE_KEY       LITERALLY ' 4' ;
44  1            DECLARE HORIZONTAL_KEY        LITERALLY ' 5' ;
45  1            DECLARE VERTICAL_KEY          LITERALLY ' 6' ;
46  1            DECLARE DISPLAY_SCALE_KEY     LITERALLY ' 7' ;
47  1            DECLARE CLOSED_SHAPE_KEY      LITERALLY ' 8' ;
48  1            DECLARE LINE_DIST_KEY         LITERALLY ' 9' ;
49  1            DECLARE RECT_AREA_KEY         LITERALLY '10' ;
50  1            DECLARE TRI_AREA_KEY          LITERALLY '11' ;
51  1            DECLARE CONNECT_DOTS_KEY      LITERALLY '12' ;
52  1            DECLARE COUNT_KEY        LITERALLY '13' ;
53  1            DECLARE DONE_KEY         LITERALLY '14' ;
54  1            DECLARE SEND_KEY         LITERALLY '15' ;
55  1            DECLARE CLEAR_KEY        LITERALLY '16' ;
56  1            DECLARE CLEAR_LAST_KEY       LITERALLY '17' ;
57  1            DECLARE PLUS_KEY         LITERALLY '18' ;
58  1            DECLARE MINUS_KEY        LITERALLY '19' ;
59  1            DECLARE MULT_KEY         LITERALLY '20' ;
60  1            DECLARE DIVIDE_KEY       LITERALLY '21' ;
61  1            DECLARE DP_KEY           LITERALLY '22' ;
         /* DECLARE LEFT_BRACE_KEY        LITERALLY '23' ; */
         /* DECLARE RIGHT_BRACE_KEY       LITERALLY '24' ; */
         /* DECLARE S_KEY            LITERALLY '25' ; */
62  1            DECLARE PI_KEY           LITERALLY '26' ;
         /* DECLARE RETURN_KEY       LITERALLY '27' ; */
63  1            DECLARE SKIP_KEY         LITERALLY '28' ;
64  1            DECLARE ENTER_KEY        LITERALLY '29' ;
65  1            DECLARE BKFLD_KEY        LITERALLY '30' ;
66  1            DECLARE F1_KEY           LITERALLY '31' ;
67  1            DECLARE F2_KEY           LITERALLY '32' ;
68  1            DECLARE F3_KEY           LITERALLY '33' ;
69  1            DECLARE F4_KEY           LITERALLY '34' ;
70  1            DECLARE F5_KEY           LITERALLY '35' ;
```

```
71  1         DECLARE F6_KEY           LITERALLY '36' ;
72  1         DECLARE F7_KEY           LITERALLY '37' ;
73  1         DECLARE F8_KEY           LITERALLY '38' ;
74  1         DECLARE DEL_CHAR_KEY     LITERALLY '39' ;
75  1         DECLARE LEFT_ARROW_KEY   LITERALLY '40' ;
76  1         DECLARE RIGHT_ARROW_KEY  LITERALLY '41' ;
77  1         DECLARE INS_CHAR_KEY     LITERALLY '42' ;
        /*    DECLARE CLEAR_KEY_2      LITERALLY '43' ; */
78  1         DECLARE PRINT_KEY        LITERALLY '44' ;
        /*    DECLARE SPACE_KEY        LITERALLY '45' ; */
79  1         DECLARE ON_KEY           LITERALLY '46' ;
80  1         DECLARE OFF_KEY          LITERALLY '47' ;

81  1         DECLARE LOG_ON_KEY       LITERALLY '23' ;
82  1         DECLARE LOG_OFF_KEY      LITERALLY '24' ;

/* MAX KEY VALUE = 47 SINCE 48 DEC = 030 HEX ZERO KEY */

/*
           SYSTEM LITERAL DEFINITIONS
        */
83  1         DECLARE ONE_LINE         LITERALLY '11' ;
84  1         DECLARE SPACE            LITERALLY '020H' ;
85  1         DECLARE VERTICAL         LITERALLY '1' ;
86  1         DECLARE HORIZONTAL       LITERALLY '2' ;
87  1         DECLARE METRIC           LITERALLY '1' ;
88  1         DECLARE ENGLISH          LITERALLY '2' ;
89  1         DECLARE BOTH             LITERALLY '3' ;
90  1         DECLARE AUTO             LITERALLY '4' ;
91  1         DECLARE T_CNT_MAX        LITERALLY '100' ;
92  1         DECLARE D_CNT_MAX        LITERALLY '400' ;
        /*
           SYSTEM VARIABLES
        */
93  1         DECLARE MENU_KEY    BYTE EXTERNAL ;
94  1         DECLARE STATE       BYTE EXTERNAL ;
95  1         DECLARE D_CHAR_CNT  BYTE EXTERNAL ;
96  1         DECLARE D_BUFFER(401)  BYTE EXTERNAL ;
97  1         DECLARE D_OUT_PTR   BYTE EXTERNAL ;
98  1         DECLARE T_BUFFER(101)  BYTE EXTERNAL ;
99  1         DECLARE T_IN_PTR    BYTE EXTERNAL ;
100 1         DECLARE T_CHAR_CNT  BYTE EXTERNAL ;
101 1         DECLARE SWITCH_CLOSED  BYTE EXTERNAL ;
102 1         DECLARE LED         BYTE EXTERNAL ;
103 1         DECLARE DIGITIZER_MODE  BYTE EXTERNAL ;
104 1         DECLARE CORNER_COUNT    BYTE EXTERNAL ;

105 1         DECLARE CRT         LITERALLY '2' ;
106 1         DECLARE NORMAL      LITERALLY '0' ;
107 1         DECLARE LINE        LITERALLY '3' ;
108 1         DECLARE POINT       LITERALLY '4' ;
109 1         DECLARE DIGIT_MAX   LITERALLY '5' ;
110 1         DECLARE L           BYTE EXTERNAL ;
111 1         DECLARE TEMP_DIG1(DIGIT_MAX) BYTE EXTERNAL;
112 1         DECLARE TEMP_DIG2(DIGIT_MAX) BYTE EXTERNAL;
113 1         DECLARE SCALE_S1(DIGIT_MAX) BYTE EXTERNAL;
114 1         DECLARE SCALE_S2(DIGIT_MAX) BYTE EXTERNAL;
115 1         DECLARE HOR_SCALE_S1(DIGIT_MAX) BYTE EXTERNAL;
```

```
116  1        DECLARE HOR_SCALE_S2(DIGIT_MAX) BYTE EXTERNAL;
117  1        DECLARE VER_SCALE_S1(DIGIT_MAX) BYTE EXTERNAL;
118  1        DECLARE VER_SCALE_S2(DIGIT_MAX) BYTE EXTERNAL;
119  1        DECLARE COUNT_S1(DIGIT_MAX) BYTE EXTERNAL;
120  1        DECLARE COUNT_S2(DIGIT_MAX) BYTE EXTERNAL;

121  1        DECLARE S1         REAL EXTERNAL ;
122  1        DECLARE S2         REAL EXTERNAL ;
123  1        DECLARE SCALE_FACT REAL EXTERNAL ;
124  1        DECLARE HOR_SF     REAL EXTERNAL ;
125  1        DECLARE VERT_SF    REAL EXTERNAL ;
126  1        DECLARE COUNT_SF   REAL EXTERNAL ;
127  1        DECLARE X_DATA     REAL EXTERNAL ;
128  1        DECLARE Y_DATA     REAL EXTERNAL ;
129  1        DECLARE P1X        REAL EXTERNAL ;
130  1        DECLARE P1Y        REAL EXTERNAL ;
131  1        DECLARE P2X        REAL EXTERNAL ;
132  1        DECLARE P2Y        REAL EXTERNAL ;
133  1        DECLARE X_POS      INTEGER EXTERNAL ;
134  1        DECLARE Y_POS      INTEGER EXTERNAL ;
135  1        DECLARE X_MENU     INTEGER EXTERNAL ;
136  1        DECLARE Y_MENU     INTEGER EXTERNAL ;
137  1        DECLARE MENU_X(4)  INTEGER EXTERNAL ;
138  1        DECLARE MENU_Y(4)  INTEGER EXTERNAL ;
139  1        DECLARE KEYBD_MENU_X(4) INTEGER EXTERNAL ;
140  1        DECLARE KEYBD_MENU_Y(4) INTEGER EXTERNAL ;
141  1        DECLARE DELTAX     INTEGER EXTERNAL ;
142  1        DECLARE DELTAY     INTEGER EXTERNAL ;
143  1        DECLARE MENU_VALID BYTE EXTERNAL ;
144  1        DECLARE KEYBD_MENU_VALID   BYTE EXTERNAL ;
145  1        DECLARE ROTATE_FUNCT_MENU  BYTE EXTERNAL ;
146  1        DECLARE ROTATE_KEYBD_MENU  BYTE EXTERNAL ;
147  1        DECLARE LINE_VALID BYTE EXTERNAL ;
148  1        DECLARE LINE_STATE BYTE EXTERNAL ;
149  1        DECLARE X_SIGN     BYTE EXTERNAL ;
150  1        DECLARE Y_SIGN     BYTE EXTERNAL ;
151  1        DECLARE DATA_COUNT BYTE EXTERNAL ;
152  1        DECLARE DOWN_FLAG  BYTE EXTERNAL ;
153  1        DECLARE DIGIT            INTEGER EXTERNAL ;
154  1        DECLARE SCALING_MODE      BYTE EXTERNAL ;
155  1        DECLARE SCALING_DIMENSION BYTE EXTERNAL ;
156  1        DECLARE NEXT_SCALING_MODE BYTE EXTERNAL ;
157  1        DECLARE NEXT_SCALING_DIMENSION BYTE EXTERNAL ;
158  1        DECLARE SCALING_VALID_HORZ BYTE EXTERNAL ;
159  1        DECLARE SCALING_VALID_VERT BYTE EXTERNAL ;
160  1        DECLARE SCALING_VALID      BYTE EXTERNAL ;

161  1        DECLARE EXP      BYTE;    /* FOR USE IN BUILDING SCALING VALUES */
162  1        DECLARE EXPFLAG  BYTE;
163  1        DECLARE EX       BYTE;

/*
             EXTERNAL PROCEDURES
          */

/*
             INITALIZE VARIABLES
          */
```

```
164   1     INIT_VARIABLES: PROCEDURE EXTERNAL ;
165   2     END INIT_VARIABLES ;

/*
                    SQUARE ROOT OF A REAL VARIABLE
            */

166   1     SQRT: PROCEDURE(A) REAL EXTERNAL ;
167   2     DECLARE A REAL ;
168   2     END SQRT ;

/*
                CONVERT A REAL TO ASCII
            */

169   1         DECLARE TEMP BYTE EXTERNAL ;
170   1         DECLARE TEMP_ARY(9) BYTE AT(@TEMP) ;
171   1         DECLARE ASC_DATA(19) BYTE ;
172   1     ASCI: PROCEDURE(R) ;
173   2         DECLARE R REAL ;
174   2     CALL SFPTBCD(R) ;
175   2     DO L = 0 TO 8 ;
176   3     ASC_DATA(2*L) = 030H + (0FH AND TEMP_ARY(L)) ;
177   3     ASC_DATA(2*L+1) = 030H + (SHR( TEMP_ARY(L),4)) ;
178   3     END ;
179   2     END ASCI;

/*
                MATH PROCEDURU TO CONVERT SHORT REAL TO BCD
                RESULTS ARE RETURNED AT LOCATION TEMP
            */

180   1     SFPTBCD: PROCEDURE(X) EXTERNAL ;
181   2         DECLARE X REAL ;
182   2     END SFPTBCD ;

/*
                ALIGN STATE ALL DATA FROM DIGITIZER IS PASSED ON TO THE CRT
            */

183   1     PR_ALIGN_STATE: PROCEDURE PUBLIC ;
184   2     LED = 0FEH ;
            /* SEND COMMAND TO SWITCH COMM MUX SO DATA WILL GO TO CRT */
185   2     CALL    SEND(1,@(CRT)) ;
186   2     DO WHILE STATE = ALIGN_STATE ;
187   3         IF D_CHAR_CNT > 0 THEN
188   3             DO ; /* DATA IS READY */
189   4                 T_BUFFER(T_IN_PTR) = D_BUFFER(D_OUT_PTR) ;
190   4                 T_CHAR_CNT = T_CHAR_CNT +1 ;
191   4                 D_CHAR_CNT = D_CHAR_CNT -1 ;
192   4                 T_IN_PTR = T_IN_PTR +1 ;
193   4                 D_OUT_PTR = D_OUT_PTR +1 ;
194   4                 IF T_IN_PTR > T_CNT_MAX THEN
195   4                     DO ;
196   5                         T_IN_PTR = 0 ;
197   5                         END ;
```

```
198  4              IF D_OUT_PTR > D_CNT_MAX THEN
199  4                 DO ;
200  5                    D_OUT_PTR = 0 ;
201  5                 END ;
202  4              END ;
203  3              IF SWITCH_CLOSED = 1 THEN
204  3                 DO ;
205  4                    SWITCH_CLOSED = 0 ;
206  4                    STATE = LOCATE_MENU_STATE ;
                          /* SEND COMMAND TO SWITCH COMM MUX */
207  4                 END ;
208  3           END ;
209  2        END PR_ALIGN_STATE ;

/*
                 LOCATE MENU STATE
             */

210  1       PR_LOCATE_MENU_STATE: PROCEDURE PUBLIC ;
211  2           CALL    SEND(1,@(NORMAL)) ;
212  2           MENU_VALID = 0 ;
213  2           KEYBD_MENU_VALID = 0 ;
214  2           CORNER_COUNT = 0 ;
215  2           LED = 0FDH ;
216  2           DO WHILE STATE = LOCATE_MENU_STATE ;
217  3              CALL PR_LINE ;
218  3              IF LINE_VALID = 1 THEN
219  3                 DO ;
220  4                    MENU_X(CORNER_COUNT) = X_POS ;
221  4                    MENU_Y(CORNER_COUNT) = Y_POS ;
222  4                    CORNER_COUNT = CORNER_COUNT +1 ;
223  4                    IF CORNER_COUNT = 4 THEN
224  4                       DO ;   /* CHECK IF MENU WAS LOCATED PROPERLY */
225  5                          CALL PR_LOCATE_MENU ;
226  5                          IF MENU_VALID = 1 THEN
227  5                             DO ;
228  6                                LED = 0FBH ;
229  6                                STATE = Ready_State ;   /* LOCATED FUNCTION MENU */
230  6                                Scaling_Valid=1;        /* If not set it will only = 0 */
                                   /* CALL INIT_VARIABLES ;  */
231  6                                CALL PR_SCALE_MESSAGE ;
232  6                             END ;
233  5                          ELSE
                                   DO ;
234  6                             IF MENU_VALID = 2 THEN
235  6                                DO ;
236  7                                   MENU_VALID = 0 ;   /* LOCATED KEYBOARD MENU */
237  7                                   KEYBD_MENU_VALID = 1 ;
238  7                                   CORNER_COUNT = 0 ;
239  7                                END ;
240  6                             ELSE
                                      DO ;
241  7                                   STATE = ALIGN_STATE ;
242  7                                END ;
243  6                          END ;
244  5                       END ;
245  4                 END ;
246  3              CALL CHECK_SWITCH ;
```

```
247   3        END;
248   2     END PR_LOCATE_MENU_STATE ;

/*
                CHECK THE POSITIONING OF A REGULAR MENU
            */
249   1     DECLARE ERROR      LITERALLY '30' ;

250   1     PR_LOCATE_MENU_TEST: PROCEDURE ;
251   2        MENU_VALID = 1 ;
252   2        IF IABS(MENU_Y(0)-MENU_Y(1) - DELTAY) > ERROR THEN MENU_VALID = 0 ;
254   2        IF IABS(MENU_Y(3)-MENU_Y(2) - DELTAY) > ERROR THEN MENU_VALID = 0 ;
256   2        IF IABS(MENU_X(2)-MENU_X(1) - DELTAX) > ERROR THEN MENU_VALID = 0 ;
258   2        IF IABS(MENU_X(3)-MENU_X(0) - DELTAX) > ERROR THEN MENU_VALID = 0 ;
260   2        IF IABS( MENU_Y(1)-MENU_Y(2)) > ERROR THEN MENU_VALID = 0 ;
262   2        IF IABS( MENU_Y(0)-MENU_Y(3)) > ERROR THEN MENU_VALID = 0 ;
264   2        IF IABS( MENU_X(0)-MENU_X(1)) > ERROR THEN MENU_VALID = 0 ;
266   2        IF IABS( MENU_X(2)-MENU_X(3)) > ERROR THEN MENU_VALID = 0 ;
268   2     END PR_LOCATE_MENU_TEST ;

/*
                CHECK THE POSITIONING OF A ROTATED MENU
            */

269   1     PR_LOCATE_ROTATED_MENU_TEST: PROCEDURE ;
270   2        MENU_VALID = 1 ;
271   2        IF IABS(MENU_Y(0)-MENU_Y(1)) > ERROR THEN MENU_VALID = 0 ;
273   2        IF IABS(MENU_Y(3)-MENU_Y(2)) > ERROR THEN MENU_VALID = 0 ;
275   2        IF IABS(MENU_X(2)-MENU_X(1)) > ERROR THEN MENU_VALID = 0 ;
277   2        IF IABS(MENU_X(3)-MENU_X(0)) > ERROR THEN MENU_VALID = 0 ;
279   2        IF IABS( MENU_Y(1)-MENU_Y(2) - DELTAX) > ERROR THEN MENU_VALID = 0 ;
281   2        IF IABS( MENU_Y(0)-MENU_Y(3) - DELTAX) > ERROR THEN MENU_VALID = 0 ;
283   2        IF IABS( MENU_X(0)-MENU_X(1) - DELTAY) > ERROR THEN MENU_VALID = 0 ;
285   2        IF IABS( MENU_X(3)-MENU_X(2) - DELTAY) > ERROR THEN MENU_VALID = 0 ;
287   2     END PR_LOCATE_ROTATED_MENU_TEST ;

/*
                SET UP THE VARIOUS WAYS THE MENUS CAN BE PLACES AND THEN
                TEST EACH. THE FIRST VALID TEST IDENTIFIES THE MENU,
                IT'S LOCATION AND ROTATION.
            */

288   1     DECLARE X_NORM_FUNCT      LITERALLY '1279' ;
289   1     DECLARE Y_NORM_FUNCT      LITERALLY '230' ;
290   1     DECLARE X_NORM_KEYBD      LITERALLY '925' ;
291   1     DECLARE Y_NORM_KEYBD      LITERALLY '233' ;

292   1     PR_LOCATE_MENU: PROCEDURE ;
293   2     DELTAX = X_NORM_FUNCT ;
294   2     DELTAY = Y_NORM_FUNCT ;
295   2     CALL PR_LOCATE_MENU_TEST ;
296   2     IF MENU_VALID = 1 THEN
297   2        DO ; /* FUNCTION MENU LOCATED NOT ROTATED */
298   3        ROTATE_FUNCT_MENU = 0 ;
299   3        END ;
300   2     ELSE
              DO ;
301   3        CALL PR_LOCATE_ROTATED_MENU_TEST ;
```

```
302  3          IF MENU_VALID = 1 THEN
303  3              DO ; /* FUNCTION MENU LOCATED ROTATED */
304  4              ROTATE_FUNCT_MENU = 1 ;
305  4              END ;
306  3          ELSE
                    DO ;
307  4              DELTAX = X_NORM_KEYBD ; /* KEYBOARD MENU TEST */
308  4              DELTAY = Y_NORM_KEYBD ;
309  4              CALL PR_LOCATE_MENU_TEST ;
310  4              IF MENU_VALID = 1 THEN
311  4                  DO ; /* KEYBOARD MENU LOCATED NOT ROTATED */
312  5                  ROTATE_KEYBD_MENU = 0 ;
313  5                  MENU_VALID = 2 ;
314  5                      DO L = 0 TO 3 ;
315  6                      KEYBD_MENU_X(L) = MENU_X(L) ;
316  6                      KEYBD_MENU_Y(L) = MENU_Y(L) ;
317  6                      END ;
318  5                  END ;
319  4              ELSE
                        DO ;
320  5              CALL PR_LOCATE_ROTATED_MENU_TEST ;
321  5              IF MENU_VALID = 1 THEN
322  5                  DO ; /* KEYBOARD MENU LOCATED ROTATED */
323  6                  ROTATE_KEYBD_MENU = 1 ;
324  6                  MENU_VALID = 2 ;   /* LOCATED KEYBOARD MENU */
325  6                      DO L = 0 TO 3 ;
326  7                      KEYBD_MENU_X(L) = MENU_X(L) ;
327  7                      KEYBD_MENU_Y(L) = MENU_Y(L) ;
328  7                      END ;
329  6                  END ;
330  5              END ;
331  4              END ;
332  3          END ;
333  2      END PR_LOCATE_MENU ;

/*
            PROCESS A LINE OF DATA FROM THE DIGITIZER
            THE DIGITIZER IS ALWAYS IN THE ENGLISH SCALE
            1 COUNT = 1/100 INCHES

FORMAT    SXXXXXSYYYYYCL
            X SIGN....!
            X DATA.....!!!!!
            Y SIGN..........!
            Y DATA...........!!!!!
            CR..................!
            LINE FEED................!
            */

334  1      PR_LINE: PROCEDURE PUBLIC ;
335  2      LINE_VALID = 1 ; /* ASSUME VALID */
336  2      MENU_KEY = 0 ;   /* ASSUME NOT IN MENU */
337  2      IF D_CHAR_CNT < (ONE_LINE+1) THEN LINE_VALID = 0 ; /* NOT ENOUGH DATA */
339  2      ELSE
                DO ;
340  3      LINE_STATE = 0 ; /* START */
341  3      DO WHILE (LINE_VALID = 1) AND (LINE_STATE <> 6) ; /* LAST STATE = 6 */
342  4          DO CASE LINE_STATE ;
```

```
343   5                      CALL PR_X_SIGN ;
344   5                      CALL PR_X_DATA ;
345   5                      CALL PR_Y_SIGN ;
346   5                      CALL PR_Y_DATA ;
347   5                      CALL PR_CR ;
348   5                      CALL PR_LF ;
349   5                  END ;
350   4              D_CHAR_CNT = D_CHAR_CNT -1 ;
351   4              D_OUT_PTR = D_OUT_PTR + 1 ;
352   4              IF D_OUT_PTR > D_CNT_MAX THEN D_OUT_PTR = 0 ;
354   4          END ;
355   3      END ;
356   2  END PR_LINE ;

/*
             LOOK FOR A SPACE OR A MINUS SIGN
         */

357   1  PR_X_SIGN: PROCEDURE ;
358   2      LINE_STATE = 1 ;
359   2      X_POS = 0 ;
360   2      DATA_COUNT = 0 ;
361   2      IF D_BUFFER(D_OUT_PTR) = '-' THEN X_SIGN = 1 ; /* NEGATIVE */
363   2      ELSE
                DO ;
364   3          IF D_BUFFER(D_OUT_PTR) = SPACE THEN X_SIGN = 0 ; /* POSITIVE */
366   3          ELSE LINE_VALID = 0 ;
367   3          END ;
368   2  END PR_X_SIGN ;

/*
             LOOK FOR DIGITS
         */

369   1  PR_X_DATA: PROCEDURE ;
370   2      IF (D_BUFFER(D_OUT_PTR) < 030H) OR (D_BUFFER(D_OUT_PTR) > 039H) THEN
371   2          LINE_VALID = 0 ;
372   2      ELSE
                DO ;
373   3          X_POS = X_POS * 10 + SIGNED (D_BUFFER(D_OUT_PTR)) - 030H ;
374   3          DATA_COUNT = DATA_COUNT +1 ;
375   3          IF DATA_COUNT > 3 THEN LINE_STATE = 2 ;
377   3          END ;
378   2  END PR_X_DATA ;

/*
             LOOK FOR A SPACE OR A MINUS SIGN
         */

379   1  PR_Y_SIGN: PROCEDURE ;
380   2      LINE_STATE = 3 ;
381   2      Y_POS = 0 ;
382   2      DATA_COUNT = 0 ;
383   2      IF D_BUFFER(D_OUT_PTR) = '-' THEN Y_SIGN = 1 ; /* NEGATIVE */
385   2      ELSE
                DO ;
386   3          IF D_BUFFER(D_OUT_PTR) = SPACE THEN Y_SIGN = 0 ; /* POSITIVE */
```

```
388  3         ELSE LINE_VALID = 0 ;
389  3         END ;
390  2      END PR_Y_SIGN ;

/*
               LOOK FOR DIGITS
           */

391  1     PR_Y_DATA: PROCEDURE ;
392  2        IF (D_BUFFER(D_OUT_PTR) < 030H) OR (D_BUFFER(D_OUT_PTR) > 039H) THEN
393  2            LINE_VALID = 0 ;
394  2        ELSE
                  DO ;
395  3            Y_POS = Y_POS * 10 + SIGNED(D_BUFFER(D_OUT_PTR)) - 030H ;
396  3            DATA_COUNT = DATA_COUNT +1 ;
397  3            IF DATA_COUNT > 3 THEN LINE_STATE = 4 ;
399  3            END ;
400  2     END PR_Y_DATA ;

/*
               LOOK FOR A CARRIAGE RETURN CHARACTER
           */

401  1     PR_CR: PROCEDURE ;
402  2        IF D_BUFFER(D_OUT_PTR) = 0DH THEN LINE_STATE = 5 ;
404  2        ELSE LINE_VALID = 0 ;
405  2     END PR_CR ;

/*
               LOOK FOR A LINE FEED CHARACTER
           */

406  1     PR_LF: PROCEDURE ;
407  2     IF D_BUFFER(D_OUT_PTR) = 0AH THEN
408  2        DO ;
409  3        LINE_STATE = 6 ;
410  3        IF X_SIGN = 0 THEN X_POS = - X_POS ;
412  3        IF Y_SIGN = 1 THEN Y_POS = - Y_POS ;
414  3        X_DATA = FLOAT(X_POS) ;
415  3        Y_DATA = FLOAT(Y_POS) ;
416  3        END ;
417  2     ELSE LINE_VALID = 0 ;
418  2     END PR_LF ;

/*
               THIS ROUTINE LOOKS FOR THE
                   ENGLISH_SCALE_KEY
                   METRIC_SCALE_KEY
                   AUTO_SCALE_KEY
                   DISPLAY_SCALE_KEY
           */

419  1     CHECK_SCALE_KEYS: PROCEDURE PUBLIC ;
420  2        declare EngMsgStr(*) byte data(CRT,01BH,047H,048H,01BH,028H,
                                        'Enter English Scale ',01BH,029H,normal) ;
```

```
421  2       declare MetMsgStr(*) byte data(CRT,01BH,047H,04BH,01BH,02BH,
                                            'Enter Metric Scale ',01BH,029H,normal) ;
422  2       declare AutMsgStr(*) byte data(CRT,01BH,047H,04BH,01BH,02BH,
                                            'Enter Auto Scale ',01BH,029H,normal);
423  2       IF MENU_KEY = ENGLISH_SCALE_KEY THEN
424  2          DO ;
425  3             NEXT_SCALING_DIMENSION = ENGLISH ;
426  3             STATE = SCALING_STATE_READY ;
427  3             NEXT_SCALING_MODE = BOTH ;
428  3             call send(length(EngMsgStr),@EngMsgStr);
429  3          END ;
430  2       IF MENU_KEY = METRIC_SCALE_KEY THEN
431  2          DO ;
432  3             NEXT_SCALING_DIMENSION = METRIC ;
433  3             STATE = SCALING_STATE_READY ;
434  3             NEXT_SCALING_MODE = BOTH ;
435  3             call send(length(MetMsgStr),@MetMsgStr);
436  3          END ;
437  2       IF MENU_KEY = AUTO_SCALE_KEY THEN
438  2          DO;
439  3             NEXT_SCALING_DIMENSION = AUTO ;
440  3             STATE = AUTO_SCALING_STATE ;
441  3             CALL SEND(LENGTH(AUTMSGSTR),@AUTMSGSTR) ;
442  3             NEXT_SCALING_MODE = BOTH ;
443  3          END;
444  2       IF MENU_KEY = DISPLAY_SCALE_KEY THEN
445  2          DO ;
446  3             CALL PR_SCALE_MESSAGE ;
447  3          END ;
448  2       END CHECK_SCALE_KEYS ;

/*
                THIS ROUTINE CHECKS FOR A SWITCH CLOSURE AND THEN
                RESETS THE FLAG AND CHANGES THE STATE TO ALIGN
             */

449  1       CHECK_SWITCH: PROCEDURE PUBLIC ;
450  2          IF SWITCH_CLOSED = 1 THEN
451  2             DO ;
452  3                SWITCH_CLOSED = 0 ;
453  3                STATE = ALIGN_STATE ;
454  3             END ;
455  2       END CHECK_SWITCH ;

/*
                THIS ROUTINE IS THE MAIN ENTRY POINT
                FOR THE SCALING PROCESS
             */

456  1       PR_SCALING_STATE:  PROCEDURE PUBLIC ;
457  2       DO WHILE STATE = SCALING_STATE ;
458  3          CALL PR_LINE ;
459  3          IF LINE_VALID = 1 THEN
460  3             DO ;
461  4                CALL PR_MENU_KEYS ;
```

```
462  4              IF MENU_KEY <> 0 THEN
463  4                  DO ;
464  5                      CALL CHECK_SCALE_KEYS ;  /* LOOK FOR ENGLISH METRIC OR DISP SCALE KEYS */
465  5                      IF MENU_KEY = DISPLAY_SCALE_KEY THEN
466  5                          STATE = READY_STATE ;       /* DON'T RESEND MESSAGE */
467  5                      ELSE IF MENU_KEY = COUNT_SCALE_KEY THEN
468  5                          STATE = COUNT_SCALING_STATE ;
469  5                      ELSE IF MENU_KEY = OFF_KEY THEN
470  5                          STATE = OFF_STATE ;
471  5                  END ;
472  4              END ;
473  3          CALL CHECK_SWITCH ;
474  3      END ;
475  2  END PR_SCALING_STATE ;

/*
        THIS ROUTINE IS THE SECOND STEP IN
        SETTING UP THE SCALING PARAMETERS
    */

476  1  PR_SCALING_STATE_READY:  PROCEDURE PUBLIC ;
477  2  EXPFLAG=0;
478  2  DO WHILE STATE = SCALING_STATE_READY ;
479  3      CALL PR_LINE ;
480  3      IF LINE_VALID = 1 THEN
481  3          DO ;
482  4              CALL PR_MENU_KEYS ;
483  4              IF MENU_KEY <> 0 THEN
484  4                  DO ;
485  5                      IF MENU_KEY = HORIZONTAL_KEY THEN
486  5                          DO ;
487  6                              NEXT_SCALING_MODE = HORIZONTAL ;
488  6                              STATE = SCALING_STATE_NEXT ;
489  6                          END ;
490  5                      ELSE IF MENU_KEY = VERTICAL_KEY THEN
491  5                          DO ;
492  6                              NEXT_SCALING_MODE = VERTICAL ;
493  6                              STATE = SCALING_STATE_NEXT ;
494  6                          END ;
495  5                      ELSE IF (MENU_KEY >= 030H) AND (MENU_KEY <= 039H) THEN
496  5                          DO ;
497  6                              DIGIT = 0 ;
498  7                              DO L = 0 TO DIGIT_MAX -2 ; TEMP_DIGI(L) = ' ' ; END ;
 01  6                              TEMP_DIGI(DIGIT_MAX-1) = MENU_KEY ;
 02  6                              DIGIT = DIGIT + SIGNED(MENU_KEY) - 030H ;
 03  6                              STATE = SCALING_FIRST_ENTRY ;
 04  6                          END ;
 05  5                      ELSE IF MENU_KEY = DP_KEY THEN
 06  5                          DO ;
 07  6                              DIGIT = 0 ;
 08  6                              EXP=0; EXPFLAG=1;
 0   7                              DO L = 0 TO DIGIT_MAX -2 ; TEMP_DIGI(L) = ' ' ; END ;
 3   6                              TEMP_DIGI(DIGIT_MAX-1) = 02EH ;
 4   6                              STATE = SCALING_FIRST_ENTRY ;
 5   6                          END ;
 6   5                      ELSE IF MENU_KEY = DISPLAY_SCALE_KEY THEN
 7   5                          DO ;
```

```
518  6                            CALL PR_SCALE_MESSAGE ;
519  6                            STATE = READY_STATE ;
520  6                          END ;
521  5                        END ;
522  4                    END ;
523  3                CALL CHECK_SWITCH ;
524  3            END ;
525  2       END PR_SCALING_STATE_READY ;

/*
              THIS ROUTINE GATHERS THE FIRST PART OF THE SCALING DATA
          */

526  1       PR_SCALING_STATE_NEXT: PROCEDURE PUBLIC ;
527  2        DIGIT = 0 ;
528  3        DO L = 0 TO DIGIT_MAX -2 ; TEMP_DIGI(L) = ' ' ; END ;
531  2        DO WHILE STATE = SCALING_STATE_NEXT ;
532  3            CALL PR_LINE ;
533  3            IF LINE_VALID = 1 THEN
534  3               DO ;
535  4                CALL PR_MENU_KEYS ;
536  4                IF MENU_KEY <> 0 THEN
537  4                  DO ;
538  5                    IF (MENU_KEY >= 030H) AND (MENU_KEY <= 039H) THEN
539  5                      DO ;
540  6                        TEMP_DIGI(DIGIT_MAX-1) = MENU_KEY ;
541  6                        DIGIT = DIGIT + SIGNED(MENU_KEY) - 030H ;
542  6                        STATE = SCALING_FIRST_ENTRY ;
543  6                      END ;
544  5                    ELSE IF MENU_KEY = DP_KEY THEN
545  5                      DO ;
546  6                        TEMP_DIGI(DIGIT_MAX-1) = 02EH ;
547  6                        EXP=0; EXPFLAG=1;
549  6                        STATE = SCALING_FIRST_ENTRY ;
550  6                      END ;
551  5                    ELSE IF MENU_KEY = DISPLAY_SCALE_KEY THEN
552  5                      DO ;
553  6                        CALL PR_SCALE_MESSAGE ;
554  6                        STATE = READY_STATE ;
555  6                      END ;
556  5                  END ;
557  4               END ;
558  3            CALL CHECK_SWITCH ;
559  3        END ;
560  2       END PR_SCALING_STATE_NEXT ;

/*
              THIS ROUTINE ACCEPTS P1 COORDINATES FOR THE FIRST
              PART OF SCALING DATA
          */

561  1       PR_AUTO_SCALING_STATE: PROCEDURE PUBLIC ;
562  2        DO WHILE STATE = AUTO_SCALING_STATE ;
563  3            CALL PR_LINE ;
564  3            IF LINE_VALID = 1 THEN
565  3               DO ;
566  4                CALL PR_MENU_KEYS ;
```

```
67   4          IF MENU_KEY <> 0 THEN
68   4             DO ;
69   5                IF MENU_KEY = HORIZONTAL_KEY THEN
70   5                   NEXT_SCALING_MODE = HORIZONTAL ;
71   5                ELSE
                      IF MENU_KEY = VERTICAL_KEY THEN
72   5                   NEXT_SCALING_MODE = VERTICAL ;
73   5                ELSE
                      IF MENU_KEY = DISPLAY_SCALE_KEY THEN
74   5                   DO ;
75   6                   CALL PR_SCALE_MESSAGE ;
76   6                   STATE = READY_STATE ;
77   6                   END ;
78   5             END ;
79   4          ELSE
                   DO ;
80   5             P1X = X_DATA ;
81   5             P1Y = Y_DATA ;
82   5             STATE = SCALING_STATE_P2 ;
83   5             END ;
84   4          END ;
85   3       CALL CHECK_SWITCH ;
86   3    END ;
87   2 END PR_AUTO_SCALING_STATE ;
        /*
           THIS ROUTINE ACCEPTS P2 COORDINATES FOR THE SECOND PART
           OF SCALING DATA. THEN CALCULATES S1 = LENGTH (P1-P2).
        */

88   1 PR_SCALING_STATE_P2:  PROCEDURE PUBLIC ;
89   2 DO WHILE STATE = SCALING_STATE_P2 ;
90   3    CALL PR_LINE ;
91   3    IF LINE_VALID = 1 THEN
92   3       DO ;
93   4       CALL PR_MENU_KEYS ;
94   4       IF MENU_KEY <> 0 THEN
95   4          DO ;
96   5          IF MENU_KEY = DISPLAY_SCALE_KEY THEN
97   5             DO ;
98   6             CALL PR_SCALE_MESSAGE ;
99   6             STATE = READY_STATE ;
600  6             END ;
601  5          END ;
602  4       ELSE
                DO ;
603  5          P2X = X_DATA ;
604  5          P2Y = Y_DATA ;
605  5          S1 = (SQRT ((P1X - P2X)*(P1X - P2X) + (P1Y - P2Y)*(P1Y - P2Y)))/100. ;
606  5          CALL ASCI(S1*100.) ;
607  5          TEMP_DIGI(0) = ASC_DATA(3) ;
608  5          TEMP_DIGI(1) = ASC_DATA(2) ;
609  5          TEMP_DIGI(2) = '.' ;
610  5          TEMP_DIGI(3) = ASC_DATA(1) ;
611  5          TEMP_DIGI(4) = ASC_DATA(0) ;
612  5          STATE = SCALING_SECOND_ENTRY ;
613  5          END ;
614  4       END ;
```

```
615    3          CALL CHECK_SWITCH ;
616    3       END ;
617    2    END PR_SCALING_STATE_P2 ;

/*
              THIS ROUTINE GATHERS THE KEY STROKES FOR THE
              FIRST DIGIT IN THE SCALING ENTRY SCALE_S1(5)
           */

618    1    PR_SCALING_FIRST_ENTRY: PROCEDURE PUBLIC ;
619    2       DO WHILE STATE = SCALING_FIRST_ENTRY ;
620    3          CALL PR_LINE ;
621    3          IF LINE_VALID = 1 THEN
622    3             DO ;
623    4             CALL PR_MENU_KEYS ;
624    4             IF MENU_KEY <> 0 THEN
625    4                DO ;
626    5                IF ((MENU_KEY>=030H) AND (MENU_KEY<=039H)) THEN
627    5                   DO ;
628    6                   DIGIT = DIGIT * 10 + SIGNED(MENU_KEY) - 030H ;
629    6                   EXP=EXP+1;            /* INITIALIZE VALUE AT THIS POINT */
630    6                      DO L = 0 TO DIGIT_MAX-2 ;
631    7.                        TEMP_DIGI(L) = TEMP_DIGI(L+1) ;
632    7                      END ;
633    6                   TEMP_DIGI(DIGIT_MAX-1) = MENU_KEY ;
634    6                   END ;
635    5                IF (MENU_KEY=DP_KEY) AND (EXPFLAG=0) THEN
636    5                   DO;
637    6                   EXP=0;         /* RESET EXPONENT VALUE */
638    6                   EXPFLAG=1;     /* SET EXPONENT FLAG */
639    7                   DO L =0 TO DIGIT_MAX-2; TEMP_DIGI(L) = TEMP_DIGI(L+1); END;
642    6                   TEMP_DIGI(DIGIT_MAX-1) = 02EH ;
643    6                   END;
644    5                IF MENU_KEY = DIVIDE_KEY THEN
645    5                   DO ;
646    6                   S1 = FLOAT(DIGIT) ;
647    6                   IF (EXPFLAG=1) AND (EXP>0) THEN
648    6                      DO EX=1 TO EXP;
649    7                      S1=S1/10.;
650    7                      END;
651    6                   STATE = SCALING_SECOND_ENTRY ;
652    6                   END ;
653    5                IF MENU_KEY = DISPLAY_SCALE_KEY THEN
654    5                   DO ;
655    6                   CALL PR_SCALE_MESSAGE ;
656    6                   STATE = READY_STATE ;
657    6                   END ;
658    5                END ;
659    4             END ;
660    3          CALL CHECK_SWITCH ;
661    3       END ;
662    2    END PR_SCALING_FIRST_ENTRY ;

/*
              THIS ROUTINE GATHERS THE KEY STROKES FOR THE SECOND
              ENTRY IN THE SCALING PROCESS SCALE_S2(5)
           */
```

```
663   1    PR_SCALING_SECOND_ENTRY: PROCEDURE PUBLIC ;
664   2    EXPFLAG=0;
665   2    DIGIT = 0 ;
666   2    DO L = 0 TO DIGIT_MAX-1 ;
667   3    TEMP_DIG2(L) = ' ' ;
668   3    END ;
669   2    DO WHILE STATE = SCALING_SECOND_ENTRY ;
670   3        CALL PR_LINE ;
671   3        IF LINE_VALID = 1 THEN
672   3            DO ;
673   4            CALL PR_MENU_KEYS ;
674   4            IF MENU_KEY <> 0 THEN
675   4                DO ;
676   5                IF (MENU_KEY >= 030H) AND (MENU_KEY <= 039H) THEN
677   5                    DO ;
678   6                    EXP=EXP+1;      /* INCREMENT EXPONENT VALUE */
679   6                    DIGIT = DIGIT * 10 + SIGNED(MENU_KEY) - 030H ;
680   7                    DO L = 0 TO DIGIT_MAX-2 ;TEMP_DIG2(L) = TEMP_DIG2(L+1) ;END ;
683   6                    TEMP_DIG2(DIGIT_MAX-1) = MENU_KEY ;
684   6                    END ;
685   5                IF (MENU_KEY=DP_KEY) AND (EXPFLAG=0) THEN
686   5                    DO;
687   6                    EXP=0;          /* RESET EXPONENT VALUE */
688   6                    EXPFLAG=1;      /* SET EXPONENT FLAG */
689   7                    DO L = 0 TO DIGIT_MAX-2 ;TEMP_DIG2(L) = TEMP_DIG2(L+1) ;END ;
692   6                    TEMP_DIG2(DIGIT_MAX-1) = 02EH ;
693   6                    END;
694   5                IF MENU_KEY = DONE_KEY THEN
695   5                    DO ;
696   6                    STATE = READY_STATE ;
697   6                    S2 = FLOAT(DIGIT) ;
698   6                    IF (EXPFLAG=1) AND (EXP>0) THEN
699   7                        DO EX=1 TO EXP; S2=S2/10.; END;
702   6                    SCALE_FACT = S2/S1 ;
703   7                    DO L = 0 TO DIGIT_MAX-1 ;SCALE_S1(L) = TEMP_DIG1(L) ;END ;
706   6                    DO L = 0 TO DIGIT_MAX-1 ;
707   7                    IF TEMP_DIG2(0) = ' ' THEN
708   7                        DO ;
709   8                        TEMP_DIG2(0) = TEMP_DIG2(1) ;
710   8                        TEMP_DIG2(1) = TEMP_DIG2(2) ;
711   8                        TEMP_DIG2(2) = TEMP_DIG2(3) ;
712   8                        TEMP_DIG2(3) = TEMP_DIG2(4) ;
713   8                        TEMP_DIG2(4) = ' ' ;
714   8                        END ;
715   7                    END ;
716   6                    DO L = 0 TO DIGIT_MAX-1 ;
717   7                    SCALE_S2(L) = TEMP_DIG2(L) ;
718   7                    END ;
719   6                    SCALING_DIMENSION = NEXT_SCALING_DIMENSION ;
720   6                    SCALING_MODE = NEXT_SCALING_MODE ;
721   6                    IF (SCALING_DIMENSION=ENGLISH) OR (SCALING_DIMENSION=AUTO) THEN
722   6                        DO ;
723   7                        SCALE_FACT = SCALE_FACT/100. ;
724   7                        END ;
725   6                    ELSE
                                DO ;
726   7                        SCALE_FACT = SCALE_FACT * 0.0254 ;
727   7                        END ;
```

```
728  6                        IF SCALING_MODE = BOTH THEN
729  6                           DO ;
730  7                              SCALING_VALID = 1 ;
731  7                              HOR_SF = SCALE_FACT ;
732  7                              VERT_SF = SCALE_FACT ;
733  7                                 DO L = 0 TO DIGIT_MAX-1 ;
734  8                                    HOR_SCALE_S1(L) = SCALE_S1(L) ;
735  8                                    HOR_SCALE_S2(L) = SCALE_S2(L) ;
736  8                                    VER_SCALE_S1(L) = SCALE_S1(L) ;
737  8                                    VER_SCALE_S2(L) = SCALE_S2(L) ;
738  8                                 END ;
739  7                           END ;
740  6                        IF SCALING_MODE = HORIZONTAL THEN
741  6                           DO ;
742  7                              SCALING_VALID_HORZ = 1 ;
743  7                              HOR_SF = SCALE_FACT ;
744  7                                 DO L = 0 TO DIGIT_MAX-1 ;
745  8                                    HOR_SCALE_S1(L) = SCALE_S1(L) ;
746  8                                    HOR_SCALE_S2(L) = SCALE_S2(L) ;
747  8                                 END ;
748  7                           END ;
749  6                        IF SCALING_MODE = VERTICAL THEN
750  6                           DO ;
751  7                              SCALING_VALID_VERT = 1 ;
752  7                              VERT_SF = SCALE_FACT ;
753  7                                 DO L = 0 TO DIGIT_MAX-1 ;
754  8                                    VER_SCALE_S1(L) = SCALE_S1(L) ;
755  8                                    VER_SCALE_S2(L) = SCALE_S2(L) ;
756  8                                 END ;
757  7                           END ;
758  6                        IF (SCALING_VALID_VERT = 1) AND (SCALING_VALID_HORZ = 1) THEN
759  6                           SCALING_VALID = 1 ;
760  6                        CALL PR_SCALE_MESSAGE ;
761  6                     END ;
762  5                  IF MENU_KEY = DISPLAY_SCALE_KEY THEN
763  5                     DO ;
764  6                        CALL PR_SCALE_MESSAGE ;
765  6                        STATE = READY_STATE ;
766  6                     END ;
767  5               END ;
768  4            END ;
769  3         CALL CHECK_SWITCH ;
770  3      END ;
771  2   END PR_SCALING_SECOND_ENTRY ;

/*
            THIS ROUTINE
         */

772  1   PR_MENU_KEYS: PROCEDURE PUBLIC ;
773  2      CALL PR_FUNCT_MENU_KEYS_TEST ;   /* LOOK FOR FUNCTION MENU */
774  2      IF MENU_KEY = 0 THEN
775  2         DO ;   /* LOOK FOR KEYBD MENU */
776  3         IF KEYBD_MENU_VALID = 1 THEN
777  3            CALL PR_KEYBD_MENU_KEYS_TEST ;
778  3         END ;
779  2   END PR_MENU_KEYS ;
```

```
/*
    THIS ROUTINE TESTS FOR THE KEYBOARD MENU KEYS
    AFTER THE MENUS HAVE BEEN LOCATED
*/

780  1   PR_KEYBD_MENU_KEYS_TEST: PROCEDURE ;
781  2   MENU_KEY = 0 ;   /* ASSUME NOT IN MENU */
782  2   IF ROTATE_KEYBD_MENU = 0 THEN
783  2       DO ;
784  3       X_MENU = X_POS - KEYBD_MENU_X(1) ;   /* LOOK FOR NON ROTATED MENU */
785  3       Y_MENU = Y_POS - KEYBD_MENU_Y(1) ;
786  3       END ;
787  2   ELSE
             DO ;
788  3       X_MENU = KEYBD_MENU_Y(1) - Y_POS ;   /* LOOK FOR ROTATED MENU */
789  3       Y_MENU = X_POS - KEYBD_MENU_X(1) ;
790  3       END ;
791  2   IF (X_MENU > 0) AND (X_MENU< X_NORM_KEYBD) AND
             (Y_MENU > 0) AND (Y_MENU< Y_NORM_KEYBD) THEN
792  2       CALL PROCESS_KEYBD_MENU_ZONES ;
793  2   END PR_KEYBD_MENU_KEYS_TEST ;

/*
    THIS ROUTINE TESTS FOR THE FUNCTION MENU KEYS
    AFTER THE MENUS HAVE BEEN LOCATED
*/

794  1   PR_FUNCT_MENU_KEYS_TEST: PROCEDURE ;
795  2   MENU_KEY = 0 ;   /* ASSUME NOT IN MENU */
796  2   IF ROTATE_FUNCT_MENU = 0 THEN
797  2       DO ;
798  3       X_MENU = X_POS - MENU_X(1) ;   /* LOOK FOR NON ROTATED MENU */
799  3       Y_MENU = Y_POS - MENU_Y(1) ;
800  3       END ;
801  2   ELSE
             DO ;
802  3       X_MENU = MENU_Y(1) - Y_POS ;   /* LOOK FOR ROTATED MENU */
803  3       Y_MENU = X_POS - MENU_X(1) ;
804  3       END ;
805  2   IF (X_MENU > 0) AND (X_MENU< X_NORM_FUNCT) AND
             (Y_MENU > 0) AND (Y_MENU< Y_NORM_FUNCT) THEN
806  2       CALL PROCESS_MENU_ZONES ;
807  2   END PR_FUNCT_MENU_KEYS_TEST ;

/*
    THIS ROUTINE CHECKS TO SEE IF THE POINT IS IN THE KEYBOARD MENU
    AND THEN RETURNS THE CLOSEST KEYBOARD KEY VALUE IN MENU_KEY
*/

808  1   PROCESS_KEYBD_MENU_ZONES: PROCEDURE ;

809  2   DECLARE P0  LITERALLY '0' ;
810  2   DECLARE P1  LITERALLY '62' ;
811  2   DECLARE P2  LITERALLY '79' ;
812  2   DECLARE P3  LITERALLY '95' ;
813  2   DECLARE P4  LITERALLY '117' ;
```

```
814  2       DECLARE P5  LITERALLY '134' ;
815  2       DECLARE P6  LITERALLY '150' ;
816  2       DECLARE P7  LITERALLY '172' ;
817  2       DECLARE P8  LITERALLY '189' ;
818  2       DECLARE P9  LITERALLY '205' ;

819  2       DECLARE P10 LITERALLY '227' ;
820  2       DECLARE P11 LITERALLY '244' ;
821  2       DECLARE P12 LITERALLY '260' ;
822  2       DECLARE P13 LITERALLY '282' ;
823  2       DECLARE P14 LITERALLY '299' ;

824  2       DECLARE P15 LITERALLY '315' ;
825  2       DECLARE P16 LITERALLY '337' ;
826  2       DECLARE P17 LITERALLY '354' ;
827  2       DECLARE P18 LITERALLY '370' ;
828  2       DECLARE P19 LITERALLY '392' ;

829  2       DECLARE P20 LITERALLY '409' ;
830  2       DECLARE P21 LITERALLY '425' ;

831  2       DECLARE P22 LITERALLY '447' ;
832  2       DECLARE P23 LITERALLY '464' ;
833  2       DECLARE P24 LITERALLY '480' ;

834  2       DECLARE P25 LITERALLY '502' ;
835  2       DECLARE P26 LITERALLY '519' ;
836  2       DECLARE P27 LITERALLY '535' ;
837  2       DECLARE P28 LITERALLY '557' ;
838  2       DECLARE P29 LITERALLY '574' ;

839  2       DECLARE P30 LITERALLY '590' ;
840  2       DECLARE P31 LITERALLY '612' ;
841  2       DECLARE P32 LITERALLY '629' ;
842  2       DECLARE P33 LITERALLY '705' ;
843  2       DECLARE P34 LITERALLY '775' ;

844  2       DECLARE P35 LITERALLY '848' ;
845  2       DECLARE P36 LITERALLY '925' ;

846  2       DECLARE R0  LITERALLY '0' ;
847  2       DECLARE R1  LITERALLY '60' ;
848  2       DECLARE R2  LITERALLY '115' ;
849  2       DECLARE R3  LITERALLY '170' ;
850  2       DECLARE R4  LITERALLY '233' ;

851  2     DECLARE KEY_DATA(60) STRUCTURE
              (X_LL INTEGER,Y_LL INTEGER,X_UR INTEGER,Y_UR INTEGER,KEY_VALUE BYTE)
            DATA(
                P0, R0, P33,   R1, (080H+' '),
                P0, R3, P1,    R4, (080H+'Q'),
                P0, R2, P2,    R3, (080H+'A'),
                P0, R1, P3,    R2, (080H+'Z'),
                P1, R3, P4,    R4, (080H+'W'),

P2, R2, P5,    R3, (080H+'S'),
                P3, R1, P6,    R2, (080H+'X'),
```

```
                    P4, R3, P7, R4, (080H+'E'),
                    P5, R2, P8, R3, (080H+'D'),
                    P6, R1, P9, R2, (080H+'C'),

P7, R3, P10,    R4, (080H+'R'),
                    P8, R2, P11,    R3, (080H+'F'),
                    P9, R1, P12,    R2, (080H+'V'),
                    P10,    R3, P13,    R4, (080H+'T'),
                    P11,    R2, P14,    R3, (080H+'G'),

P12,    R1, P15,    R2, (080H+'B'),
                    P13,    R3, P16,    R4, (080H+'Y'),
                    P14,    R2, P17,    R3, (080H+'H'),
                    P15,    R1, P18,    R2, (080H+'N'),
                    P16,    R3, P19,    R4, (080H+'U'),

P17,    R2, P20,    R3, (080H+'J'),
                    P18,    R1, P21,    R2, (080H+'M'),
                    P19,    R3, P22,    R4, (080H+'I'),
                    P20,    R2, P23,    R3, (080H+'K'),
                    P21,    R1, P24,    R2, (080H+','),

P22,    R3, P25,    R4, (080H+'O'),
                    P23,    R2, P26,    R3, (080H+'L'),
                    P24,    R1, P27,    R2, DP_KEY,
                    P25,    R3, P28,    R4, (080H+'P'),
                    P26,    R2, P29,    R3, (080H+027H), /* SINGLE QUOTE */

P27,    R1, P30,    R2, (080H+'?'),
                    P28,    R3, P31,    R4, (080H+'='),
                    P29,    R2, P32,    R3, (080H+022H), /* DOUBLE QUOTE */
                    P30,    R1, P33,    R2, (080H+0DH),
                    P31,    R3, P33,    R4, (080H+';'),

P32,    R2, P33,    R3, SKIP_KEY,
                    P33,    R3, P34,    R4, (080H+'#'),
                    P33,    R2, P34,    R3, (080H+'$'),
                    P33,    R1, P34,    R2, (080H+'%'),
                    P33,    R0, P34,    R1, (080H+'&'),

P34,    R3, P35,    R4, PLUS_KEY,
                    P34,    R2, P35,    R3, MINUS_KEY,
                    P34,    R1, P35,    R2, DIVIDE_KEY,
                    P34,    R0, P35,    R1, MULT_KEY,
                    P35,    R2, P36,    R4, LOG_ON_KEY,

P35,    R0, P36,    R2, LOG_OFF_KEY) ;
                    /* END OF TABLE */

852    2       DO L = 0 TO 45 ; /* TOTAL OF 46 FUNCTION KEYS */
853    3           IF X_MENU > KEY_DATA(L).X_LL THEN
854    3               DO ;
855    4                   IF Y_MENU > KEY_DATA(L).Y_LL THEN
856    4                       DO ;
857    5                           IF X_MENU < KEY_DATA(L).X_UR THEN
858    5                               DO ;
859    6                                   IF Y_MENU < KEY_DATA(L).Y_UR THEN
860    6                                       DO ;
861    7                                           MENU_KEY = KEY_DATA(L).KEY_VALUE ;
```

```
862   7                         L = 60 ;  /* SET TO END */
863   7                       END ;
864   6                     END ;
865   5                   END ;
866   4                 END ;
867   3             END ;

868   2       END PROCESS_KEYBD_MENU_ZONES ;

/*
          THIS ROUTINE CHECKS TO SEE IF THE POINT IS IN THE FUNCTION MENU
          AND THEN RETURNS THE CLOSEST FUNCTION KEY VALUE IN MENU.KEY
      */

869   1       PROCESS_MENU_ZONES: PROCEDURE ;
870   2         DECLARE P1 LITERALLY ' 0' ;
871   2         DECLARE P2 LITERALLY ' 60' ;
872   2         DECLARE P3 LITERALLY ' 140' ;
873   2         DECLARE P4 LITERALLY ' 232' ;
874   2         DECLARE P5 LITERALLY ' 300' ;
875   2         DECLARE P6 LITERALLY ' 438' ;
876   2         DECLARE P7 LITERALLY ' 520' ;
877   2         DECLARE P8 LITERALLY ' 575' ;
878   2         DECLARE P9 LITERALLY ' 630' ;
879   2         DECLARE P10 LITERALLY ' 685' ;
880   2         DECLARE P11 LITERALLY ' 759' ;
881   2         DECLARE P12 LITERALLY ' 843' ;
882   2         DECLARE P13 LITERALLY ' 919' ;
883   2         DECLARE P14 LITERALLY ' 994' ;
884   2         DECLARE P15 LITERALLY ' 1079' ;
885   2         DECLARE P16 LITERALLY ' 1160' ;
886   2         DECLARE P17 LITERALLY ' 1220' ;
887   2         DECLARE P18 LITERALLY ' 1277' ;
888   2         DECLARE R1 LITERALLY ' 0' ;
889   2         DECLARE R2 LITERALLY ' 61' ;
890   2         DECLARE R3 LITERALLY ' 77' ;
891   2         DECLARE R4 LITERALLY ' 115' ;
892   2         DECLARE R5 LITERALLY ' 156' ;
893   2         DECLARE R6 LITERALLY ' 170' ;
894   2         DECLARE R7 LITERALLY ' 230' ;
895   2         DECLARE KEY_DATA(60) STRUCTURE
                   (X_LL INTEGER,Y_LL INTEGER,X_UR INTEGER,Y_UR INTEGER,KEY_VALUE BYTE)
                   DATA(
                       P1,    R6,    P2,    R7,    ENGLISH_SCALE_KEY,
                       P1,    R4,    P2,    R6,    METRIC_SCALE_KEY,
                       P1,    R2,    P2,    R4,    COUNT_SCALE_KEY,
                       P2,    R6,    P3,    R7,    AUTO_SCALE_KEY,
                       P2,    R4,    P3,    R6,    HORIZONTAL_KEY,
                       P2,    R2,    P3,    R4,    VERTICAL_KEY,
                       P1,    R1,    P3,    R2,    DISPLAY_SCALE_KEY,

P3,    R5,    P4,    R7,    CLOSED_SHAPE_KEY,
                       P4,    R5,    P5,    R7,    LINE_DIST_KEY,
                       P3,    R1,    P4,    R3,    RECT_AREA_KEY,
                       P3,    R3,    P4,    R5,    TRI_AREA_KEY,
                       P4,    R3,    P5,    R5,    CONNECT_DOTS_KEY,
                       P4,    R1,    P5,    R3,    COUNT_KEY,
                       P5,    R6,    P6,    R7,    DONE_KEY,
```

```
            P5,      R4,      P6,      R6,      SEND_KEY,
            P5,      R2,      P6,      R4,      CLEAR_KEY,
            P5,      R1,      P6,      R2,      CLEAR_LAST_KEY,

P6,      R6,      P7,      R7,      PLUS_KEY,
            P6,      R4,      P7,      R6,      MINUS_KEY,
            P6,      R1,      P7,      R2,      MULT_KEY,
            P6,      R2,      P7,      R4,      DIVIDE_KEY,

P9,      R1,      P10,     R2,      DP_KEY,
            P10,     R6,      P11,     R7,      (080H+'('),
            P10,     R4,      P11,     R6,      (080H+')'),
            P10,     R2,      P11,     R4,      (080H+'S'),
            P10,     R1,      P11,     R2,      PI_KEY,

P7,      R1,      P9,      R2,      ZERO_KEY,
            P7,      R2,      P8,      R4,      ONE_KEY,
            P8,      R2,      P9,      R4,      TWO_KEY,
            P9,      R2,      P10,     R4,      THREE_KEY,
            P7,      R4,      P8,      R6,      FOUR_KEY,
            P8,      R4,      P9,      R6,      FIVE_KEY,
            P9,      R4,      P10,     R6,      SIX_KEY,
            P7,      R4,      P8,      R7,      SEVEN_KEY,
            P8,      R4,      P9,      R7,      EIGHT_KEY,
            P9,      R4,      P10,     R7,      NINE_KEY,

P11,     R4,      P12,     R7,      (080H+0DH),
            P11,     R1,      P12,     R4,      SKIP_KEY,
            P12,     R4,      P13,     R7,      ENTER_KEY,
            P12,     R1,      P13,     R4,      BKFLD_KEY,

P13,     R6,      P14,     R7,      F1_KEY,
            P13,     R4,      P14,     R6,      F2_KEY,
            P13,     R2,      P14,     R4,      F3_KEY,
            P13,     R1,      P14,     R2,      F4_KEY,
            P14,     R6,      P15,     R7,      F5_KEY,
            P14,     R4,      P15,     R6,      F6_KEY,
            P14,     R2,      P15,     R4,      F7_KEY,
            P14,     R1,      P15,     R2,      F8_KEY,

P15,     R6,      P16,     R7,      DEL_CHAR_KEY,
            P15,     R4,      P16,     R6,      LEFT_ARROW_KEY,
            P16,     R4,      P17,     R6,      RIGHT_ARROW_KEY,
            P16,     R6,      P17,     R7,      INS_CHAR_KEY,
            P15,     R2,      P16,     R4,      CLEAR_KEY,
            P16,     R2,      P17,     R4,      PRINT_KEY,
            P15,     R1,      P17,     R2,      (080H+' '),
            P17,     R4,      P18,     R7,      ON_KEY,
            P17,     R1,      P18,     R4,      OFF_KEY) ;
            /* END OF TABLE */
896  2   DO L = 0 TO 56 ; /* TOTAL OF 57 FUNCTION KEYS */
897  3      IF X_MENU > KEY_DATA(L).X_LL THEN
898  3         DO ;
899  4            IF Y_MENU > KEY_DATA(L).Y_LL THEN
900  4               DO ;
901  5                  IF X_MENU < KEY_DATA(L).X_UR THEN
902  5                     DO ;
903  6                        IF Y_MENU < KEY_DATA(L).Y_UR THEN
```

```
904  6                        DO ;
905  7                            MENU_KEY = KEY_DATA(L).KEY_VALUE ;
906  7                            L = 60 ; /* SET TO END */
907  7                        END ;
908  6                    END ;
909  5                END ;
910  4            END ;
911  3      END ;
912  2  END PROCESS_MENU_ZONES ;

/*
        THIS ROUTINE SENDS A MESSAGE (B) OF LENGTH (A) TO
        THE TRANSMIT BUFFER. IF THE BUFFER FILLS THEN THIS
        ROUTINE WAITS FOR THE BUFFER TO EMPTY
    */

913  1   SEND: PROCEDURE (A,B) ;
914  2      DECLARE A BYTE ;
915  2      DECLARE B POINTER ;
916  2      DECLARE C BASED B(1) BYTE ;
917  2      DECLARE J BYTE ;
918  2      DO J = 0 TO (A-1) ;
919  3          DO WHILE T_CHAR_CNT = T_CNT_MAX ;
920  4          END ;
921  3          T_BUFFER(T_IN_PTR) = C(J) ;
922  3          T_IN_PTR = T_IN_PTR +1 ;
923  3          IF T_IN_PTR > T_CNT_MAX THEN
924  3              DO ;
925  4                  T_IN_PTR = 0 ;
926  4              END ;
927  3          T_CHAR_CNT = T_CHAR_CNT + 1;
928  3      END ;
929  2   END SEND ;

/*
        THIS EXTERNAL ROUTINE CONVERTS A REAL NUMBER TO A STRING
    */

930  1   STRR: PROCEDURE (A,B) POINTER EXTERNAL ;
931  2      DECLARE A REAL ;
932  2      DECLARE B POINTER ;
933  2   END STRR ;

934  1   DECLARE P_PTR POINTER ;
935  1   DECLARE P BASED P_PTR(1) BYTE ;
936  1   DECLARE SFT_S REAL EXTERNAL ;
937  1   DECLARE SFCV_S REAL EXTERNAL ;
938  1   DECLARE SFT_BCD(10) BYTE EXTERNAL ;
939  1   DECLARE SFCV_BCD(10) BYTE EXTERNAL ;

/*
        THIS ROUTINE SENDS ONE OF TWO POSSIBLE SCALING MESSAGES

PLAN_SCALE:__english_XXXXX/XXXXX_____COUNT_SCALE:XXXXX/XXXXX
                        _metric_              (10)+(5)

PLAN_SCALE:__english_HORXXXXX/XXXXX_VERXXXXX/XXXXX_____COUNT_SACLE:XXXXX/XXXXX
```

```
        */

940  1   PR_SCALE_MESSAGE: PROCEDURE ;
941  2       CALL SEND(6,@(CRT,018H,047H,04BH,018H,028H)) ;
942  2       CALL SEND(13,@('PLAN SCALE   ')) ;
943  2       IF SCALING_DIMENSION = ENGLISH THEN
944  2           DO ;
945  3           CALL SEND(8,@('english ')) ;
946  3           END ;
947  2       ELSE IF SCALING_DIMENSION = METRIC THEN
948  2           DO ;
949  3           CALL SEND(8,@(' metric ')) ;
950  3           END ;
951  2       ELSE
                 DO;
952  3           CALL SEND(8,@('         ')) ; /* in the case of auto scaling, send blanks */
953  3           END;
954  2       IF SCALING_MODE = BOTH THEN
955  2           DO ;
956  3           CALL SEND(5,@SCALE_S1(0)) ;
957  3           CALL SEND(1,@('/')) ;
958  3           CALL SEND(5,@SCALE_S2(0)) ;
959  3           CALL SEND(10,@('          ')) ;
960  3           END ;
961  2       ELSE
                 DO ;
962  3           CALL SEND(3,@('HOR')) ;
963  3           CALL SEND(5,@HOR_SCALE_S1(0)) ;
964  3           CALL SEND(1,@('/')) ;
965  3           CALL SEND(5,@HOR_SCALE_S2(0)) ;
966  3           CALL SEND(5,@(' VERT')) ;
967  3           CALL SEND(5,@VER_SCALE_S1(0)) ;
968  3           CALL SEND(1,@('/')) ;
969  3           CALL SEND(5,@VER_SCALE_S2(0)) ;
970  3           END ;
971  2       CALL SEND(17,@('   COUNT SCALE ')) ;
972  2       CALL SEND(5,@COUNT_S1(0)) ;
973  2       CALL SEND(1,@('/')) ;
974  2       CALL SEND(5,@COUNT_S2(0)) ;
975  2       CALL SEND(3,@(01BH,029H,NORMAL)) ;
976  2   END PR_SCALE_MESSAGE ;

/*
             THIS ROUTINE SENDS THE STATUS LINE FOR NORMAL OPERATION
         */

977  1   PR_DISP_TOT: PROCEDURE PUBLIC ;
978  2       CALL SEND(6,@(CRT,018H,047H,04BH,018H,028H)) ;
979  2       IF (STATE = AREA_STATE) OR
                (STATE = AREA_DATA_STATE) THEN
980  2           DO ;
981  3           CALL SEND(17,@('AREA - freeform ')) ;
982  3           END ;
983  2       ELSE
                 DO ;
984  3           IF (STATE = TRI_AREA_STATE) OR
                    (STATE = TRI_AREA_DATA_STATE) OR
```

```
                        (STATE = TRI_AREA_COMPLETE_STATE) THEN
985   3             DO ;
986   4               CALL SEND(17,@('AREA - triangle  ')) ;
987   4             END ;
988   3           ELSE
                   DO ;
989   4             IF (STATE = RECT_AREA_STATE) OR
                       (STATE = RECT_AREA_DATA_STATE) OR
                       (STATE = RECT_AREA_COMPLETE_STATE) THEN
990   4               DO ;
991   5                 CALL SEND(17,@('AREA - rectangle ')) ;
992   5               END ;
993   4             ELSE
                     DO ;
994   5               IF (STATE = LIN_DIST_STATE) OR
                         (STATE = LIN_DIST_DATA_STATE) OR
                         (STATE = LIN_DIST_COMPLETE_STATE) THEN
995   5                 DO ;
996   6                   CALL SEND(17,@('LENGTH - single  ')) ;
997   6                 END ;
998   5               ELSE
                       DO ;
999   6                 IF (STATE = CONNECT_DOTS_STATE) OR
                           (STATE = CONNECT_DOTS_DATA_STATE) THEN
1000  6                   DO ;
1001  7                     CALL SEND(17,@('LENGTH - multiple')) ;
1002  7                   END ;
1003  6                 ELSE
                         DO ;
1004  7                   IF STATE = COUNT_STATE THEN
1005  7                     DO ;
1006  8                       CALL SEND(17,@('COUNT -          ')) ;
1007  8                     END ;
1008  7                   ELSE
                           DO ;
1009  8                     IF STATE = READY_STATE THEN
1010  8                       DO ;
1011  9                         CALL SEND(17,@('READY -          ')) ;
1012  9                       END ;
1013  8                     ELSE
                             DO ;
1014  9                       IF STATE = OFF_STATE THEN
1015  9                         DO ;
1016  10                          CALL SEND(17,@(' OFF -          ')) ;
1017  10                        END ;
1018  9                       END ;
1019  8                     END ;
1020  7                   END ;
1021  6                 END ;
1022  5               END ;
1023  4             END ;
1024  3           END ;
1025  2         CALL SEND(20,@('    CURRENT VALUE ')) ;
1026  2         P_PTR = STRR(SFCV_S,@SFCV_BCD) ;
1027  2         CALL SEND(P(0),@P(1)) ;
1028  2         CALL SEND(5,@('        ')) ;
1029  2         CALL SEND(12,@('TOTAL VALUE ')) ;
1030  2         P_PTR = STRR(SFT_S,@SFT_BCD) ;
```

```
1031  2        CALL SEND(P(0),@P(1)) ;
1032  2        CALL SEND(3,@(01BH,029H,NORMAL)) ;
1033  2     END PR_DISP_TOT ;

/*
              THIS STATE GATHERS KEY STROKES FOR THE
              FIRST PART OF THE COUNT SCALING ENTRY COUNT_S1(5)
          */

1034  1   PR_COUNT_SCALING_STATE : PROCEDURE PUBLIC ;
1035  2     declare CntMsgStr(*) byte data(CRT,01BH,047H,048H,01BH,028H,
                                        'Enter Count Scale ',01BH,029H,normal) ;

1036  2     call send(length(CntMsgStr),@CntMsgStr);
1037  2     DIGIT = 0 ;
1038  2     DO L = 0 TO DIGIT_MAX-1 ;
1039  3       TEMP_DIG1(L) = ' ' ;
1040  3     END ;
1041  2     DO WHILE STATE = COUNT_SCALING_STATE ;
1042  3       CALL PR_LINE ;
1043  3       IF LINE_VALID = 1 THEN
1044  3         DO ;
1045  4         CALL PR_MENU_KEYS ;
1046  4         IF MENU_KEY <>0 THEN
1047  4           DO ;
1048  5           IF (MENU_KEY >= 030H) AND (MENU_KEY <= 039H) THEN
1049  5             DO ;
1050  6             DIGIT = DIGIT*10 + SIGNED(MENU_KEY)-030H ;
1051  6               DO L = 0 TO DIGIT_MAX-2 ;
1052  7                 TEMP_DIG1(L) = TEMP_DIG1(L+1) ;
1053  7               END ;
1054  6             TEMP_DIG1(DIGIT_MAX-1) = MENU_KEY ;
1055  6             END ;
1056  5           IF MENU_KEY = DIVIDE_KEY THEN
1057  5             DO ;
1058  6             S1 = FLOAT(DIGIT) ;
1059  6             STATE = COUNT_SCALING_SECOND_STATE ;
1060  6             END ;
1061  5           IF MENU_KEY = DISPLAY_SCALE_KEY THEN
1062  5             DO ;
1063  6             CALL PR_SCALE_MESSAGE ;
1064  6             STATE = READY_STATE ;
1065  6             END ;
1066  5           END ;
1067  4         END ;
1068  3       CALL CHECK_SWITCH ;
1069  3     END ;
1070  2   END PR_COUNT_SCALING_STATE ;

/*
              THIS ROUTINE GATHERS THE SECOND PART OF
              THE COUNT SCALING ENTRY COUNT_S2(5)
          */

1071  1   PR_COUNT_SCALING_SECOND_STATE : PROCEDURE PUBLIC ;
1072  2     DIGIT = 0 ;
1073  2     DO L = 0 TO DIGIT_MAX-1 ;
1074  3       TEMP_DIG2(L) = ' ' ;
```

```
1075    3           END ;
1076    2       DO WHILE STATE = COUNT_SCALING_SECOND_STATE ;
1077    3           CALL PR_LINE ;
1078    3           IF LINE_VALID = 1 THEN
1079    3               DO ;
1080    4               CALL PR_MENU_KEYS ;
1081    4               IF MENU_KEY <>0 THEN
1082    4                   DO ;
1083    5                   IF (MENU_KEY >= 030H) AND (MENU_KEY <= 039H) THEN
1084    5                       DO ;
1085    6                       DIGIT = DIGIT*10 + SIGNED(MENU_KEY)-030H ;
1086    6                           DO L = 0 TO DIGIT_MAX-2 ;
1087    7                           TEMP_DIG2(L) = TEMP_DIG2(L+1) ;
1088    7                           END ;

1089    6                       TEMP_DIG2(DIGIT_MAX-1) = MENU_KEY ;
1090    6                       END ;
1091    5                   IF MENU_KEY = DONE_KEY THEN
1092    5                       DO ;
1093    6                       S2 = FLOAT(DIGIT) ;
1094    6                       COUNT_SF = S2/S1 ;
1095    6                       STATE = READY_STATE ;
1096    6                           DO L = 0 TO DIGIT_MAX-1 ;
1097    7                           COUNT_S1(L) = TEMP_DIG1(L) ;
1098    7                           END ;
1099    6                           DO L = 0 TO DIGIT_MAX-1 ;
1100    7                           IF TEMP_DIG2(0) = ' ' THEN
1101    7                               DO ;
1102    8                               TEMP_DIG2(0) = TEMP_DIG2(1) ;
1103    8                               TEMP_DIG2(1) = TEMP_DIG2(2) ;
1104    8                               TEMP_DIG2(2) = TEMP_DIG2(3) ;
1105    8                               TEMP_DIG2(3) = TEMP_DIG2(4) ;
1106    8                               TEMP_DIG2(4) = ' ' ;
1107    8                               END ;
1108    7                           END ;
1109    6                           DO L = 0 TO DIGIT_MAX-1 ;
1110    7                           COUNT_S2(L) = TEMP_DIG2(L) ;
1111    7                           END ;
1112    6                       CALL PR_SCALE_MESSAGE ;
1113    6                       END ;
1114    5                   IF MENU_KEY = DISPLAY_SCALE_KEY THEN
1115    5                       DO ;
1116    6                       CALL PR_SCALE_MESSAGE ;
1117    6                       STATE = READY_STATE ;
1118    6                       END ;
1119    5                   END ;
1120    4               END ;
1121    3           CALL CHECK_SWITCH ;
1122    3       END ;
1123    2   END PR_COUNT_SCALING_SECOND_STATE ;

/*
                THIS ROUTINE
            */

124     1   PR_OFF_STATE : PROCEDURE PUBLIC ;
125     2   CALL PR_DISP_TOT ;
126     2   DO WHILE STATE = OFF_STATE ;
127     3       CALL PR_LINE ;
```

```
1128   3        IF LINE_VALID = 1 THEN
1129   3           DO ;
1130   4              CALL PR_MENU_KEYS ;
1131   4              IF MENU_KEY = ON_KEY THEN
1132   4                 DO ;
1133   5                    IF SCALING_VALID = 1 THEN
1134   5                       DO ;
1135   6                          STATE = READY_STATE ;
1136   6                          CALL PR_DISP_TOT ;
1137   6                          END ;
1138   5                    ELSE
                               DO ;
1139   6                          STATE = SCALING_STATE ;
1140   6                          CALL PR_SCALE_MESSAGE ;
1141   6                          END ;
1142   5                    END ;
1143   4                 END ;
1144   3              CALL CHECK_SWITCH ;
1145   3           END ;
1146   2        END PR_OFF_STATE ;
1147   1     END MAIN ;
```

MODULE INFORMATION:

```
    CODE AREA SIZE     = 16E0H    58560
    CONSTANT AREA SIZE = 05C0H    1472D
    VARIABLE AREA SIZE = 001BH      27D
    MAXIMUM STACK SIZE = 0010H      16D
    1541 LINES READ
    0 PROGRAM WARNINGS
    0 PROGRAM ERRORS
```

DICTIONARY SUMMARY:

```
    370KB MEMORY AVAILABLE
    16KB MEMORY USED    (4%)
    0KB DISK SPACE USED
```

END OF PL/M-96 COMPILATION

```
         $COMPACT ROM DEBUG

1          PGM:DO ;
            /*
                 STATE LITERAL DEFINITIONS
            */
 2    1        declare Off_State              Literally '0' ;
 3    1        declare Align_State            Literally '1' ;
 4    1        declare Locate_Menu_State      Literally '2' ;
 5    1        declare Ready_State            Literally '3' ;
 6    1        declare Scaling_State          Literally '4' ;
 7    1        declare Scaling_State_Ready    Literally '5' ;
 8    1        declare Scaling_State_Next     Literally '6' ;
 9    1        declare Auto_Scaling_State     Literally '7' ;
10    1        declare Scaling_State_P2       Literally '8' ;
11    1        declare Scaling_First_Entry    Literally '9' ;
12    1        declare Scaling_Second_Entry   Literally '10' ;
```

```
13   1          declare Count_Scaling_State            Literally '11' ;
14   1          declare Count_Scaling_Second_State     Literally '12' ;
15   1          declare Area_State                     Literally '13' ;
16   1          declare Area_Data_State                Literally '14' ;
17   1          declare Lin_Dist_State                 Literally '15' ;
18   1          declare Lin_Dist_Data_State            Literally '16' ;
19   1          declare Lin_Dist_Comp_State            Literally '27' ;
20   1          declare Rect_Area_State                Literally '17' ;
21   1          declare Rect_Area_Data_State           Literally '18' ;
22   1          declare Rect_Area_Complete_State       Literally '19' ;
23   1          declare Tri_Area_State                 Literally '20' ;
24   1          declare Tri_Area_Data_State            Literally '21' ;
25   1          declare Tri_Area_Complete_State        Literally '22' ;
26   1          declare Connect_Dots_State             Literally '23' ;
27   1          declare Connect_Dots_Data_State        Literally '24' ;
28   1          declare Count_State                    Literally '25' ;
29   1          declare Calc_State                     Literally '26' ;
             /*
                KEY LITERAL DEFINITIONS
             */
30   1          declare Non_Menu_Data       Literally '0' ;
31   1          declare ZERO_KEY            Literally '030H' ;
32   1          declare ONE_KEY             Literally '031H' ;
33   1          declare TWO_KEY             Literally '032H' ;
34   1          declare THREE_KEY           Literally '033H' ;
35   1          declare FOUR_KEY            Literally '034H' ;
36   1          declare FIVE_KEY            Literally '035H' ;
37   1          declare SIX_KEY             Literally '036H' ;
38   1          declare SEVEN_KEY           Literally '037H' ;
39   1          declare EIGHT_KEY           Literally '038H' ;
40   1          declare NINE_KEY            Literally '039H' ;
41   1          declare ENGLISH_SCALE_KEY   Literally ' 1' ;
42   1          declare METRIC_SCALE_KEY    Literally ' 2' ;
43   1          declare COUNT_SCALE_KEY     Literally ' 3' ;
44   1          declare AUTO_SCALE_KEY      Literally ' 4' ;
45   1          declare HORIZONTAL_KEY      Literally ' 5' ;
46   1          declare VERTICAL_KEY        Literally ' 6' ;
47   1          declare DISPLAY_SCALE_KEY   Literally ' 7' ;
48   1          declare CLOSED_SHAPE_KEY    Literally ' 8' ;
49   1          declare LINE_DIST_KEY       Literally ' 9' ;
50   1          declare RECT_AREA_KEY       Literally '10' ;
51   1          declare TRI_AREA_KEY        Literally '11' ;
52   1          declare CONNECT_DOTS_KEY    Literally '12' ;
53   1          declare COUNT_KEY           Literally '13' ;
54   1          declare DONE_KEY            Literally '14' ;
55   1          declare SEND_KEY            Literally '15' ;
56   1          declare CLEAR_KEY           Literally '16' ;
57   1          declare CLEAR_LAST_KEY      Literally '17' ;
58   1          declare PLUS_KEY            Literally '18' ;
59   1          declare MINUS_KEY           Literally '19' ;
60   1          declare MULT_KEY            Literally '20' ;
61   1          declare DIVIDE_KEY          Literally '21' ;
62   1          declare OP_KEY              Literally '22' ;
63   1          declare PI_KEY              Literally '26' ;
64   1          declare SKIP_KEY            Literally '28' ;
65   1          declare ENTER_KEY           Literally '29' ;
66   1          declare BKFLD_KEY           Literally '30' ;
```

```
67   1          declare F1_KEY              Literally '31' ;
68   1          declare F2_KEY              Literally '32' ;
69   1          declare F3_KEY              Literally '33' ;
70   1          declare F4_KEY              Literally '34' ;
71   1          declare F5_KEY              Literally '35' ;
72   1          declare F6_KEY              Literally '36' ;
73   1          declare F7_KEY              Literally '37' ;
74   1          declare F8_KEY              Literally '38' ;
75   1          declare DEL_CHAR_KEY        Literally '39' ;
76   1          declare LEFT_ARROW_KEY      Literally '40' ;
77   1          declare RIGHT_ARROW_KEY     Literally '41' ;
78   1          declare INS_CHAR_KEY        Literally '42' ;
79   1          declare PRINT_KEY           Literally '44' ;
80   1          declare ON_KEY              Literally '46' ;
81   1          declare OFF_KEY             Literally '47' ;
82   1          declare Log_On_Key          Literally '23' ;
83   1          declare Log_Off_Key         Literally '24' ;
          /*
             SYSTEM LITERAL DEFINITIONS
          */
84   1          declare Both                Literally '3' ;
85   1          declare Cpu                 Literally '1' ;
86   1          declare D_Cnt_Max           Literally '400' ;
87   1          declare Delta               Literally '0' ;
88   1          declare Done                Literally '1' ;
89   1          declare English             Literally '2' ;
90   1          declare Error               Literally '1' ;
91   1          declare Final               Literally '1' ;
92   1          declare Horizontal          Literally '2' ;
93   1          declare Line                Literally '3' ;
94   1          declare Line_Timeout        Literally '500';
95   1          declare Metric              Literally '1' ;
96   1          declare Normal              Literally '0' ;
97   1          declare One_Line            Literally '11';
98   1          declare Point               Literally '4' ;
99   1          declare RealClose           Literally '2' ;
100  1          declare Send                Literally '0' ;
101  1          declare T_Cnt_Max           Literally '100' ;
102  1          declare Vertical            Literally '1' ;
103  1          declare Ascii_Div           Literally '1,2FH',
                        Ascii_Minus         Literally '1,2DH',
                        Ascii_Mult          Literally '1,2AH',
                        Ascii_Plus          Literally '1,2BH',
                        Del_Char            Literally '2,1BH,51H',
                        Enter               Literally '3,1BH,69H,71H',
                        F1                  Literally '3,1BH,69H,31H',
                        F2                  Literally '3,1BH,69H,32H',
                        F3                  Literally '3,1BH,69H,33H',
                        F4                  Literally '3,1BH,69H,34H',
                        F5                  Literally '3,1BH,69H,35H',
                        F6                  Literally '3,1BH,69H,36H',
                        F7                  Literally '3,1BH,69H,37H',
                        F8                  Literally '3,1BH,69H,38H',
                        Field               Literally '2,1BH,74H',
                        Ins                 Literally '2,1BH,50H',
                        Left                Literally '2,1BH,44H',
                        PI                  Literally '2,50H,49H',
                        Print               Literally '2,1BH,57H',
```

```
                    Right           Literally '2,1BH,43H',
                    Skip            Literally '2,1BH,73H',
                    LogOn           Literally '3,1BH,67H,21H',
                    LogOf           Literally '3,51H,1BH,73H';
        /*
            SYSTEM VARIABLES
        */
104  1      declare Corner_Count     byte external ;
105  1      declare Count_SF         real external;
106  1      declare Data_Count       byte external ;
107  1      declare Down_Flag        byte external ;
108  1      declare D_Buffer(401)    byte external ;
109  1      declare D_Char_Cnt       byte external ;
110  1      declare D_Out_Ptr        byte external ;
111  1      declare Hor_SF           real external ;
112  1      declare Line_State       byte external ;
113  1      declare Line_Valid       byte external ;
114  1      declare Menu_Key         byte external ;
115  1      declare Menu_Valid       byte external ;
116  1      declare P1X              real external ;
117  1      declare P1Y              real external ;
118  1      declare P2X              real external ;
119  1      declare P2Y              real external ;
120  1      declare Point_Timer      integer external ;
121  1      declare SFT_BCD(10)      byte external ;
122  1      declare SFCV_BCD(10)     byte external ;
123  1      declare S1               real external ;
124  1      declare S2               real external ;
125  1      declare Scale_Fact       real external ;
126  1      declare Scaling_Mode     byte external ;
127  1      declare Scaling_Dimension byte external ;
128  1      declare Scaling_Valid    byte external ;
129  1      declare Scaling_Valid_Horz byte external ;

130  1      declare Scaling_Valid_Vert byte external ;
131  1      declare State            byte external ;
132  1      declare Switch_Closed    byte external ;
133  1      declare T_Buffer(101)    byte external ;
134  1      declare T_Out_Ptr        byte external ;
135  1      declare T_In_Ptr         byte external ;
136  1      declare T_Char_Cnt       byte external ;
137  1      declare Temp(10)         byte external ; /* used in real to bcd conver */
138  1      declare Timer            integer external;
139  1      declare Tx_State         byte external ;
140  1      declare Vert_SF          real external ;
141  1      declare X_Data           real external ;
142  1      declare X_Menu           integer external ;
143  1      declare X_Pos            integer external ;
144  1      declare X_Sign           byte external ;
145  1      declare Y_Data           real external ;
146  1      declare Y_Menu           integer external ;
147  1      declare Y_Pos            integer external ;
148  1      declare Y_Sign           byte external ;

149  1      declare Area_S           real;
150  1      declare Current_Count_Value real;
151  1      declare Denom            real;
152  1      declare Dig              real;          /* with the digitizer menu */
```

```
153  1           declare Disp_Flag        byte;
154  1           declare Ix               integer;
155  1           declare Iy               integer;
156  1           declare Menu_Item(2)     byte;
157  1           declare PxStart          real;
158  1           declare PyStart          real;
159  1           declare SFT_S            real public;
160  1           declare SFCV_S           real public;
161  1           declare Start_States(28) byte data(0,1,2,3,4,5,6,7,8,9,10,11,12,
                                               13,13,15,15,17,17,17,20,20,20,
                                               23,23,25,26,15);
162  1           declare Ten_E4           real public data (10000.);
163  1           declare Timeout          integer public;

164  1     Pr_Line: procedure external;      /* processes a line of digitizer input */
165  2     end Pr_Line;

166  1     Pr_Menu_Keys: procedure external; /* returns a key if menu key was hit */
167  2     end Pr_Menu_Keys;

168  1     Check_Scale_Keys: procedure external;
169  2     end Check_Scale_Keys;

170  1     Check_Switch:procedure external; /* checks align switch */
171  2     end Check_Switch;

172  1     Pr_Disp_Tot: procedure external;  /* displays sft and sfcv values */
173  2     end Pr_Disp_Tot;

174  1     Scale_Cvtx: procedure real; /* Returns valid X coord. based on Scale Factor */
175  2        return Hor_SF * X_Data;
176  2     end Scale_Cvtx;
177  1     Scale_Cvty: procedure real; /* Returns valid Y coord. based on Scale Factor */
178  2        return Vert_SF * Y_Data;
179  2     end Scale_Cvty;

180  1     Char_Pos: procedure(C,S_Ptr) byte;  /* Returns position of C in String */
181  2        declare C byte;                  /*    based on origin 1 */
182  2        declare S_Ptr pointer;
183  2        declare SS based S_Ptr(1) byte;
184  2        declare I word;

185  2        I=0; do while SS(I)<>80H; I=I+1; if C=SS(I-1) then return I; end; return 0;
192  2     end Char_Pos;

193  1     Fill_Buf: procedure(Bt);        /* places character into output buffer */
194  2        declare Bt byte;
195  3        do while T_Char_Cnt=T_Cnt_Max; end; /* if buffer full just wait */
197  2        T_Buffer(T_In_Ptr)=Bt;
198  2        T_Char_Cnt=T_Char_Cnt+1;
199  2        T_In_Ptr=(T_In_Ptr+1) mod (T_Cnt_Max+1); /* update buffer pointer */
200  2     end Fill_Buf;

201  1     Transmit: procedure(Pb,TxtPtr,Tb) public;  /* Fills up transmit buffer */
202  2        declare Pb byte,Tb byte;
203  2        declare TxtPtr pointer;
204  2        declare T based TxtPtr(1) byte;
205  2        declare I  byte;
```

```
206  2       if (T(0)>0) and (T(0)<T_Cnt_Max) then
207  2       do;
208  3          call Fill_Buf(Fb);      /* enter control byte first */
209  3          do I=1 to T(0);
210  4             call Fill_Buf(T(I));  /* enter textual data inbetween */
211  4          end;
212  3          call Fill_Buf(Tb);      /* enter control byte last */
213  3       end;
214  2    end Transmit;

215  1    Clear_Digit:procedure;
216  2       Dig=0.0;Denom=0.0;       /* clear out all the digit values */
218  2    end Clear_Digit;

219  1    Build_Digit: procedure;   /* Constructs a real decimal value from ascii input */
220  2       if (Menu_Key=22) and (Denom=0.) then Denom=1.;
222  2       else                          /* single precision- six significant digits */
             do;
223  3          Dig=Dig*10.+Float(Int(Menu_Key and 0FH));
224  4          if Denom>0. then do; Denom=Denom*10.; SFCV_S=ST_SFCV(Dig/Denom); end;
229  3          else SFCV_S=ST_SFCV(Dig);
230  3       end;
231  2       call Pr_Disp_Tot;
232  2    end Build_Digit;

233  1    Set_Point_Mode: procedure;   /* routine waits for the input buffer to empty */
234  2       call Fill_Buf(point);                 /* set digitizer back to point mode */
235  2       Point_Timer=0;
236  3       do while Point_Timer<Line_Timeout; end;
238  2    end Set_Point_Mode;

239  1    Sfptbcd: procedure(X) external;   /* Converts small real values to packed BCD */
240  2       declare X real;
241  2    end Sfptbcd;

242  1    StrR: procedure(R,Rptr) pointer Public;   /* Converts real to ascii string */
243  2       declare len literally '5';
244  2       declare R real;             /* value is short real */
245  2       declare I byte;
246  2       declare AStr(20) byte;
247  2       declare Rptr pointer;
248  2       declare Rbcd based Rptr(1) byte;

249  2       if R<0. then AStr(1)='-'; else AStr(1)=' ';
252  2       do I=0 to Len;
253  3          AStr((2*(len+1)-2*I)+1)=(Rbcd(I) and 0FH) or 30H;
254  3          AStr((2*(len+1)-2*I))=(shr(Rbcd(I),4)) or 30H;
255  3       end;
256  2       I=2;
257  3       do while (Astr(I)='0') and (I<2*(len+1)-2); I=I+1; end;
260  2       call movb(@AStr(I),@Astr(2),(2*(len+1)+2-I));
261  2       call movb(@AStr(2*(Len+1)-I),@AStr(2*(len+1)-I+1),4);AStr(2*(len+1)-I)=2EH;
263  2       AStr(0)=2*(Len+1)-I+4;
264  2       return @AStr(0);
265  2    end StrR;

266  1    Load: procedure(R) real;/* procedure used put a real value on the 8087 stack */
```

```
267  2        declare R real;
268  2        return R;
269  2     end Load;

270  1     LA_Area: procedure(r) real external;/* load and add area to top of 8087 stack */
271  2        declare r real;
272  2     end LA_Area;

273  1     ST_Area: procedure(r) real external;/* store top of stack into area */
274  2        declare r real;
275  2     end ST_Area;

276  1     LA_SFT: procedure(R) real external;
277  2        declare r real;
278  2     end LA_SFT;

279  1     ST_SFT: procedure(R) real external;
280  2        declare r real;
281  2     end ST_SFT;

282  1     LA_SFCV: procedure(R) real external;
283  2        declare r real;
284  2     end LA_SFCV;

285  1     ST_SFCV: procedure(R) real external;
286  2        declare r real;
287  2     end ST_SFCV;

288  1     N_SFCV: procedure external;
289  2     end N_SFCV;

290  1     Add_Digit: procedure real external;
291  2     end Add_Digit;

292  1     Sub_Digit: procedure real external;
293  2     end Sub_Digit;

294  1     Mult_Digit: procedure real external;
295  2     end Mult_Digit;

296  1     Div_Digit: procedure real external;
297  2     end Div_Digit;

298  1     Clear_SFT: procedure public;
299  2        SFT_S=ST_SFT(0.);
300  2     end Clear_SFT;

301  1     Clear_SFCV: procedure public;
302  2        SFCV_S=ST_SFCV(0.);
303  2     end Clear_SFCV;

304  1     Calc_Area: procedure;           /* Calculates Area of closed area fora */
305  2        Area_S=ST_Area(LA_Area(((P2x-P1x)*(P2y+P1y))/2.));
306  2        SFCV_S=ST_SFCV(abs(LA_Area(((PxStart-P2x)*(PyStart+P2y))/2.)));
307  2     end Calc_Area;

308  1     Sqrt: procedure(X) real external; /* Returns square root of top of 8087 stack */
309  2        declare X real;
```

```
310  2      end Sqrt;

311  1      Calc_Linear_Dist: procedure;
312  2        SFCV_S=ST_SFCV(Sqrt(((P2x-P1x)*(P2x-P1x))+((P2y-P1y)*(P2y-P1y))));
313  2      end Calc_Linear_Dist;

314  1      Calc_Rect_Area: procedure;
315  2        SFCV_S=ST_SFCV(LA_SFCV(LA_SFCV(0.)));
316  2      end Calc_Rect_Area;

317  1      Calc_Conn_Dots_Len: procedure;
318  2        SFCV_S=ST_SFCV(LA_SFCV(Sqrt(((P2x-P1x)*(P2x-P1x))+((P2y-P1y)*(P2y-P1y)))));
319  2      end Calc_Conn_Dots_Len;

320  1      Update_SFT: procedure;           /* Updates SFT_S and sets new state */
321  2        SFT_S=ST_SFT(LA_SFT(LA_SFCV(0.)));
322  2      end Update_SFT;

323  1      Cleanup_State: procedure(St);  /* Cleans up before exiting state */
324  2        declare St byte;
325  2        call Update_SFT;
326  2        State=St;
327  2        call Clear_SFCV;
328  2        call Pr_Disp_Tot;
329  2      end Cleanup_State;

330  1      GetDigit: procedure byte;     /* Returns true if Menu_Key digit or dec. pt. */
331  2        if ((Menu_Key > 2FH) and (Menu_Key < 3AH)) or (Menu_Key = 22) then
332  2          return 1;
333  2        else return 0;
334  2      end GetDigit;

335  1      Change_State: procedure; /* centralizes these seven key responses */
336  2        do case Char_Pos(Menu_Key,@(Display_Scale_Key,Closed_Shape_Key,
                                          Line_Dist_Key,Rect_Area_Key,Tri_Area_Key,
                                          Connect_Dots_Key,Count_Key,80H));
337  3          ;                          /* nul case */
338  3          call Check_Scale_Keys;                    /* Display_Scale key */
339  3          call Cleanup_State(Area_State);      /* Closed_Shape_Key */
340  3          call Cleanup_State(Lin_Dist_State);  /* Linear_Distance key */
341  3          call Cleanup_State(Rect_Area_State); /* Area_of_Rectangle_Key */
342  3          call Cleanup_State(Tri_Area_State);  /* Area_Of_Triangle_Key */
343  3          call Cleanup_State(Connect_Dots_State); /* Connect_Dots_Key */
344  3          call Cleanup_State(Count_State);        /* Count_Key */
345  3        end;  /* case */
346  2      end Change_State;

347  1      Pr_Ship_Data: procedure(Mode);
348  2        declare Mode byte;
349  2        declare ptr pointer;
350  2        declare Temp_SFT(20) byte;
351  2        call Update_SFT;
352  2        ptr=StrR(SFT_S,@SFT_BCD);call movb(Ptr,@Temp_SFT,20);
354  2        call Clear_SFT;
355  2        call Clear_SFCV;
356  2        call Pr_Disp_Tot;
357  2        call Transmit(CPU,@Temp_SFT,Normal);
358  2        if Mode=Done then call Transmit(CPU,@(Skip),Normal);
```

```
360  2      end Pr_Ship_Data;

361  1      Reset_State: procedure;
362  2        do case Char_Pos(Menu_Key,@(Done_Key,Send_Key,Clear_Key,Clear_Last_Key,
                                         Off_Key,80H));
363  3          ;                          /* nul case */
364  3          do;                                              /* Done_Key */
365  4            State=Ready_State;
366  4            call Pr_Ship_Data(Done);
367  4          end;
368  3          do;                                              /* Send_Key */
369  4            State=Ready_State;
370  4            call Pr_Ship_Data(Send);
371  4          end;
372  3          do;                                              /* Clear_Key */
373  4            call Clear_SFT;
374  4            call Clear_SFCV;
375  4            State=Ready_State;
376  4            call Pr_Disp_Tot;
377  4          end;
378  3          do;                                /* Clear_Last_Key */
379  4            call Clear_SFCV;
380  4            State=Start_States(State);    /* set state = the start state */
381  4            call Pr_Disp_Tot;
382  4          end;
383  3          do;                                              /* Off_Key */
384  4            call Clear_SFCV;
385  4            State=Off_State;
386  4            call Pr_Disp_Tot;
387  4          end;
388  3        end;   /* case */
389  2      end Reset_State;

390  1      Pr_Ready_State : procedure public;

391  2        Menu_Item(0)=1; call Clear_SFCV;
393  2        do while State=Ready_State;
394  3          if Scaling_Valid=0 then State=Scaling_State;
396  3          else
                do;
397  4            if O_Char_Cnt > One_Line then
398  4            do;
399  5              call Pr_Line; call Pr_Menu_Keys;    /* Get key from input buffer. */
401  5              if Menu_Key>80H then
402  5                do;
403  6                  Menu_Item(1)=Menu_Key and 7FH;
404  6                  call transmit(Cpu,@Menu_Item,Normal);
405  6                end;
406  5              else
                    do;
407  6                do case Char_Pos(Menu_Key,@(1,2,3,4,18,19,20,21,26,28,29,30,31,32,33,
                                                34,35,36,37,38,39,40,41,42,44,47,23,24,
                                                80H));
408  7                  do;          /* key is a digit key or non-menu */
409  8                    if GetDigit=1 then do;
411  9                      if Menu_Key = 22 then Menu_Key = 2EH;
413  9                      Menu_Item(1)=Menu_Key;
414  9                      call Transmit(CPU,@Menu_Item,Normal);
```

```
415  9              end;
416  8            end;
417  7            call Check_Scale_Keys;              /* English_Scale key */
418  7            call Check_Scale_Keys;              /* Metric_Scale key */
419  7            do;                                  /* Count_Scale key */
420  8              call Clear_Digit;
421  8              State=Count_Scaling_State;
422  8            end;
423  7            call Check_Scale_Keys;              /* Auto_Scale_Key */
424  7            call Transmit(Cpu,@(Ascii_Plus),Normal);   /* + key */
425  7            call Transmit(Cpu,@(Ascii_Minus),Normal);  /* - key */
426  7            call Transmit(Cpu,@(Ascii_Mult),Normal);   /* * key */
427  7            call Transmit(Cpu,@(Ascii_Div),Normal);    /* / key */
428  7            call Transmit(Cpu,@(PI),Normal);           /* PI key */
429  7            call Transmit(Cpu,@(Skip),Normal);         /* Skip key */
430  7            call Transmit(Cpu,@(Enter),Normal);        /* Enter_Key */
431  7            call Transmit(Cpu,@(Field),Normal);        /* Field_Key */
432  7            call Transmit(Cpu,@(F1),Normal);           /* F1 key */
433  7            call Transmit(Cpu,@(F2),Normal);           /* F2 key */
434  7            call Transmit(Cpu,@(F3),Normal);           /* F3 key */
435  7            call Transmit(Cpu,@(F4),Normal);           /* F4 key */
436  7            call Transmit(Cpu,@(F5),Normal);           /* F5 key */
437  7            call Transmit(Cpu,@(F6),Normal);           /* F6 key */
438  7            call Transmit(Cpu,@(F7),Normal);           /* F7 key */
439  7            call Transmit(Cpu,@(F8),Normal);           /* F8 key */
440  7            call Transmit(Cpu,@(Del_Char),Normal);     /* Del_Char_Key */
441  7            call Transmit(Cpu,@(Left),Normal);         /* Left_Arrow_Key */
442  7            call Transmit(Cpu,@(Right),Normal);        /* Right_Arrow_Key */
443  7            call Transmit(Cpu,@(Ins),Normal);          /* Ins_Char_Key */
444  7            call Transmit(Cpu,@(Print),Normal);        /* Print_Key */
445  7            State=Off_State;                           /* Off_Key */
446  7            call Transmit(Cpu,@(logon),Normal);        /* Log_On_Key */
447  7            call Transmit(Cpu,@(Logof),Normal);        /* Log_Off_Key */
448  7          end;      /* case */
449  6          call Change_State;
450  6          call Reset_State;
451  6        end;        /* if */
452  5      end;
453  4    end;            /* else */
454  3    call Check_Switch;
455  3  end;    /* while loop */
456  2 end Pr_Ready_State;

457  1 Pr_Area_State: procedure public;

458  2    P1x=0.; P1y=0.; P2x=0.; P2y=0.;
462  2    Area_S=ST_Area(Load(0.));        /* clear out area as well */
463  2    call Fill_Buf(Line);             /* set digitizer to line mode */
464  2    do while State=Area_State;
465  3      if D_Char_Cnt > One_Line then
466  3      do;
467  4        call Pr_Line; call Pr_Menu_Keys;
469  4        if GetDigit then             /* Is Menu_Key a digit ?? */
470  4          do;
471  5            call Cleanup_State(Calc_State);
472  5            call Clear_Digit;
```

```
473  5              call Build_Digit;
474  5            end;
475  4          else if Menu_key=Non_Menu_Data then     /* non menu data */
476  4            do;
477  5              Ix=X_Pos; Iy=Y_Pos;   /* assign integers to compare later */
479  5              PxStart=Scale_Cvtx; PyStart=Scale_Cvty;
481  5              P2x=PxStart; P2y=PyStart;
483  5              State=Area_Data_State;
484  5            end;
485  4          call Change_State;
486  4          call Reset_State;
487  4        end;    /* if */
488  3        call Check_Switch;
489  3      end;    /* while clause */
490  2      if State<>Area_Data_State then call Set_Point_Mode;
492  2    end Pr_Area_State;

493  1    Pr_Area_Data_State: procedure public;

494  2      do while State=Area_Data_State;
495  3        if Disp_Flag=1 then
496  3          do;
497  4            if Timer>Timeout then
498  4              do;
499  5                Timer=0; call Pr_Disp_Tot; Disp_Flag=0;
502  5              end;
503  4          end;
504  3        if O_Char_Cnt > One_Line then
505  3        do;
506  4          call Pr_Line; call Pr_Menu_Keys;    /* Get key from input buffer. */
508  4          do case Char_Pos(Menu_Key,&(Non_Menu_Data,Plus_Key,Minus_Key,80H));
509  5            do;                                    /* digit */
510  6              if GetDigit=1 then
511  6                do;
512  7                  call Cleanup_State(Calc_State);
513  7                  call Clear_Digit;
514  7                  call Build_Digit;
515  7                end;
516  6            end;
517  5            do;                                    /* non menu data */
518  6              if ((abs(Ix-X_Pos))>RealClose) or ((abs(Iy-Y_Pos))>RealClose) then
519  6                do;
520  7                  Ix=X_Pos; Iy=Y_Pos;
522  7                  P1x=P2x; P1y=P2y; P2x=Scale_Cvtx; P2y=Scale_Cvty;
526  7                  call Calc_Area;
527  7                  Disp_Flag=1;
528  7                end;
529  6            end;
530  5            call Cleanup_State(Area_State);        /* + key */
531  5            do;                                    /* - key */
532  6              call N_SFCV;
533  6              call Cleanup_State(Area_State);
534  6            end;
535  5          end;      /*   case   */
536  4          call Change_State;
537  4          call Reset_State;
```

```
538  4              end;        /* if */
539  3           call Check_Switch;
540  3         end;    /* while loop */
541  2       call Set_Point_Mode;
542  2    end Pr_Area_Data_State;

543  1    Pr_Lin_Dist_State: procedure public;
544  2       do while State=Lin_Dist_State;
545  3          if D_Char_Cnt > One_Line then
546  3          do;
547  4             call Pr_Line; call Pr_Menu_Keys;    /* Get key from input buffer. */
549  4             do case Char_Pos(Menu_Key,@(Non_Menu_Data,Display_Scale_Key,80H));
550  5                do;                                          /* digit */
551  6                   if GetDigit=1 then
552  6                   do;
553  7                      call Cleanup_State(Calc_State);
554  7                      call Clear_Digit;
555  7                      call Build_Digit;
556  7                   end;
557  6                end;
558  5                do;                                 /* non-menu data */
559  6                   P1x=Scale_Cvtx; P1y=Scale_Cvty;
561  6                   State=Lin_Dist_Data_State;
562  6                end;
563  5                call Check_Scale_Keys;             /* Display_Scale key */
564  5             end;        /* case */
565  4             call Change_State;
566  4             call Reset_State;
567  4          end;      /* if */
568  3          call Check_Switch;
569  3       end;    /* while loop */
570  2    end Pr_Lin_Dist_State;

571  1    Pr_Lin_Dist_Data_State : procedure public;
572  2       do while State=Lin_Dist_Data_State;
573  3          if D_Char_Cnt > One_Line then
574  3          do;
575  4             call Pr_Line; call Pr_Menu_Keys;
577  4             if GetDigit=1 then
578  4             do;
579  5                call Cleanup_State(Calc_State);
580  5                call Clear_Digit;
581  5                call Build_Digit;
582  5             end;
583  4             else if Menu_Key=Non_Menu_Data then
584  4             do;
585  5                P2x=Scale_Cvtx; P2y=Scale_Cvty;
587  5                call Calc_Linear_Dist;
588  5                State=Lin_Dist_Comp_State;
589  5                call Pr_Disp_Tot;
590  5             end;
591  4             call Change_State;
592  4             call Reset_State;
593  4          end; /* if */
594  3          call Check_Switch;
595  3       end;   /* while loop */
596  2    end Pr_Lin_Dist_Data_State;
```

```
597  1    Pr_Lin_Dist_Comp_State : procedure public;

598  2      do while State=Lin_Dist_Comp_State;
599  3        if D_Char_Cnt > One_Line then
600  3        do;
601  4          call Pr_Line; call Pr_Menu_Keys;    /* Get key from input buffer. */
603  4          do case Char_Pos(Menu_Key,&(Non_Menu_Data,Plus_Key,Minus_Key,80H));
604  5            do;                               /* digit */
605  6              if GetDigit=1 then
606  6              do;
607  7                call Cleanup_State(Calc_State);
608  7                call Clear_Digit;
609  7                call Build_Digit;
610  7              end;
611  6            end;
612  5            do;                               /* non menu data */
613  6              P1x=Scale_Cvtx; P1y=Scale_Cvty;
615  6              call Cleanup_State(Lin_Dist_Data_State);
616  6            end;
617  5            call Cleanup_State(Lin_Dist_State);    /* + key */
618  5            do;                                    /* - key */
619  6              call N_SFCV;
620  6              call Cleanup_State(Lin_Dist_State);
621  6            end;
622  5          end;     /*  case  */
623  4          call Change_State;
624  4          call Reset_State;
625  4        end;    /* if */
626  3        call Check_Switch;
627  3      end;  /* while loop */
628  2    end Pr_Lin_Dist_Comp_State;
629  1    Pr_Tri_Area_State : procedure public;
630  2      P1x=0.;P1y=0.;P2x=0.;P2y=0.;
634  2      Area_S=ST_Area(Load(0.));             /* reset all values to zero */
635  2      do while (State=Tri_Area_State) or (State=Rect_Area_State);
636  3        if D_Char_Cnt > One_Line then
637  3        do;
638  4          call Pr_Line; call Pr_Menu_Keys;   /* Get key from input buffer. */
640  4          if GetDigit=1 then
641  4          do;
642  5            call Cleanup_State(Calc_State);
643  5            call Clear_Digit;
644  5            call Build_Digit;
645  5          end;
646  4          else if Menu_Key=Non_Menu_Data then
647  4          do;
648  5            P1x=Scale_Cvtx; P1y=Scale_Cvty; Pxstart=P1x; Pystart=P1y;
652  5            State=State+1;  /* will move to the Data state */
653  5          end;
654  4          call Change_State;
655  4          call Reset_State;
656  4        end;    /* if */
657  3        call Check_Switch;
658  3      end;  /* while loop */
659  2    end Pr_Tri_Area_State;
660  1    Pr_Tri_Area_Data_State : procedure public;
```

```
661  2          do while (State=Tri_Area_Data_State) or (State=Rect_Area_Data_State);
662  3            if D_Char_Cnt > One_Line then
663  3              do;
664  4                call Pr_Line; call Pr_Menu_Keys;      /* Get key from input buffer. */
666  4                do case Char_Pos(Menu_Key,&(Non_Menu_Data,Display_Scale_Key,
                                              Clear_Key,Clear_Last_Key,Off_Key,80H));
667  5                  ;            /* nul case */
668  5                  do;
669  6                                                       /* non-menu data */
                         if (P2x=0.) and (P2y=0.) then
670  6                     do;
671  7                       P2x=Scale_Cvtx; P2y=Scale_Cvty;
673  7                       call Calc_Area;
674  7                     end;
675  6                   else
                           do;
676  7                       P1x=P2x; P1y=P2y; P2x=Scale_Cvtx; P2y=Scale_Cvty;
680  7                       call Calc_Area;
681  7                       if State=Rect_Area_Data_State then call Calc_Rect_Area;
683  7                       call Pr_Disp_Tot;
684  7                       State=State+1;    /* move to the Complete state */
685  7                     end;
686  6                  end;
687  5                  call Check_Scale_Keys;
688  5                  do;                                  /* Display_Scale key */
689  6                                                       /* Clear_Key */
                         call Clear_SFT;
690  6                   call Clear_SFCV;
691  6                   State=Ready_State;
692  6                   call Pr_Disp_Tot;
693  6                  end;
694  5                  do;
695  6                   call Clear_SFCV;                    /* Clear_Last_Key */
696  6                   State=Start_States(State);
697  6                  end;
698  5                  do;
699  6                   call Clear_SFT;                     /* Off_Key */
700  6                   call Clear_SFCV;
701  6                   State=Off_State;
702  6                   call Pr_Disp_Tot;
703  6                  end;
704  5                end;       /*  case  */
705  4              end;   /* if */
706  3            call Check_Switch;
707  3          end;  /* while loop */
708  2        end Pr_Tri_Area_Data_State;

709  1        Pr_Tri_Area_Complete_State : procedure public;
710  2          do while (State=Tri_Area_Complete_State) or (State=Rect_Area_Complete_State);
711  3            if D_Char_Cnt > One_Line then
712  3              do;
713  4                call Pr_Line; call Pr_Menu_Keys;     /* Get key from input buffer. */
715  4                do case Char_Pos(Menu_Key,&(Non_Menu_Data,Plus_key,Minus_Key,80H));
716  5                  do;                                 /* digit */
717  6                   if GetDigit=1 then
718  6                    do;
719  7                      call Cleanup_State(Calc_State);
720  7                      call Clear_Digit;
721  7                      .call Build_Digit;
722  7                    end;
```

```
723  6              end;
724  5              do;                              /* non-menu data */
725  6                P1x=Scale_Cvtx; P1y=Scale_Cvty; Pxstart=P1x; Pystart=P1y;
729  6                P2x=0.; P2y=0.;
731  6                Area_S=ST_Area(Load(0.)); /* clear out variables for new start */
732  6                call Cleanup_State(State-1); /* move back to Data State */
733  6              end;
734  5              call Cleanup_State(State-2);                      /* + key */
735  5              do;                                               /* - key */
736  6                call N_SFCV;
737  6                call Cleanup_State(State-2); /* move back to Area state */
738  6              end;
739  5            end;       /*  case  */
740  4            call Change_State;
741  4            call Reset_State;
742  4          end;     /* if */
743  3          call Check_Switch;
744  3        end;  /* while loop */
745  2      end Pr_Tri_Area_Complete_State;

746  1    Pr_Connect_Dots_State : procedure public;
747  2      call Fill_Buf(line);                 /* set digitizer to line mode */
748  2      do while State=Connect_Dots_State;
749  3        if D_Char_Cnt > One_Line then
750  3        do;
751  4          call Pr_Line; call Pr_Menu_Keys;   /* Get key from input buffer. */
753  4          if GetDigit=1 then
754  4          do;
755  5            call Cleanup_State(Calc_State);
756  5            call Clear_Digit;
757  5            call Build_Digit;
758  5          end;
759  4          else if Menu_Key=Non_Menu_Data then     /* non menu data */
760  4          do;
761  5            Ix=X_Pos; Iy=Y_Pos;
763  5            P2x=Scale_Cvtx; P2y=Scale_Cvty;
765  5            State=Connect_Dots_Data_State;
766  5          end;
767  4          call Change_State;
768  4          call Reset_State;
769  4        end;   /* if */
770  3        call Check_Switch;
771  3      end;  /* while loop */
772  2      if State<>Connect_dots_Data_State then call Set_Point_Mode;
774  2    end Pr_Connect_Dots_State;

775  1    Pr_Connect_Dots_Data_State : procedure public;
776  2      do while State=Connect_Dots_Data_State;
777  3        if Disp_Flag=1 then
778  3        do;
779  4          if Timer>Timeout then
780  4          do;
781  5            call Pr_Disp_Tot; Timer=0; Disp_Flag=0;
784  5          end;
785  4        end;
786  3        if D_Char_Cnt > One_Line then
787  3        do;
```

```
788  4           call Pr_Line; call Pr_Menu_keys;     /* Get key from input buffer. */
790  4           do case Char_Pos(Menu_Key,&(Non_Menu_Data,Plus_Key,Minus_Key,80H));
791  5             do;                              /* digit */
792  6               if GetDigit=1 then
793  6               do;
794  7                 call Cleanup_State(Calc_State);
795  7                 call Clear_Digit;
796  7                 call Build_Digit;
797  7               end;
798  6             end;
799  5             do;
800  6               if ((!abs(Ix-X_Pos))>RealClose) or ((!abs(Iy-Y_Pos))>RealClose) then
801  6               do;
802  7                 Ix=X_Pos; Iy=Y_Pos;
804  7                 P1x=P2x; P1y=P2y; P2x=Scale_Cvtx; P2y=Scale_Cvty;
808  7                 call Calc_Conn_Dots_Len;
809  7                 Disp_Flag=1;
810  7               end;
811  6             end;
812  5             do;
813  6               call Cleanup_State(Connect_Dots_State);     /* + key */
814  6             end;
815  5             do;
816  6               call N_SFCV;                                /* - key */
817  6               call Cleanup_State(Connect_Dots_State);
818  6             end;
819  5           end;      /* case */
820  4           call Change_State;
821  4           call Reset_State;
822  4         end;    /* if */
823  3         call Check_Switch;
824  3       end;    /* while loop */
825  2       call Set_Point_Mode;
826  2     end Pr_Connect_Dots_Data_State;

827  1   Calc_Cleanup: procedure;
828  2       call Clear_SFCV;
829  2       call Pr_Disp_Tot;
830  2       call Clear_Digit;
831  2   end Calc_Cleanup;

832  1   Pr_Calc_State: procedure public;
833  2       do while State=Calc_State;
834  3         if D_Char_Cnt > One_Line then
835  3         do;
836  4           call Pr_Line; call Pr_Menu_keys;     /* Get key from input buffer. */
838  4           do case Char_Pos(Menu_Key,&(Plus_Key,Minus_Key,Mult_key,Divide_key,80H));
839  5             do;                              /* digit */
840  6               if GetDigit=1 then
841  6               do;
842  7                 call Build_Digit;
843  7               end;
844  6             end;
845  5             do;                                           /* + key */
846  6               SFT_S=Add_Digit;
847  6               call Calc_Cleanup;
848  6             end;
```

```
849  5              do;                                              /* - key */
850  6                 SFT_S=Sub_Digit;
851  6                 call Calc_Cleanup;
852  6              end;
853  5              do;                                              /* * key */
854  6                 SFT_S=Mult_Digit;
855  6                 call Calc_Cleanup;
856  6              end;                                             /* / key */
857  5              do;
858  6                 SFT_S=Div_Digit;
859  6                 call Calc_Cleanup;
860  6              end;
861  5           end;         /*  case   */
862  4           call Change_State;
863  4           call Reset_State;
864  4        end;    /* if */
865  3        call Check_Switch;
866  3     end;   /* while loop */
867  2  end Pr_Calc_State;

868  1  Pr_Count_State : procedure public;

869  2     call Clear_SFCV;
870  2     do while State=Count_State;
871  3        if D_Char_Cnt > One_Line then
872  3        do;
873  4           call Pr_Line; call Pr_Menu_Keys;    /* Get key from input buffer. */
874  4           do case Char_Pos(Menu_Key,&(Non_Menu_Data,Plus_Key,Minus_Key,80H));
875  4                                                       /* digit */
876  5              do;
877  6                 if GetDigit=1 then
878  6                 do;
879  7                    call Cleanup_State(Calc_State);
880  7                    call Clear_Digit;
881  7                    call Build_Digit;
882  7                 end;
883  6              end;
884  5              do;                                      /* non menu data */
885  6                 SFCV_S=ST_SFCV(LA_SFCV(Load(Count_SF)));
886  6                 call Pr_Disp_Tot;
887  6              end;                                              /* + key */
888  5              do;
889  6                 call Cleanup_State(Count_State);
890  6              end;                                              /* - key */
891  5              do;
892  6                 call N_SFCV;
893  6                 call Cleanup_State(Count_State);
894  6              end;
895  5           end;         /*  case   */
896  4           call Change_State;
897  4           call Reset_State;
898  4        end;    /* if */
899  3        call Check_Switch;
900  3     end;   /* while loop */
901  2  end Pr_Count_State;

902  1  END PGM ;
```

MODULE INFORMATION:

CODE AREA SIZE     = 10F4H   4340D
    CONSTANT AREA SIZE = 00CCH   204D
    VARIABLE AREA SIZE = 0059H   89D
    MAXIMUM STACK SIZE = 001EH   30D
    956 LINES READ
    0 PROGRAM WARNINGS
    0 PROGRAM ERRORS

DICTIONARY SUMMARY:

121KB MEMORY AVAILABLE
    15KB MEMORY USED   (12%)
    0KB DISK SPACE USED

END OF PL/M-86 COMPILATION

RTCS/UDI V4.0 - 8086/87/88/186 MACRO ASSEMBLER V2.0 ASSEMBLY OF MODULE MATH
OBJECT MODULE PLACED IN B:MATH.OBJ
ASSEMBLER INVOKED BY: ASM86 B:MATH.SRC DEBUG

```
LOC  OBJ                      LINE    SOURCE

1              NAME    MATH
                               2      ;
                               3      ;       THIS MODULE CONTAINS TO CODE TO INTERFACE 8087 MATH
                               4      ;       OPERATIONS NOT BUILT INTO PLM-86
                               5      ;
                               6      CGROUP  GROUP   CODE
                               7      DGROUP  GROUP   DATA
                               8      ;
                               9              ASSUME  CS:CGROUP,DS:DGROUP
                              10
----                          11      DATA    SEGMENT PUBLIC 'DATA'
                              12      ;
0000 ??????????????           13      TEMP    DT      ?       ;TEN BYTE TEMP STORAGE
     ??????
000A ??????????????           14      TEMP1   DQ      ?       ;EIGHT BYTE TEMP STORAGE
     ??
0012 00000000000000            15     SFCV_L  DT 0    ;Special_Function_Values
     000000
001C 00000000000000            16     SFT_L   DT 0
     000000
0026 00000000000000            17     AREA_L  DT 0    ;Area value for finding current continuous area totals
     000000
0030 ??????????????           18      SFCV_BCD        DT ?
     ??????
003A ??????????????           19      SFT_BCD         DT ?
     ??????
0044 ??????????????           20      AREA_BCD        DT ?
     ??????
                              21      ;
                              22      ;
----                          23      DATA    ENDS
                              24      ;
                              25      ;
```

```
                              26    CODE    SEGMENT PUBLIC 'CODE
                              27    ;
                              28    ;
                              29            PUBLIC  SQRT,SFPTBCD,LA_AREA,ST_AREA,LA_SFT,ST_SFT,LA_SFCV,ST_SFC
                              30            PUBLIC  N_SFCV,Sub_Digit,Add_Digit,Mult_Digit,Div_Digit
                              31            PUBLIC  TEMP,TEMP1,SFCV_L,SFT_L,SFT_BCD,SFCV_BCD,AREA_L,AREA_BCD
                              32    ;
                              33            EXTRN   TEN_E4:DWORD
                              34    ;
0000                          35    SQRT:
0000 9BD9FA                   36            FSQRT              ;CALCULATE THE SQUARE ROOT OF TOP OF STACK
0003 C3                       37            RET
                              38    ;
0004                          39    SFPTBCD:
0004 9BDF360000     R         40            FBSTP  TEMP ;Convert top of stack real to packed bcd
0009 C3                       41            RET
                              42    ;
000A                          43    LA_AREA:
000A 9BDB2E2600     R         44            FLD ARFA_L  ;Load area long-real
000F 9BDEC1                   45            FADD         ;Add st(0) to st(1)
0012 C3                       46            RET
                              47    ;
0013                          48    ST_AREA:
0013 9BD9C0                   49            FLD ST(0)
0016 9BDB3E2600    R          50            FSTP AREA_L
001B C3                       51            RET
                              52    ;
001C                          53    LA_SFT:
001C 9BDB2E1C00    R          54            FLD SFT_L
0021 9BDEC1                   55            FADD
0024 C3                       56            RET
                              57    ;
0025                          58    ST_SFT:
0025 9BD9C0                   59            FLD ST(0)
0028 9BDB3E1C00    R          60            FSTP SFT_L    ;Store top of stack into temp-real
002D 9B2ED9060000  E          61            FLD TEN_E4    ;Multiply by 10000 to get significant dec. digits
0033 9BD8C9                   62            FMUL ST,ST(1)
0036 9BDF363A00    R          63            FBSTP  SFT_BCD   ;convert to bcd and pop stack
003B C3                       64            RET            ;Stack top must contain valid value
                              65    ;
003C                          66    LA_SFCV:
003C 9BDB2E1200    R          67            FLD SFCV_L
0041 9BDEC1                   68            FADD
0044 C3                       69            RET
                              70    ;
0045                          71    ST_SFCV:
0045 9BD9C0                   72            FLD ST(0)
0048 9BDB3E1200    R          73            FSTP SFCV_L
004D 9B2ED9060000  E          74            FLD TEN_E4
0053 9BD8C9                   75            FMUL ST,ST(1)
0056 9BDF363000    R          76            FBSTP  SFCV_BCD
005B C3                       77            RET
                              78    ;
005C                          79    N_SFCV:
005C 9BDB2E1200    R          80            FLD SFCV_L
0061 9BD9E0                   81            FCHS
0064 9BDB3E1200    R          82            FSTP SFCV_L
```

```
0069 C3                        83           RET
                               84       ;
006A                           85       ADD_DIGIT:
006A 9BDB2E1C00     R          86           FLD SFT_L
006F 9BDB2E1200     R          87           FLD SFCV_L
0074 9BDEC1                    88           FADD
0077 EBAC                      89           JMP ST_SFT
                               90       ;
0079                           91       SUB_DIGIT:
0079 9BDB2E1C00     R          92           FLD SFT_L
007E 9BDB2E1200     R          93           FLD SFCV_L
0083 9BDEE9                    94           FSUB
0086 EB9D                      95           JMP ST_SFT
                               96       ;
0088                           97       MULT_DIGIT:
0088 9BDB2E1200     R          98           FLD SFCV_L
008D 9BDB2E1C00     R          99           FLD SFT_L
0092 9BDEC9                   100           FMULP       ST(1),ST
0095 EB8E                     101           JMP ST_SFT
                              102       ;
0097                          103       DIV_DIGIT:
0097 9BDB2E1C00     R         104           FLD SFT_L
009C 9BDB2E1200     R         105           FLD SFCV_L
00A1 9BDEF9                   106           FDIV
00A4 E97EFF                   107           JMP ST_SFT
                              108       ;
----                          109       CODE    ENDS
                              110               END

ASSEMBLY COMPLETE, NO ERRORS FOUND
```

We claim:

1. A method for inputting two-dimensional graphical data from a first, construction drawing and processing instructions from a second drawing into a computer system through a digitizer means for sensing location coordinates of a user-designated point on a drawing and outputting a corresponding digitizer output signal; the computer system including a computer having logic and memory circuitry, a keyboard and a display terminal connected to the computer via data input and output means, and a prestored construction cost estimation program; the keyboard including keys defining a set of alphanumeric keyboard symbols and electrical circuitry for transmitting to the computer different signals uniquely defining each of said keyboard symbols; and the second drawing containing image of a keyboard comprising a first set of visible symbols corresponding to the set of keyboard symbols and a second set of symbols corresponding to preselected formulae; the method comprising:

storing in the computer memory circuitry a coordinates map defining the coordinates of the first and second keyboard image, a first set of formulae in the logic and memory circuitry for making dimensional computations and a second set of unique signals corresponding to the keyboard symbols and which mimic the electrical signals generated by the keyboard circuitry;

digitizing the coordinates of user-designated points on each of said drawings and outputting corresponding digitizer output signals;

processing each digitizer output signal in accordance with the stored coordinates map to determine upon which drawing said point was designated and the coordinates of the location of the point thereon;

for a digitizer output signal corresponding to a location of a point on the first drawing, formatting said coordinates as graphic data point coordinates;

for a digitizer output signal corresponding to a location of a point on the second drawing, generating from the logic and memory circuitry a selected one of said set of unique symbols;

processing a first digitizer output signal corresponding to a first location on the keyboard image through said coordinates map to select one of said formulae;

processing a second digitizer output signal corresponding to graphic data coordinates of at least two points on the construction drawing including utilizing said coordinates within the selected formula to produce a resultant answer; and transmitting said resultant answer to the keyboard data input means for further processing by said estimation program.

2. A method according to claim 1 including initially processing the digitizer output signal to determine if its coordinate correspond to the mapped coordinates of one of the symbols on the second drawing and, only if not, processing the coordinates as said graphic data.

3. A method according to claim 1 in which the keyboard image includes a second set of visible function key symbols, includng storing in the coordinates map a second set of unique signals corresponding to the function key symbols, and, for a digitizer output signal corresponding to one of the function key symbols in the second set, transmitting a corresponding unique signal to the prestored estimation program to cause it to access an associated program from the second set of programs.

4. A method to claim 1 in which the estimation program includes a procedure actuable by signals from the keyboard to operate upon quantitative graphic data, the method including:
digitizing at least one point on the keyboard image so as to cause one of said second signals to actuate said procedure;
digitizing at least one point on the graphical data so as to process the coordinates identified thereby in accordance with the selected formula; and
processing the resultant answer in the estimation program in accordance with the procedure actuated by the second signal.

5. A method according to claim 1 including:
storing as one of said formulae an addressable preprocessing program for preprocessing at least one set of digitized graphic data coordinates and generating a resultant answer defining said function of the digitized graphic data coordinates;
displaying in a predetermined location on the keyboard image a predetermined symbol associated with a function of the preprocessing program; and
storing in the coordinates map an address for the preprocessing program locatable by digitizing the coordinates of said predetermined location;
designating a first point on the predetermined symbol and a set of second points on the graphic data and operating the computer means to locate said address and to apply the data coordinates of the set of second points in said preprocessing program to generate said resultant answer; and
transmitting said answer to said keyboard data input means.

6. A method according to claim 1 including:
providing visible alignment indicia on the drawing of the keyboard drawing in a predetermined position related to the keyboard character images;
storing in the coordinates map the locations of the indicia and the characters relative to a predetermined origin;
after positioning the keyboard image on the work surface, digitizing coordinates of the indicia;
processing the indicia coordinates to establish in the logic means a location of the predetermined origin relative to the digitizing means and thereby jointly define a relative origin of the coordinates map and keyboard drawing; and
accessing the coordinates map in accordance with the relative origin of the keyboard drawing.

7. A system for detecting and processing analog graphic data shown on a drawing in a computer operable from an electrical alphanumeric keyboard through digital keyboard data input means for inputting electrical symbols to the computer and programmed with an applications program, the system comprising:

a digitizer means disposable on a flat work surface for digitizing coordinates of a designated point on a predetermined area of said surface and outputting digital signals uniquely identifying the coordinates of each designated point;
means defining an image of a computer keyboard for displaying visible symbols including a first set of alphanumeric characters and a second set of predetermined function symbols; and
digitizer interface program means for preprocessing the digital signals output from the digitizer means to generate and transmit a modified set of digital output signals to the applications program via the digital data input means, the interface program means including:
first prestored keyboard character means for generating first digital symbols in a form which mimic the electrical alphanumeric keyboard characters;
second prestored function means including a set of formulae for making dimensional computations and generating second digital symbols defining results of the computations in the form of said keyboard characters;
means for discriminating between digitized coordinates of points of said image and said drawing positioned in common within said predetermined area; and
addressing means responsive to each of a predetermined subset of the digital signals from the digitizer means for accessing one of the first and second prestored means, the addressing means comprising:
logic means for comparing the digital signals from the digitizer to said predetermined subset and, for a digital signal within said subset, selecting one the first and second prestored means,
means including a prestored coordinates map defining relative coordinates of the first and second set of visible symbols for selectively accessing one of a first unique symbol stored in the first prestored keyboard character means, or a unique formula stored in the second prestored function means to generate a second unique symbol;
means for outputting the selected unique symbol to the digital data input means; and
locating means operable by a user after positioning the image means in said predetermined area for inputting digital signals identifying the location of the first and second sets of symbols as image coordinates within said area and linking said image coordinates to the relative coordinates of the coordinates map of the first and second drawings.

8. Apparatus according to claim 7 in which the logic means is operative, for a digital signal not within said subset, to process said digital signal as coordinates of a point within the predetermined area but outside said keyboard image.

9. Apparatus according to claim 7 in which the locating means includes means for independently locating said first and second images and linking the coordinates thereof to their respective relative coordinates in the coordinates map.

10. Apparatus according to claim 7 in which the predetermined subset includes first and second subsets and the logic means is operable to select between the first and second prestored function means as determined by the first and second subsets, respectively.

* * * * *

UNITED STATES PATENT AND TRADEMARK OFFICE
CERTIFICATE OF CORRECTION

PATENT NO. : 4,716,542
DATED : December 29, 1987
INVENTOR(S) : Curtis L. Peltz, George F. Martin and Peter H. Blake It is certified that error appears in the above-identified patent and that said Letters Patent is hereby corrected as shown below:

Column 11, line 29, "than" should be --that--;

Column 13, lines 43-44, "READY" and "-" should be
--READY- --;

Column 17, line 7, "mark" should be --mode--;

Column 18, line 30, "keyboard" should be --Keyboard--;
line 45, "the command" should be
--that command--;

Column 21, line 68, "agian" should be --again--;

Column 22, second to last line of NOTE section,
"progra" should be --program--;

UNITED STATES PATENT AND TRADEMARK OFFICE
CERTIFICATE OF CORRECTION

PATENT NO. : 4,716,542

DATED : December 29, 1987

INVENTOR(S) : Curtis L. Peltz, George F. Martin and Peter H. Blake

It is certified that error appears in the above-identified patent and that said Letters Patent is hereby corrected as shown below:

Column 23, line 7, "Exercise 1" should be

--Exercise 2--;

Column 24, line 56, "in" should be --on--;

End of Column 36, in the software listing, insert:

--©1985 Timberline Software Corporation--;

Column 146, line 68, "coordinate" should be

--coordinates--;

Column 147, line 12, "method" should be

--method according--.

Signed and Sealed this

Twenty-fifth Day of October, 1988

Attest:

DONALD J. QUIGG

Attesting Officer

Commissioner of Patents and Trademarks